(12) United States Patent
Ogawa et al.

(10) Patent No.: US 9,498,975 B2
(45) Date of Patent: Nov. 22, 2016

(54) PRODUCTION METHOD OF RECORDING MATERIAL, AND RECORDING MATERIAL

(71) Applicant: SEIKO EPSON CORPORATION, Tokyo (JP)

(72) Inventors: Tomohiro Ogawa, Nagano (JP); Hiroshi Takiguchi, Nagano (JP); Naoyuki Toyoda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 111 days.

(21) Appl. No.: 14/531,464

(22) Filed: Nov. 3, 2014

(65) Prior Publication Data
US 2015/0125671 A1    May 7, 2015

(30) Foreign Application Priority Data

Nov. 6, 2013  (JP) ................................ 2013-230638
Nov. 6, 2013  (JP) ................................ 2013-230642

(51) Int. Cl.
*B41J 2/21* (2006.01)
*B41J 11/00* (2006.01)
*C09D 11/30* (2014.01)
*C09D 11/107* (2014.01)
*B41M 7/00* (2006.01)
*B41M 5/00* (2006.01)

(52) U.S. Cl.
CPC .......... *B41J 11/0015* (2013.01); *B41J 2/2107* (2013.01); *B41J 11/00* (2013.01); *B41J 11/002* (2013.01); *B41M 7/0081* (2013.01); *C09D 11/107* (2013.01); *C09D 11/30* (2013.01); *B41M 5/007* (2013.01); *B41M 5/0023* (2013.01); *B41M 5/0047* (2013.01); *B41M 5/0058* (2013.01); *B41M 5/0064* (2013.01); *B41M 5/0076* (2013.01); *Y10T 428/24851* (2015.01)

(58) Field of Classification Search
USPC .................................................... 347/95–105
See application file for complete search history.

(56) References Cited

U.S. PATENT DOCUMENTS

| | | | | |
|---|---|---|---|---|
| 2006/0033794 | A1* | 2/2006 | Yamanobe | B41J 2/155 347/102 |
| 2006/0203024 | A1* | 9/2006 | Kusunoki | B41J 11/002 347/15 |
| 2008/0084466 | A1* | 4/2008 | Makuta | B41J 11/002 347/102 |
| 2009/0280302 | A1 | 11/2009 | Fukumoto et al. | |

FOREIGN PATENT DOCUMENTS

| | | |
|---|---|---|
| JP | 2009-057548 A | 3/2009 |
| JP | 2012-245676 A | 12/2012 |
| JP | 2013-147544 A | 8/2013 |

* cited by examiner

*Primary Examiner* — Manish S Shah
(74) *Attorney, Agent, or Firm* — Global IP Counselors, LLP

(57) ABSTRACT

A recording material includes applying a first ink including a first polymerized compound using an inkjet method, polymerizing the first polymerized compound using ultraviolet light irradiation to form a first layer, applying a second ink containing a second polymerized compound and metal powder on the area on which the first layer is formed using the inkjet method, and polymerizing the second polymerized compound using ultraviolet light irradiation to form a second layer. A discharged volume of the first ink in the area is 2.0 to 20.0 g/m². A time from landing of the first ink droplets until ultraviolet light irradiation is 0.0010 to 1.0 second. A discharged volume of the second ink in the area is 80 to 200 volume % compared to the discharged volume of the first ink. A time from landing of the second ink droplets until ultraviolet light irradiation is 5.0 to 60.0 seconds.

11 Claims, 2 Drawing Sheets

PRODUCTION METHOD OF RECORDING MATERIAL, AND RECORDING MATERIAL

CROSS-REFERENCE TO RELATED APPLICATIONS

This application claims priority to Japanese Patent Application No. 2013-230642 filed on Nov. 6, 2013 and Japanese Patent Application No. 2013-230638 filed on Nov. 6, 2013. The entire disclosure of Japanese Patent Application Nos. 2013-230642 and 2013-230638 is hereby incorporated herein by reference.

BACKGROUND

Technical Field

The present invention relates to a production method of a recording material, and a recording material.

Related Art

Conventionally, as a production method of a decorative product exhibiting a glossy appearance, metallic plating, stamp-printing using a metallic foil, thermal transfer by using a metallic foil or the like have been used.

However, with these methods, there were problems such as that it was difficult to form fine patterns, and it was difficult to apply to a curved surface part. Also, with stamp-printing, there was the problem that it was not possible to print metal tones with gradations for which the on-demand capability is low, and it was difficult to handle multi-product production.

On the other hand, as a recording method to a recording medium (base material) by using compositions including pigments or colorants, a recording method using an inkjet method is used. The inkjet method is excellent in terms of formation of fine patterns, in terms of being suitably applied for recording on curved surface parts as well, and in terms of being able to print at specific sites on demand, and being able to print with gradations. Also, in recent years, a composition (ultraviolet-curable ink for inkjet), which becomes hardened by irradiating ultraviolet light, has been used in order to provide an item that is particularly excellent in terms of abrasion resistance, water resistance, solvent resistance or the like with the inkjet method (see, for example, Unexamined Patent Publication No. 2009-57548).

However, with the ultraviolet-curable ink for inkjet, when metal powder was used instead of pigments or colorants, "glossy appearance" includes a shiny glossy appearance having a mirror surface (shiny appearance), or when observing a designated area of a subject, a sparkly glossy appearance (sparkly appearance) for which there is a big difference in the situation of the changes in the reflective state for each site within the area as the observation direction changes such as with lamé, and the like, but when using the ultraviolet-curable ink for inkjet, there was the problem that it was particularly difficult to express the kind of shiny appearance or sparkly appearance noted above.

Also, by lengthening the time from when the droplets land using the inkjet method until hardening starts, it is thought that there is an improvement in the glossy appearance, but in such a case, depending on the type of base material, due to excessive wetting and expansion of the ultraviolet-curable ink for inkjet, or the ultraviolet-curable ink for inkjet being repelled, it is difficult to form the desired shape pattern with good precision.

SUMMARY

An object of the present invention is to provide a recording material for which a printing part having an excellent glossy appearance (shiny appearance) such as a mirror surface is provided with good precision, and a production method of a recording material for which it is possible to efficiently produce the recording material for which a printing part having an excellent glossy appearance (shiny appearance) such as a mirror surface is provided with good precision, or, to provide a recording material for which a printing part having a sparkly glossy appearance (sparkly appearance) for which there is a big difference in the situation of the changes in the reflective state for each site such as with lamé as the observation direction changes is provided with good precision, and to provide a recording material production method for which it is possible to efficiently produce a recording material for which a printing part having a sparkly glossy appearance (sparkly appearance) for which there is a big difference in the situation of the changes in the reflective state for each site such as with lamé as the observation direction changes is provided with good precision.

These objects are achieved by the invention noted below.

A production method of a recording material of the invention includes applying to a base material using an inkjet method a first ink including a first polymerized compound polymerized by irradiation of ultraviolet light, forming a first layer by polymerizing and curing the first polymerized compound by irradiating ultraviolet light, applying to an area on which the first layer is formed using the inkjet method a second ink containing a second polymerized compound polymerized by irradiation of ultraviolet light and a metal powder, and forming a second layer by polymerizing and curing the second polymerized compound by irradiation of ultraviolet light. A discharged volume of the first ink per unit area in the area is 2.0 $g/m^2$ or greater and 20.0 $g/m^2$ or less, a time from landing of droplets of the first ink until irradiation of ultraviolet light on the droplets is 0.0010 second or greater and 1.0 second or less, a discharged volume of the second ink per unit area of the area is 80 volume % or greater and 200 volume % or less than the discharged volume of the first ink, and a time from landing of droplets of the second ink until irradiation of ultraviolet light on the droplets is 5.0 seconds or greater and 60.0 seconds or less.

By doing this, it is possible to provide a recording material production method capable of efficiently producing a recording material for which a printing part having an excellent glossy appearance such as a mirror surface (shiny appearance) is provided with good precision.

With the recording material production method of the invention, it is preferable that the droplet volume of the first ink discharged by one discharge operation by the inkjet method be 3 ng or greater and 30 ng or less.

By doing this, it is possible to more reliably form a first layer of a desired shape, and possible to more effectively exhibit a function as a scaffold when forming a second layer on that first layer, and as a result, it is possible to more reliably produce a recording material for which a printing part having an excellent glossy appearance such as a mirror surface (shiny appearance) is provided with good precision, and it is possible to have a recording material with particularly excellent productivity.

With the recording material production method of the invention, it is preferable that the droplet volume of the second ink discharged by one discharge operation by the inkjet method be 3 ng or greater and 30 ng or less.

By doing this, the skewing of the landing position of the second ink, excessive wetting and spreading and the like are more reliably prevented, and it is possible to have an item with particularly excellent recording material productivity while having a finally obtained recording material that is particularly excellent in terms of printing part precision.

With the recording material production method of the invention, it is preferable that the metal powder include items that are surface-processed by a surface preparation agent as constituent particles.

By doing this, it is possible to effectively prevent gelation of the second ink, and possible to have an item that is particularly excellent for storage stability of the second ink, discharge stability of the second ink and the like. Also, while having excellent storage stability for the second ink and the like, it is possible later to suitably adjust the affinity of the metal powder (dispersoid) with the dispersion medium (second polymerized compound or the like) with a second ink applying step for applying the second ink to the area on which the first layer is formed, and with the printing part of the recording material, it is possible to suitably arrange the metal powder, and possible to have an item with particularly excellent glossy appearance (shiny appearance) of the printing part.

With the recording material production method of the invention, it is preferable that the surface preparation agent be one type or two or more types selected from a group consisting of fluorine based silane compounds, fluorine based phosphate esters, fluorine based fatty acids, and isocyanate compounds.

By doing this, it is possible to have particularly excellent storage stability for the second ink, and to have particularly excellent glossy appearance (shiny appearance) and abrasion resistance of the recording material printing part.

With the recording material production method of the invention, it is preferable for the metal powder to include as constituent particles mother particles in which at least a surface is mainly constituted by Al and which have been surface-processed using the surface preparation agent.

By doing this, the glossy appearance that the metal material has naturally and the effect due to suitable arrangement of metal powder on the recording material printing part act synergistically, and it is possible to have the glossy appearance of the printer part be particularly excellent (in particular, a glossy appearance having a mirror surface (shiny appearance)). Also, it is possible to effectively prevent gelation of the second ink, and possible to have an item that is particularly excellent in terms of second ink storage stability, second ink discharge stability and the like.

With the recording material production method of the invention, it is preferable that the constituent particles of the metal powder have a scale-like shape.

By doing this, it is possible to arrange the metal powder so that the main surface of the metal particles follows the surface shape of the second layer, possible to have the glossy appearance or the like that the metal material constituting the metal powder naturally has be more effectively exhibited on the recording material, possible to have the printing part glossy appearance (in particular, a glossy appearance such as that a mirror surface has (shiny appearance)) be particularly excellent in terms of a high-class appearance, and possible to be particularly excellent in terms of recording material abrasion resistance.

With the recording material production method of the invention, it is preferable that the average thickness of the constituent particles of the metal powder be 10 nm or greater and 100 nm or less.

By doing this, it is possible to arrange the metal powder so that the main surface of the metal particles follows the surface shape of the second layer, possible to have the glossy appearance or the like that the metal material constituting the metal powder naturally has be more effectively exhibited on the recording material, possible to have the printing part glossy appearance (in particular, a glossy appearance such as that a mirror surface has (shiny appearance)) be even more excellent in terms of a high-class appearance, and possible to be even more excellent in terms of recording material abrasion resistance.

With the recording material production method of the invention, it is preferable that the average particle diameter of the metal powder be 500 nm or greater and 3.0 µm or less, and that the maximum particle diameter be 5 µm or less.

By doing this, it is possible to have even more excellent glossy appearance (shiny appearance) and high-class appearance of the printing part. It is also possible to have even more excellent storage stability and discharge stability for the second ink.

With the recording material production method of the invention, it is preferable that the first ink and the second ink both include a monomer having an alicyclic structure as the first and second polymerized compounds.

By doing this, it is possible to have particularly excellent adhesiveness of the first layer to the base material, and adhesiveness of the second layer to the first layer and the like, and possible to have particularly excellent durability and reliability of the recording material. It is also possible to have particularly excellent dispersion stability of the metal powder in the ink and storage stability of the ink, and also, possible to have particularly excellent precision, glossy appearance (shiny appearance), and abrasion resistance of the printing part.

With the recording material production method of the invention, the monomer having the alicyclic structure noted above preferably includes one type or two or more types selected from a group consisting of tris (2-acryloxyethyl) isocyanurate, dicyclopentenyloxyethyl acrylate, adamantyl acrylate, γ-butyrolactone acrylate, N-vinyl caprolactam, N-vinylpyrrolidone, pentamethyl piperidyl acrylate, tetramethyl piperidyl acrylate, 2-methyl-2-adamantyl acrylate, 2-ethyl-2-adamantyl acrylate, mevalonic acid lactone acrylate, dimethylol tricyclodecane diacrylate, dimethylol dicyclopentane diacrylate, dicyclopentenyl acrylate, dicyclopentanyl acrylate, isobornyl acrylate, cyclohexyl acrylate, acryloyl morpholine, tetrahydrofurfuryl acrylate, cyclohexane spiro-2-(1,3-dioxolan-4-yl) methyl acrylate, and (2-methyl-2-ethyl-1,3-dioxolan-4-yl) methyl acrylate.

By doing this, it is possible to have even more excellent adhesiveness of the first layer to the base material, and adhesiveness of the second layer to the first layer and the like, and possible to have even more excellent durability and reliability of the recording material. It is also possible to have even more excellent dispersion stability of the metal powder in the ink and storage stability and discharge stability of the ink, and also, possible to have even more excellent precision, glossy appearance (shiny appearance), high class appearance, and abrasion resistance of the printing part.

With the recording material production method of the invention, it is preferable that the first ink and the second ink both include as the first and second polymerized compounds other than the monomer having the alicyclic structure one type or two or more types selected from a group consisting of phenoxyethyl acrylate, benzyl acrylate, acrylic acid 2-(2-vinyloxyethoxy) ethyl, dipropylene glycol diacrylate, tripropylene glycol diacrylate, 2-hydroxy 3-phenoxypropyl acrylate, and 4-hydroxybutyl acrylate.

By doing this, while having excellent storage stability and discharge stability for the ink, it is possible to have an item that is particularly excellent in terms of responsiveness of the ink after discharging using the inkjet method, to have particularly excellent recording material productivity, and possible to have particularly excellent abrasion resistance or the like for the formed pattern.

With the recording material production method of the invention, it is preferable that the contact angle of the first ink to the base material be 30 degrees or greater and 85 degrees or less.

By doing this, while having suitably excellent affinity of the first ink with the base material, and having particularly excellent adhesiveness of the first layer to the base material, it is possible to more reliably prevent having the first ink have more wetting and spreading than necessary on the base material or the like, and possible to more reliably have the first layer have the desired shape.

With the recording material production method of the invention, it is preferable that the absolute value of the difference between the viscosity of the first ink at room temperature (25° C.) and the viscosity of the second ink at room temperature (25° C.) be 1.0 mPa·s or less.

By doing this, setting, adjustment and the like of the ink discharge conditions using the inkjet method are easy.

The recording material of the invention is produced using the method of the invention.

By doing this, it is possible to provide a recording material for which the printing part having an excellent glossy appearance such as a mirror surface (shiny appearance) is provided with good precision.

These objects are achieved by the invention noted below.

A production method of a recording material of the invention includes applying to a base material using an inkjet method a first ink including a first polymerized compound polymerized by irradiation of ultraviolet light, forming a first layer by polymerizing and curing the first polymerized compound by irradiating ultraviolet light, applying to an area on which the first layer is formed using the inkjet method a second ink containing a second polymerized compound polymerized by irradiation of ultraviolet light and a metal powder, and forming a second layer by polymerizing and curing the second polymerized compound by irradiation of ultraviolet light. A discharged volume of the first ink per unit area in the area is 2.0 g/m² or greater and 20.0 g/m² or less, a time from landing of droplets of the first ink until irradiation of ultraviolet light on the droplets is 0.0010 second or greater and 1.0 second or less, a discharged volume of the second ink per unit area of the area is 10 volume % or greater and 80 volume % or less than the discharged volume of the first ink, and a time from landing of droplets of the second ink until irradiation of ultraviolet light on the droplets is 5.0 seconds or greater and 60.0 seconds or less.

By doing this, it is possible to provide a recording material production method capable of stably and efficiently producing a recording material for which a printing part having a sparkly glossy appearance (sparkly appearance) for which there is a big difference in the situation of the changes in the reflective state for each site such as with lamé as the observation direction changes is provided with good precision.

With the recording material production method of the invention, the surface roughness of the surface of the first layer is preferably 3.0 µm or greater and 100 µm or less.

By doing this, it is possible for the first layer to more effectively exhibit the function as a scaffold when forming the second layer.

With the recording material production method of the invention, it is preferable that the droplet volume of the first ink discharged by one discharge operation by the inkjet method be 3 ng or greater and 30 ng or less.

By doing this, it is possible to more reliably form a first layer of a desired shape, and possible to more effectively exhibit a function as a scaffold when forming a second layer on that first layer, and possible to more reliably control the surface shape of the second layer, and as a result, it is possible to more reliably produce the recording material for which the printing part having an excellent glossy appearance (sparkly appearance) like that of lamé is provided with good precision, and it is possible to have particularly excellent productivity for the recording material.

With the recording material production method of the invention, it is preferable that the droplet volume of the second ink discharged by one discharge operation by the inkjet method be 3 ng or greater and 30 ng or less.

By doing this, skewing of the landing position of the second ink, excessive wetting and spreading and the like are more reliably prevented, and it is possible to have an item with particularly excellent recording material productivity while having a finally obtained recording material that is particularly excellent in terms of printing part precision.

With the recording material production method of the invention, it is preferable that the metal powder include items that are surface processed by a surface preparation agent as constituent particles.

By doing this, it is possible to effectively prevent gelation of the second ink, and possible to have an item that is particularly excellent for storage stability of the second ink, discharge stability of the second ink and the like. Also, while having excellent storage stability for the second ink and the like, it is possible later to suitably adjust the affinity of the metal powder (dispersoid) with the dispersion medium (second polymerized compound or the like) with a second ink applying step for applying the second ink to the area on which the first layer is formed, and with the printing part of the recording material, it is possible to suitably arrange the metal powder, and possible to have an item with particularly excellent glossy appearance (sparkly appearance) of the printing part.

With the recording material production method of the invention, it is preferable that the surface preparation agent be one type or two or more types selected from a group consisting of fluorine based silane compounds, fluorine based phosphate esters, fluorine based fatty acids, and isocyanate compounds.

By doing this, it is possible to have particularly excellent storage stability for the second ink, and to have particularly excellent glossy appearance (sparkly appearance) and abrasion resistance of the recording material printing part.

With the recording material production method of the invention, it is preferable for the metal powder to include as constituent particles mother particles in which at least a surface is mainly constituted by Al and which have been surface processed using the surface preparation agent.

By doing this, the glossy appearance that the metal material has naturally and the effect due to suitable arrangement of metal powder on the recording material printing part act synergistically, and it is possible to have the glossy appearance of the printer part be particularly excellent (sparkly appearance). Also, it is possible to effectively prevent gelation of the second ink, and possible to have an item that is particularly excellent in terms of second ink storage stability, second ink discharge stability and the like.

With the recording material production method of the invention, it is preferable that the constituent particles of the metal powder have a scale-like shape.

By doing this, it is possible to arrange the metal powder so that the main surface of the metal particles follows the surface shape of the second layer, possible to have the glossy appearance or the like that the metal material constituting the metal powder naturally has be more effectively exhibited on the recording material, possible to have the printing part glossy appearance (sparkly appearance) be particularly excellent in terms of a high-class appearance, and possible to be particularly excellent in terms of recording material abrasion resistance.

With the recording material production method of the invention, it is preferable that the average thickness of the constituent particles of the metal powder be 10 nm or greater and 100 nm or less.

By doing this, it is possible to arrange the metal powder so that the main surface of the metal particles follows the surface shape of the second layer, possible to have the glossy appearance or the like that the metal material constituting the metal powder naturally has be more effectively exhibited on the recording material, possible to have the printing part glossy appearance (sparkly appearance) be even more excellent in terms of a high-class appearance, and possible to be even more excellent in terms of recording material abrasion resistance.

With the recording material production method of the invention, it is preferable that the average particle diameter of the metal powder be 500 nm or greater and 3.0 µm or less, and that the maximum particle diameter be 5 µm or less.

By doing this, it is possible to have even more excellent glossy appearance (sparkly appearance) and high-class appearance of the printing part. It is also possible to have even more excellent storage stability and discharge stability for the second ink.

With the recording material production method of the invention, it is preferable that the first ink and the second ink both include a monomer having an alicyclic structure as the first and second polymerized compounds.

By doing this, it is possible to have particularly excellent adhesiveness of the first layer to the base material, and adhesiveness of the second layer to the first layer and the like, and possible to have particularly excellent durability and reliability of the recording material. It is also possible to have particularly excellent dispersion stability of the metal powder in the ink and storage stability of the ink, and also, possible to have particularly excellent precision, glossy appearance (sparkly appearance), and abrasion resistance of the printing part.

With the recording material production method of the invention, the monomer having the alicyclic structure preferably includes one type or two or more types selected from a group consisting of tris (2-acryloxyethyl) isocyanurate, dicyclopentenyloxyethyl acrylate, adamantyl acrylate, γ-butyrolactone acrylate, N-vinyl caprolactam, N-vinylpyrrolidone, pentamethyl piperidyl acrylate, tetramethyl piperidyl acrylate, 2-methyl-2-adamantyl acrylate, 2-ethyl-2-adamantyl acrylate, mevalonic acid lactone acrylate, dimethylol tricyclodecane diacrylate, dimethylol dicyclopentane diacrylate, dicyclopentenyl acrylate, dicyclopentanyl acrylate, isobornyl acrylate, cyclohexyl acrylate, acryloyl morpholine, tetrahydrofurfuryl acrylate, cyclohexane spiro-2-(1,3-dioxolan-4-yl) methyl acrylate, and (2-methyl-2-ethyl-1,3-dioxolan-4-yl) methyl acrylate.

By doing this, it is possible to have even more excellent adhesiveness of the first layer to the base material, and adhesiveness of the second layer to the first layer and the like, and possible to have even more excellent durability and reliability of the recording material. It is also possible to have even more excellent dispersion stability of the metal powder in the ink and storage stability and discharge stability of the ink, and also, possible to have even more excellent precision, glossy appearance (sparkly appearance), high class appearance, and abrasion resistance of the printing part.

With the recording material production method of the invention, it is preferable that the first ink and the second ink both include as the first and second polymerized compounds other than the monomer having the alicyclic structure one type or two or more types selected from a group consisting of phenoxyethyl acrylate, benzyl acrylate, acrylic acid 2-(2-vinyloxyethoxy) ethyl, dipropylene glycol diacrylate, tripropylene glycol diacrylate, 2-hydroxy 3-phenoxypropyl acrylate, and 4-hydroxybutyl acrylate.

By doing this, while having excellent storage stability and discharge stability for the ink, it is possible to have an item that is particularly excellent in terms of responsiveness of the ink after discharging using the inkjet method, to have particularly excellent recording material productivity, and possible to have particularly excellent abrasion resistance or the like for the formed pattern.

With the recording material production method of the invention, it is preferable that a contact angle of the first ink to the base material be 30 degrees or greater and 85 degrees or less.

By doing this, while having suitably excellent affinity of the first ink with the base material, and having particularly excellent adhesiveness of the first layer to the base material, it is possible to more reliably prevent having the first ink have more wetting and spreading than necessary on the base material or the like, and possible to more reliably have the first layer have the desired shape.

The recording material of the invention is produced using the production method of the invention.

By doing this, it is possible to provide a recording material for which the printing part having a sparkly glossy appearance (sparkly appearance) for which there is a big difference in the situation of the changes in the reflective state for each site such as with lamé as the observation direction changes is provided with good precision.

BRIEF DESCRIPTION OF THE DRAWINGS

Referring now to the attached drawings which form a part of this original disclosure.

DETAILED DESCRIPTION OF EXEMPLARY EMBODIMENTS

Figure 1A:
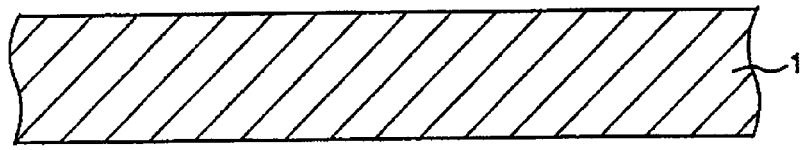
FIGS. 1A, 1B, 1C, and 1D are cross section views schematically showing a preferred embodiment of the recording material production method of the invention.

Following, we will give a detailed description of preferred embodiments of the present invention.

Recording Material Production Method

First, we will describe the recording material production method of the invention.

The production method of the invention is a method of producing a recording material using the inkjet method.

From the past, as a manufacturing method of a decorative product which exhibits a glossy appearance, metallic plating, stamp-printing using a metallic foil, thermal transfer using a metallic foil or the like have been used.

However, with these methods, there was the problem that it was difficult to form fine patterns, or to apply to a curved surface part. Also, with stamp-printing, there was the problem that it was not possible to print metal tones with gradations for which the on-demand capability is low, and it is difficult to handle multi-product production.

On the other hand, as a recording method to a recording medium (base material) by using compositions including pigments or colorants, a recording method using an inkjet method is used. The inkjet method is excellent in terms of formation of fine patterns, in terms of being suitably applied for recording on curved surface parts as well, and in terms of being able to print at specific sites on demand, and being able to print with gradations. Also, in recent years, a composition (ultraviolet-curable ink for inkjet), which becomes hardened by irradiating ultraviolet light, has been used in order to provide an item that is particularly excellent in terms of abrasion resistance, water resistance, solvent resistance, or the like with the inkjet method.

However, with the ultraviolet-curable ink for inkjet, when metal powder was used instead of pigments or colorants, there was a problem that characteristics such as the glossy appearance that the metal has naturally (in particular, a glossy appearance such as that a mirror surface has (shiny appearance)) or the like cannot be sufficiently exhibited.

Also, by lengthening the time from when the droplets land using the inkjet method until hardening starts, it is thought that there is an improvement in the glossy appearance, but in such a case, depending on the type of base material, due to excessive wetting and expansion of the ultraviolet-curable ink for inkjet, or the ultraviolet-curable ink for inkjet being repelled, it is difficult to form the desired shape pattern with good precision.

In light of that, the inventors achieved the invention as a result of intense research with the object of resolving the kinds of problems noted above. Specifically, the production method of the invention has a first ink applying step for applying to a base material using an inkjet method a first ink including a first polymerized compound polymerized by irradiation of ultraviolet light, a first curing step for forming a first layer by polymerizing and curing the first polymerized compound by irradiating ultraviolet light, a second ink applying step for applying to an area on which the first layer is formed using the inkjet method a second ink containing a second polymerized compound polymerized by irradiation of ultraviolet light and a metal powder, and a second curing step for forming a second layer by polymerizing and curing the second polymerized compound by irradiation of ultraviolet light, wherein the discharged volume of the first ink in the area is 2.0 g/m$^2$ or greater and 20.0 g/m$^2$ or less, the time from landing of the first ink droplets until irradiation of ultraviolet light on those droplets is 0.0010 second or greater and 1.0 second or less, the discharged volume of the second ink per unit surface area of the area is 80 volume % or greater and 200 volume % or less than the discharged volume of the first ink, and the time from landing of the second ink droplets until irradiation of ultraviolet light on those droplets is 5.0 seconds or greater and 60.0 seconds or less.

In this way, with the invention, before forming the second layer including metal powder by doing ultraviolet light curing for a relatively long time, the first layer which is a scaffold of the second layer is formed by performing ultraviolet light curing for a relatively short time, and by stipulating the volume of ink used for forming the first layer (ink volume per unit surface area) and the volume of ink used for forming the second layer (ink volume per unit surface area), it is possible to fix the hardened material of the first ink droplets on various types of base materials having a desired shape at a desired location, and also possible to form the second layer for which the metal powder arrangement status is suitably controlled in the area in which the first layer (hardened material of first ink droplets) is formed. As a result, it is possible to reliably manufacture with good efficiency a recording material for which there is reliable prevention of a decrease in printing pattern precision due to unintended wetting and spreading (excessive wetting and spreading) or repelling of the ink, and having a printing part that has the desired shape, also sufficiently exhibits the glossy appearance that a metal material has naturally, and which has an excellent glossy appearance such as of a mirror surface (shiny appearance) for which there are no unintended dents and bumps, and for which diffused reflection does not occur easily.

Following, we will give a detailed description of preferred embodiments of the production method of the invention while referring to the attached drawings.

FIGS. 1A-1D are cross section views schematically showing a preferred embodiment of the recording material production method of the invention.

As shown in FIGS. 1A-1D, the production method of this embodiment a first ink applying step (FIG. 1A) of using the inkjet method to apply a first ink 2' including a first polymerized compound 21' polymerized by irradiation of ultraviolet light on a surface for which at least the surface is a base material (recording medium) 1, a first curing step (FIG. 1B) of forming a first layer 2 as the hardened material 21 for which the first polymerized compound 21' was polymerized and hardened by irradiation of ultraviolet light, a second ink applying step (FIG. 1C) using the inkjet method to apply a second ink 3' containing a second polymerized compound 32' polymerized by irradiation of ultraviolet light and a metal powder 31 to an area on which the first layer 2 is formed (area on which a second layer 3 is to be formed as a film with no gaps), and a second curing step (FIG. 1D) for forming the second layer 3 as a hardened material 32 for which the second polymerized compound 32' was polymerized and hardened by irradiation of ultraviolet light.

First Ink Applying Step

With this step, the first ink 2' is applied using the inkjet method to the surface of the base material (recording material) 1 (FIG. 1A).

The base material 1 can be anything, so absorbability or non-absorbability can be used and for example, it is possible to use paper (regular paper, paper for inkjet or the like), plastic material, metal, ceramic, wood material, shells, or natural fiber or synthetic fiber such as cotton, polyester, wool or the like, non-woven fiber or the like, and it is preferable to have at least the surface (site at which the first ink 2' is applied) be constituted using a non-liquid absorbing material (e.g. plastic material, metal, ceramic, shells or the like). By doing this, when using a non-absorbable (non-liquid absorbing) item as the base material 1, it is possible to more suitably perform control of the shape of the hardened material 21 of the first ink 2'.

With the invention, a non-absorbable recording medium means an item that substantially does not absorb ink, and more specifically, means an item for which the contact angle of droplets after landing is 10 degrees or greater.

Among these, it is preferable that the base material 1 have at least the surface be constituted using polyester. By doing this, it is possible to more reliably cure the first polymerized compound 21' (in particular, the first polymerized compound 21' including a monomer having an alicyclic structure described in detail later) into the desired shape.

As the polyester constituting the base material 1, examples include polyethylene terephthalate, polytrimethylene terephthalate, polybutylene terephthalate and the like, but polyethylene terephthalate is preferable. By doing this, it is possible to have particularly excellent adhesiveness between the first layer 2 (in particular, the first layer 2 formed using the first ink 2' including a monomer having the alicyclic structure described in detail later as the first polymerized compound 21') and the base material 1, and it is also possible to have particularly excellent heat resistance of the finally obtained recording material 10.

The first ink 2' is an item including the first polymerized compound 21' polymerized by irradiation of ultraviolet light. The first polymerized compound 21' is an item that is polymerized and cured with the first curing step described in detail later to form the hardened material 21.

The first polymerized compound 21' is in liquid form. By doing this, it is not necessary to use the liquid component removed (vaporized) in the production process of the recording material 10, and with the production of the recording material 10, it is not necessary to provide a step of removing this kind of liquid component, so it is possible to have particularly excellent productivity for the recording material 10. Also, since it is not necessary to use an organic solvent, an occurrence of the VOC (volatile organic compound) problem can be prevented.

As the first polymerized compound 21', it is acceptable as long as it is a component that can be polymerized by irradiating ultraviolet, and for example, various types of monomer, various types of oligomer (including dimer, trimer, or the like), or the like can be used, but it is preferable that the first ink 2' use an item that at least includes a monomer component as the first polymerized compound 21'. A monomer is a component that generally has a lower viscosity than an oligomer component or the like, so the first ink 2' has an advantage of having particularly excellent discharge stability.

In particular, the first ink 2' preferably includes a monomer having an alicyclic structure as the first polymerized compound 21'. By doing this, it is possible to have particularly excellent adhesiveness of the hardened material 21 (first layer 2) formed with the first curing step on the base material 1, and possible to more easily form the hardened material 21 (first layer 2) controlled to the desired shape.

Examples of a monomer having an alicyclic structure include tris (2-(meth) acryloyloxyethyl) isocyanurate, dicyclopentenyloxyethyl (meth) acrylate, adamantyl (meth) acrylate, γ-butyrolactone (meth) acrylate, N-vinyl caprolactam, N-vinylpyrrolidone, pentamethylpiperidyl (meth) acrylate, tetramethylpiperidyl (meth) acrylate, 2-methyl-2-adamantyl (meth) acrylate, 2-ethyl-2-adamantyl (meth) acrylate, mevalonic acid lactone (meth) acrylate, dimethylol tricyclodecanedi (meth) acrylate, dimethylol dicyclopentane di (meth) acrylate, dicyclopentenyl (meth) acrylate, dicyclopentanyl (meth) acrylate, isobornyl (meth) acrylate, cyclohexyl (meth) acrylate, (meth) acryloyl morpholine, tetrahydrofurfuryl (meth) acrylate, phenyl glycidyl ether (meth) acrylate, EO-modified hydrogenated bisphenol A di (meth) acrylate, di (meth) acrylated isocyanurate, tri (meth) acrylated isocyanurate and the like, but it is preferable to be an item including one type or two or more types selected from the group consisting of tris (2-acryloyloxyethyl) isocyanurate, dicyclopentenyloxyethyl ethyl acrylate, adamantyl acrylate, γ-butyrolactone acrylate, N-vinylcaprolactam, N-vinylpyrrolidone, pentamethylpiperidyl acrylate, tetramethylpiperidyl acrylate, 2-methyl-2-adamantyl acrylate, 2-ethyl-2-adamantyl acrylate, cyclohexane spiro-2-(1,3-dioxolan-4-yl) methyl acrylate, (2-methyl-2-ethyl-1,3-dioxolan-4-yl) methyl acrylate, mevalonic acid lactone acrylate, dimethylol tricyclodecane diacrylate, dimethylol dicyclopentane diacrylate, dicyclopentenyl acrylate, dicyclopentanyl acrylate, isobornyl acrylate, cyclohexyl acrylate, acryloyl morpholine, and tetrahydrofurfuryl acrylate. By doing this, it is possible to have an item that is even more excellent in terms of adhesiveness of the hardened material 21 (first layer 2) formed with the first curing process with the base material 1, and possible to more easily form the hardened material 21 (first layer 2) controlled to the desired shape. It is also possible to have the first ink 2' have even more excellent storage stability and discharge stability.

Among those, from the perspective of the curing speed of the first ink 2' with the first curing step, and further improving the productivity of the recording material 10, it is preferable to be an item including one type or two or more types selected from the group consisting of tris (2-acryloyloxyethyl) isocyanurate, dicyclopentenyloxyethyl ethyl acrylate, γ-butyrolactone acrylate, N-vinylpyrrolidone, dimethylol tricyclodecane diacrylate, dimethylol dicyclopentane diacrylate, dicyclopentenyl acrylate, dicyclopentanyl acrylate, acryloyl morpholine, and tetrahydrofurfuryl acrylate, more preferable to be an item including acryloyl morpholine and/or γ-butyrolactone acrylate, and even more preferable to be an item including γ-butyrolactone acrylate.

Also, when it is an item including one type or two or more types selected from the group consisting of cyclohexyl acrylate, tetrahydrofurfuryl acrylate, and benzyl acrylate, it is possible to have an item even more excellent in terms of flexibility of the hardened material 21 (first layer 2).

Also, when it is an item including one type or two or more types selected from the group consisting of γ-butyrolactone acrylate, N-vinylcaprolactam, N-vinylpyrrolidone, isobornyl acrylate, and tetrahydrofurfuryl acrylate, the shrinkage ratio during curing of the first ink 2' is smaller, and it is possible to more effectively prevent the occurrence of unintended creases in the hardened material 21 (first layer 2).

The content rate of the monomer having an alicyclic structure in the first ink 2' is preferably 40 mass % or greater and 90 mass % or less, more preferably 50 mass % or greater and 88 mass % or less, and even more preferably 55 mass % or greater and 85 mass % or less. The first ink 2' can also be an item that includes two or more compounds as the monomer having an alicyclic structure. In this case, the sum of the content rates of these is preferably a value in the range noted above.

The monomer having an alicyclic structure is preferably an item for which the number of constituent atoms of the cyclic structure formed by covalent bond is 5 or greater, and more preferably 6 or greater. By doing this, it is possible to have particularly excellent storage stability of the first ink 2'.

As the monomer having an alicyclic structure, the first ink 2' preferably includes a monofunctional monomer including a heteroatom in the alicyclic structure (monofunctional monomer having a heterocycle that does not indicate aromaticity). By doing this, it is possible to obtain particularly excellent discharge stability over a long time. Examples of this kind of monofunctional monomer include, for example, tris (2-(meth) acryloyloxyethyl) isocyanurate, γ-butyrolactone (meth) acrylate, N-vinyl caprolactam, N-vinylpyrrolidone, pentamethylpiperidyl (meth) acrylate, tetramethylpiperidyl (meth) acrylate, mevalonic acid lactone (meth) acrylate, (meth) acryloyl morpholine, tetrahydrofurfuryl (meth) acrylate and the like.

The content rate of the monofunctional monomer in the first ink 2' (mono functional monomer having a heteroatom in the alicyclic structure) is preferably 10 mass % or greater and 80 mass % or less, more preferably 15 mass % or greater and 75 mass % or less. By doing this, it is possible to more effectively suppress curing shrinkage. The first ink 2' can also be an item including two types or more of compounds as the monofunctional monomer including a heteroatom in the alicyclic structure. In this case, it is preferable that the sum of the content rates of these be a value within the range noted above.

The polymerized compound constituting the first ink 2' can also be an item including a monomer that does not have an alicyclic structure.

As this kind of monomer (monomer not having an alicyclic structure), it is preferable to be an item including one type or two types or more selected from the group consisting of, for example, phenoxyethyl (meth) acrylate, benzyl (meth) acrylate, (meth) acrylate 2-(2-vinyloxy ethoxy) ethyl, dipropylene glycol di (meth) acrylate, tripropylene glycol di (meth) acrylate, 2-hydroxy-3-phenoxypropyl (meth) acrylate, and 4-hydroxybutyl (meth) acrylate, lauryl (meth) acrylate, 2-methoxyethyl (meth) acrylate, isooctyl (meth) acrylate, stearyl (meth) acrylate, 2-ethoxyethyl (meth) acrylate, benzyl (meth) acrylate, 1H, 1H, 5H-octafluoropentyl (meth) acrylate, 2-hydroxyethyl (meth) acrylate, 2-hydroxypropyl (meth) acrylate, isobutyl (meth) acrylate, t-butyl (meth) acrylate, ethyl carbitol (meth) acrylate, 2,2,2-trifluoroethyl (meth) acrylate, 2,2,3,3-tetrafluoropropyl (meth) acrylate, methoxy triethylene glycol (meth) acrylate, PO-modified nonylphenol (meth) acrylate, EO-modified nonylphenol (meth) acrylate, EO-modified 2 ethylhexyl (meth) acrylate, phenoxy diethylene glycol (meth) acrylate, EO-modified phenol (meth) acrylate, EO-modified cresol (meth) acrylate, methoxy polyethylene glycol (meth) acrylate, dipropylene glycol (meth) acrylate, 2-n-butyl-2-ethyl-1,3-propanediol di (meth) acrylate, tetraethylene glycol di (meth) acrylate, 1,9-nonanediol di (meth) acrylate, 1,4-butanediol di (meth) acrylate, bisphenol A EO-modified di (meth) acrylate, 1,6-hexanediol di (meth) acrylate, polyethylene glycol 200 di (meth) acrylate, polyethylene glycol 300 di (meth) acrylate, neopentyl glycol hydroxypivalate di (meth) acrylate, 2-ethyl-2-butyl-propanediol di (meth) acrylate, polyethylene glycol 400 di (meth) acrylate, polyethylene glycol 600 di (meth) acrylate, polypropylene glycol di (meth) acrylate, bisphenol A EO-modified di (meth) acrylate, PO-modified bisphenol A di (meth) acrylate, trimethylolpropane tri (meth) acrylate, pentaerythritol tri (meth) acrylate, trimethylolpropane EO-modified tri (meth) acrylate, glycerin PO-added tri (meth) acrylate, tris (meth) acryloyloxyethyl phosphate, pentaerythritol tetra (meth) acrylate, PO modified trimethylolpropane tri (meth) acrylate, 2-(meth) acryloyloxyethyl phthalate, 3-(meth) acryloyloxypropyl acrylate, w-carboxy (meth) acryloyloxyethyl phthalate, di-trimethylolpropane tetra (meth) acrylate, dipentaerythritol penta-/hexa-(meth) acrylate, dipentaerythritol hexa (meth) acrylate and the like, but it is preferable to include one type or two or more types selected from the group consisting of phenoxy ethyl acrylate, benzyl acrylate, acrylic acid 2-(2-vinyloxyethoxyl) ethyl, dipropylene glycol diacrylate, tripropylene glycol diacrylate, 2-hydroxy 3-phenoxy propyl acrylate, and 4-hydroxy butyl acrylate. In addition to the monomer having an alicyclic structure, by including this kind of monomer that does not have an alicyclic structure, it is possible to have an item with excellent storage stability and discharge stability for the first ink 2', to have particularly excellent reactivity of the first ink 2' after discharge using the inkjet method, and to have particularly excellent productivity of the recording material 10.

Among these, when it is an item including acrylic acid 2-(2-vinyloxyethoxy) ethyl, it is possible to have more excellent curing speed of the first ink 2' when irradiating the ultraviolet light, and productivity of the recording material 10.

Also, when it is an item including phenoxyethyl acrylate and/or 2-hydroxy 3-phenoxypropyl acrylate, it is possible to have even more excellent flexibility of the hardened material 21 (first layer 2).

Also, when it is an item including phenoxyethyl acrylate, it is possible to make the shrinkage ratio during curing of the first ink 2' lower, and to more effectively prevent the occurrence of unintended creases in the hardened material 21 (first layer 2).

The content rate of the monomer other than a monomer having an alicyclic structure in the first ink 2' is preferably 5 mass % or greater and 50 mass % or less, and more preferably 10 mass % or greater and 40 mass % or less. By doing this, while having particularly excellent curing speed of the first ink 2' and flexibility of the hardened material 21 (first layer 2), it is easier to adjust the shrinkage ratio during curing or the like. It is also possible to have the first ink 2' be an item that includes two types or more of a compound as the monomer that does not have an alicyclic structure. In this case, it is preferable that the sum of the content rates of these be a value within the range noted above.

Also, as a polymerized compound, besides monomers, the first ink 2' can include oligomers (including dimer, trimer, or the like). As a prepolymer, oligomers can use an item that has monomers such as those described above as constituent components, for example. The first ink 2' preferably is an item including a multifunctional oligomer. By doing this, it is possible to have the first ink 2' have particularly excellent storage stability. Also, for example when the first ink 2' does not include metal powder, it is possible to prevent the viscosity of the first ink 2' from becoming too low, and possible to suitably adjust the viscosity balance with the second ink 3'. As the oligomer, it is preferable to use a urethane oligomer for which the repeated structure is urethane, and to use an epoxy oligomer for which the repeated structure is epoxy or the like.

The content rate of the polymerized compound in the first ink 2' is preferably 70 mass % or greater and 99 mass % or less, and more preferably 80 mass % or greater and 98 mass % or less. By doing this, it is possible to have more excellent storage stability, discharge stability, and hardenability of the first ink 2'. The first ink 2' can also include two or more types of compounds as the polymerized compound. In that case, it is preferable that the sum of the content rates of these be a value within the range noted above.

The first ink 2' can also include a component aside from those described above (other components). Examples of such components include, for example, coloring agents, metal powder, photopolymerization initiators, slip agents (leveling agents), polymerization accelerators, polymerization inhibitors, penetration enhancers, wetting agents (humectants), fixing agents, antifungal agents, preservatives, antioxidants, chelating agents, thickeners, sensitizers (sensitizing dyes) and the like.

When the first ink 2' includes a coloring agent, it is possible to suitably adjust the color tone of the printing part having the first layer 2 and the second layer 3. Also, when the first ink 2' includes a coloring agent, for example even if the base material 1 is constituted with a material with high transparency, it is possible to increase the concealing capability, and possible to increase the visibility of the printing part (in particular, the printing part by the second ink 3' (second layer 3)).

Also, the first ink 2' can include a metal powder such as described as a constituent component of the second ink 3' described in detail later. By doing this, even if the base material 1 is constituted with a material having high transparency, it is possible to exhibit particularly high concealing capability, possible to increase the visibility of the printing part (particularly the printing part using the second ink 3' (second layer 3)), and it is also possible to do a supplementary increase in the glossy appearance of the printing part, and as a result, it is possible to have particularly excellent glossy appearance for the printing part of the recording material 10. When the first ink 2' includes metal powder, in the first layer formed using the first ink 2', that metal powder does not have to be arranged methodically as with the metal powder 31 in the second layer 3 described in detail later. This is because the metal powder in the first layer 2 exhibits nothing more than the function of doing a supplementary increase in the glossy appearance of the overall printing part, and the metal powder 31 in the second layer 3 is predominant for the glossy appearance of the overall printing part.

The photopolymerization initiator is not particularly limited as long as it can generate an active species such as radical, cation, or the like by the irradiation of ultraviolet light and it can start the polymerization reaction of the polymerized compound noted above (first polymerized compound). As a photopolymerization initiator, a photo-radical polymerization initiator or a photo-cation polymerization initiator can be used, but it is preferable to use the photo-radical polymerization initiator. When the photopolymerization initiator is used, it is preferable that the photopolymerization initiator have an absorption peak in the ultraviolet range.

Examples of the photo-radical polymerization initiator include aromatic ketones, acyl phosphine oxide compounds, aromatic onium salt compounds, organic peroxides, thio compounds (thioxanthone compounds, and thiophenyl group-containing compounds), hexaarylbiimidazole compounds, ketoxime ester compounds, borate compounds, azinium compounds, metallocene compounds, active ester compounds, compounds having a carbon-halogen bond, alkylamine compounds, or the like.

Among these, in view of resolvability in the polymerized compound (first polymerized compound) and hardenability, it is preferable to have at least one type selected from acyl phosphine oxide compound and thioxanthone compound, and it is more preferable to combine acyl phosphine oxide compound and thioxanthone compound.

Concrete examples of the photo-radical polymerization initiator include acetophenone, acetophenone benzyl ketal, 1-hydroxy cyclohexyl phenyl ketone, 2,2-dimethoxy-2-phenylacetophenone, xanthone, fluorenone, benzaldehyde, fluorene, anthraquinone, triphenylamine, carbazole, 3-methylaceto phenone, 4-chlorobenzophenone, 4,4'-dimethoxybenzophenone, 4,4'-diamino benzophenone, Michler's ketone, benzoin propyl ether, benzoin ethyl ether, benzyl dimethyl ketal, 1-(4-isopropyl-phenyl)-2-hydroxy-2-methylpropane-1-one, 2-hydroxy-2-methyl-1-phenylpropan-1-one, thioxanthone, diethyl thioxanthone, 2-isopropylthioxanthone, 2-chlorothioxanthone, 2-methyl-1-[4-(methylthio)phenyl]-2-morpholino-propan-1-one, bis (2,4,6-trimethyl benzoyl)-phenyl phosphine oxide, 2,4,6-trimethylbenzoyl-diphenyl-phosphine oxide, 2,4-diethyloxan, and bis (2,6-dimethylbenzoyl)-2,4,4-trimethylpentyl phosphine oxide, or the like, and it is possible to select one type or two or more types of compounds from among these and use them in combination.

The content rate of the photopolymerization initiator in the first ink 2' is preferably 0.5 mass % or more and 10 mass % or less. When the content rate of the photopolymerization initiator is in the range noted above, the ultraviolet curing speed is sufficiently high, and in addition, there are almost no remains of melted photopolymerization initiator or coloration caused by the photopolymerization initiator.

The first ink 2' can include a polymerization inhibitor, but even when it includes a polymerization inhibitor, it is preferable that the content rate of the polymerization inhibitor in the first ink 2' be 0.6 mass % or less, and more preferably 0.2 mass % or less. By doing this, it is possible to have an item that has a relatively high content rate of the first polymerized compound 21' in the first ink 2', so it is possible to have particularly excellent adhesiveness of the first layer 2 formed using the first ink 2' in relation to the base material 1.

Also, the first ink 2' can include a dispersant and a substance A described in detail later as constituent components of the second ink 3'. By doing this, the same effects as those described in detail later can be obtained.

Also, it is preferable that the first ink 2' not include an organic solvent that is removed (vaporized) in the production process of the recording material 10. Because of this, an occurrence of the VOC (volatile organic compound) problem can be effectively prevented.

Also, the first ink 2' preferably includes shared components with the second ink 3' described in detail later (particularly items having the same composition as the polymerized compound), and more preferably is an item including the same composition as the second ink 3'. By doing this, it is easier to do the setting, adjustment and the like of the discharge conditions of the ink (first ink 2' and second ink 3') using the inkjet method. Also, it is possible to have particularly excellent affinity of the first layer 2 formed using the first ink 2' with the second ink 3', so it is possible to more effectively prevent unintended wetting and spreading or the like of the second ink 3', and possible to more reliably form the second layer 3 selectively in the area on which the first layer 2 is formed. As a result it is possible to more easily and more reliably have a high precision printing part. Also, with the finally obtained recording material 10, it is possible to have an item that is particularly excellent in terms of adhesiveness between the first layer 2 formed using the first ink 2' and the second layer 3 formed using the second ink 3', and possible to have particularly excellent durability and reliability for the recording material 10.

The contact angle of the first ink 2' to the base material 1 is preferably 30 degrees or greater and 85 degrees or less, more preferably 35 degrees or greater and 80 degrees or less, and even more preferably 40 degrees or greater and 75 degrees or less. By doing this, with appropriately excellent affinity of the first ink 2' to the base material 1, while having particularly excellent adhesiveness of the first layer 2 formed on the base material 1 with a later step, it is possible to more reliably prevent having more wetting and spreading than necessary or the like of the first ink 2' on the base material 1, and to have the first layer 2 more reliably have the desired shape. With the invention, as the "contact angle to the base material," it is possible to use a contact angle in relation to the base material of ink at 25° C. measured in conformance with the θ/2 method.

The viscosity of the first ink 2' at room temperature (25° C.) is preferably 4 mPa·s or greater and 40 mPa·s or less, and more preferably 6 mPa·s or greater and 30 mPa·s or less. By doing this, while having particularly excellent discharge stability for the first ink 2', it is possible to more effectively inhibit bleeding of the first ink 2' when droplets land, and possible to more reliably harden the first ink 2' droplets to the desired shape. With the invention, the viscosity of the first ink (also the same for the second ink) can be measured in compliance with JIS Z88009 using a vibration type viscometer.

The surface tension of the first ink 2' at 25° C. is preferably 14 mN/m or greater and 50 mN/m or less. By doing this, while having particularly excellent discharge stability for the first ink 2', it is possible to more effectively inhibit bleeding of the first ink 2' when the droplets land, and possible to more reliably harden the first ink 2' droplets to the desired shape. With the invention, the surface tension of the first ink (also the same for the second ink) can be measured in compliance with JIS K 3362.

As a droplet discharge method (inkjet method), a piezo method or a method that discharges ink using bubbles generated by heating ink or the like can be used, but from the viewpoint of the difficulty of making property changes in the constituent components of the ink and the like, the piezo method is preferable.

A publicly known droplet discharge device can be used for performing the discharging of the ink using the inkjet method.

The discharged volume per unit surface area of the first ink 2' on the area to which the first ink 2' is applied with this step (the area on which the first layer 2 is formed) is preferably 2.0 g/m$^2$ or greater and 20.0 g/m$^2$ or less. By having the discharged volume of the first ink 2' be a value within the range noted above, it is possible to reliably form the first layer 2 in the desired shape at a later step, and at an even later step, it is possible to have that first layer 2 reliably exhibit a function as a scaffold when forming the second layer 3. As a result, it is possible to reliably produce the recording material 10 for which the printing part having an excellent glossy appearance (shiny appearance) such as that of a mirror surface is provided with good precision.

In contrast to this, when the discharged volume of the first ink 2' is less than the lower limit noted above, and when it exceeds the upper limit noted above, the first layer 2 obtained by curing the first ink 2' cannot sufficiently exhibit the function as a scaffold when forming the second layer 3 as described previously, and it is not possible to obtain the recording material 10 for which the printing part having an excellent glossy appearance like a mirror surface (shiny appearance) is provided with good precision.

As noted above, it is acceptable for the discharged volume per unit surface area of the first ink 2' on the area to which the first ink 2' is applied (the area on which the first layer 2 is formed) to be 2.0 g/m$^2$ or greater and 20.0 g/m$^2$ or less, but it is preferable to be 3.0 g/m$^2$ or greater and 18.0 g/m$^2$ or less, and more preferably 5.0 g/m$^2$ or greater and 16.0 g/m$^2$ or less. By doing this, the kind of effects described above are more markedly exhibited.

The droplet volume of the first ink 2' discharged by one discharge operation using the inkjet method is preferably 3 ng or greater and 30 ng or less, more preferably 5 ng or greater and 25 ng or less, and even more preferably 7 ng or greater and 20 ng or less. By doing this, it is possible to more reliably form the first layer 2 of the desired shape at a later step, and at even later steps, it is possible to more effectively exhibit the function as the scaffold when forming the second layer 3 on that first layer 2, and as a result, it is possible to more reliably produce the recording material 10 for which the printing part having an excellent glossy appearance like a mirror surface (shiny appearance) is provided with good precision, and it is possible to have particularly excellent productivity for the recording material 10.

In contrast to this, when the droplet volume of the first ink 2' discharged by one discharge operation using the inkjet method is less than the lower limit noted above, the productivity of the recording material 10 decreases. Also, when the droplet volume of the first ink 2' discharged by one discharge operation using the inkjet method exceeds the upper limit noted above, due to the composition of the first ink 2' and the like, it is difficult to have the first layer 2 have the desired shape, it is difficult for the first layer 2' obtained by curing the first ink 2' to exhibit the function as the scaffold when forming the second layer 3 as described previously, and it is possible that it will be difficult for the printing part that the finally obtained recording material 10 has to have a sufficiently excellent shiny appearance (excellent glossy appearance such as a mirror surface), or sufficiently excellent precision.

First Curing Step

Figure 1B:
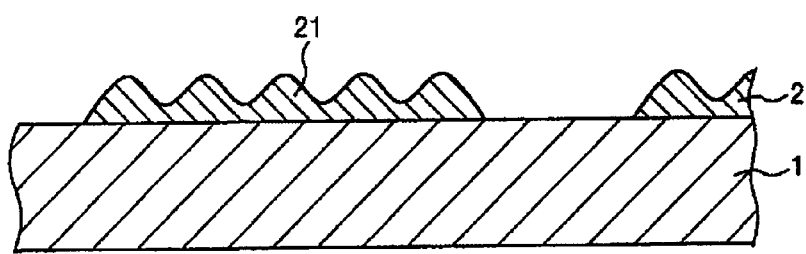

Next, by irradiating ultraviolet light, the first polymerized compound 21' is polymerized and cured (FIG. 1B). By doing this, the first layer 2 is formed constituted by a material including the hardened material 21 of the first polymerized compound 21'.

This step is performed to satisfy the conditions noted hereafter. Specifically, after the first ink 2' droplets land on the base material 1 with the first ink applying step described previously, this is performed so that the time until the ultraviolet light is irradiated on those droplets with this step is 0.001 seconds or more and 1.0 second or less. In this way, by implementing the curing process for a sufficiently short time after landing of the first ink 2' droplets, it is possible to reliably prevent having the droplets of the first ink 2' be wetted and spread more than necessary on the base material 1, possible to reliably have the hardened material 21' (first layer 2) of the first polymerized compound 21' have the desired shape at the desired site, and to reliably have excellent adhesiveness of the base material 1 and the hardened material 21 (first layer 2). As a result, it is possible to suitably arrange the metal powder 31 in the second layer 3 while the second layer 3 formed using the second ink 3' with a step described in detail later reliably has the desired shape. As a result, it is possible to reliably obtain the recording material 10 equipped with the printing part having an excellent glossy appearance like a mirror surface (shiny appearance). In particular, it is possible to stably obtain the kinds of effects described above for various types of base material 1.

In contrast to this, when the time from when the droplets of the first ink 2' land on the base material 1 at the first ink applying step until irradiation of the ultraviolet light on those droplets with this step is less than the lower limit noted above, the adhesiveness between the base material 1 and the hardened material 21 (first layer 2) decreases, and the defective product rate increases due to progression of the curing reaction before landing of the droplets of the first ink 2' on the base material 1. Also, when the time from when the droplets of the first ink 2' land on the base material 1 with the first ink applying step until irradiation of the ultraviolet light on those droplets with this step exceeds the upper limit noted above, depending on the type of base material 1, due to the first ink 2' excessively wetting and spreading on the base material 1, or the first ink 2' applied on the base material 1 being repelled, it is difficult to form the first layer 2 having the desired shape with good precision.

As described above, after the droplets of the first ink 2' land on the base material 1 with the first ink applying step, the time until irradiation of the ultraviolet light on those droplets with this step can be 0.0010 seconds or greater and 1.0 second or less, but is preferably 0.005 seconds or greater and 0.8 seconds or less, and more preferably 0.008 seconds or greater and 0.5 seconds or less. By doing this, the effects described above are more markedly exhibited.

Also, with this step, the time from when irradiation of ultraviolet light on droplets of the first ink 2' starts until the level of curing of the first polymerized compound 21' included in those droplets reaches 90% is preferably 0.5 seconds or less, more preferably 0.3 seconds or less, and even more preferably 0.2 seconds or less. In this way, by the curing reaction advancing in a sufficiently short time, it is possible to more reliably prevent unintended deformation of the hardened material 21 (first layer 2).

Measurement of the level of curing can be performed using various devices such as the DSC-60 (made by Shimadzu Corporation), for example.

As a source of the ultraviolet light, for example, a mercury lamp, a metal halide lamp, an ultraviolet light emitting diode (UV-LED), an ultraviolet laser diode (UV-LD) or the like can be used. Among these, from the viewpoint of compact size, long life, high efficiency, and low cost, the ultraviolet light emitting diode (UV-LED) and the ultraviolet laser diode (UV-LD) are preferable.

The surface roughness Ra of the first layer 2 formed with this step is preferably 3.0 µm or greater and 100 µm or less, more preferably 5.0 mm or greater and 50 µm or less, and even more preferably 12.0 µm or greater and 30 µm or less. By doing this, it is possible to more effectively exhibit the function as a scaffold when forming the second layer 3 as described previously. With the invention, the surface roughness Ra means the value measured in compliance with JIS B 0601.

Second Ink Applying Step

Figure 1C:
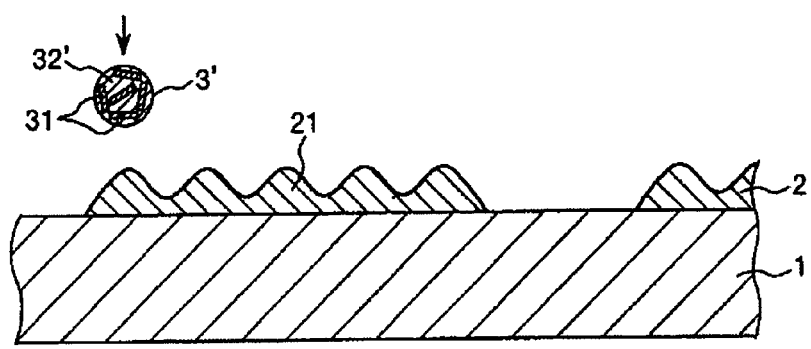

Next, the second ink 3' is applied on the first layer 2 (area on which the first layer 2 is formed) using the inkjet method (FIG. 1C).

The second ink 3' includes the metal powder 31 and the second polymerized compound 32' polymerized by irradiating ultraviolet light.

By including the metal powder 31, it is possible to have excellent glossy appearance of the printing part of the finally obtained recording material 10.

The discharged volume of the second ink 3' per unit surface area in the area noted above is 80 volume % or greater and 200 volume % or less in relation to the discharged volume of the first ink 2'. By doing this, the second ink 3' can selectively cover the inside of the area without a gap, and the second layer 3 formed with the second curing step described in detail later can be formed with good precision selectively at desired sites (formed as an item selectively covering the inside of the area without a gap), and to have excellent glossy appearance (shiny appearance) with the surface being flat.

In contrast to this, when the discharged volume of the second ink 3' per unit surface area in the area noted above is less than the lower limit noted above, it is difficult to have the surface of the second layer 3 obtained by curing the second ink 3' be sufficiently smooth, and it is not possible to obtain the shiny, glossy appearance that a mirror surface has (shiny appearance). Also, when the discharged volume of the second ink 3' per unit surface area in the area noted above exceeds the upper limit noted above, it is difficult to keep the second ink 3' in the area noted above, and the second ink 3' protrudes to outside the range noted above, so it is not possible to form the printing part with a high level of precision.

As described above, the discharged volume of the second ink 3' per unit surface area in the area noted above is acceptable if it is 80 volume % or greater and 200 volume % or less in relation to the discharged volume of the first ink 2', but it is preferably 90 volume % or greater and 190 volume % or less in relation to the discharged volume of the first ink 2', and more preferably 100 volume % or greater and 180 volume % or less in relation to the discharged volume of the first ink 2'. By doing this, the effects such as those described above are exhibited more markedly.

As a specific value for the discharged volume of the second ink 3' per unit surface area in the area noted above, it is preferable to be 5.0 g/m$^2$ or greater and 30.0 g/m$^2$ or less. By doing this, the kinds of effects described above are exhibited more markedly.

The droplet volume of the second ink 3' discharged by one discharge operation using the inkjet method is preferably 3 ng or greater and 30 ng or less, more preferably 5 ng or greater and 25 ng or less, and even more preferably 7 ng or greater and 20 ng or less. By doing this, skewing of the landing position of the second ink 3' and excessive wetting and spreading and the like are more reliably prevented, and while having particularly excellent precision of the printing part that the finally obtained recording material 10 has, it is possible to have particularly excellent productivity of the recording material 10.

The second polymerized compound 32' is polymerized and cured with the second curing step described in detail later, to form the hardened material 32.

The metal powder 31 is constituted with a plurality of particles. The constituent particles of the metal powder 31 (the mother particles of the metal powder 31 when the surface processing described in detail later is implemented; same hereafter) can have at least near the surface constituted using a metal material, and for example the entirety can be constituted using a metal material, and the constitution can also be such that the surface of a base part constituted using a non-metal material is covered by a layer constituted using the metal material.

Also, as the metal material constituting the metal powder 31, it is possible to use a metal by itself or various alloys or the like, but the constituent particles of the metal powder 31 are preferably constituted with mainly Al at least near the surface. By doing this, it is possible to have particularly excellent glossy appearance of the printing part (in particular, the glossy appearance such as that a mirror surface has (shiny appearance)). Also, when the constituent particles of the metal powder 31 are constituted mainly of Al at least near the surface, in the case of an item for which surface process like that described in detail later is implemented (when the item has mother particles for which the particles constituting the metal powder 31 are constituted mainly of Al at least near the surface, and a layer using a surface preparation agent covering that), the effect by implementing the surface processing using the kind of surface preparation agent described in detail later is exhibited more markedly. With this specification, "mainly" can be an item for which the content rate among the overall constituent components of the subject site is naturally high, and preferably the content rate at the subject site is 50 mass % or greater, more preferably 80 mass % or greater, and even more preferably 95 mass % or greater.

Also, the metal powder 31 can be produced by any method, but it is preferable to obtain it by forming a film constituted by a metal material using the vapor deposition method, and after that, by pulverizing that film. By doing this, it is possible to more effectively express the glossy appearance or the like that the metal material has naturally. It is also possible to inhibit variation of characteristics between particles. Also, by using this method, even a relatively thin metal powder 31 can be suitably produced.

When the metal powder 31 is produced using this type of method, for example, by performing the formation of film (film formation) constituted by a metal material on the base material, it is possible to suitably produce the metal powder 31. As the base material, for example, a plastic film or the like such as polyethylene terephthalate or the like can be used. Also, the base material can also have a parting agent layer on the film forming surface (e.g. a parting agent layer constituted using a polymeric parting agent).

Also, it is preferable that the pulverizing is performed in a liquid by applying ultrasonic vibration to the film. By doing this, it is possible to easily and reliably obtain metal powder 31 with the kind of particle diameter described later, and possible to suppress the occurrence of variations in size, shape, and characteristics between the particles.

Also, when performing pulverization with the above described method, as the liquid, it is possible to suitably use alcohols such as methanol, ethanol, propanol, butanol or the like, carbon hydride compounds such as n-heptane, n-octane, decane, dodecane, tetra-decane, toluene, xylene, cymene, durene, indene, dipentene, tetrahydronaphthalene, decahydronaphthalene, cyclohexylebenzene or the like, ether compounds such as ethyl glycol dimethyl ether, ethylene glycol diethyl ether, ethylene glycol methylethyl ether, diethylene glycol dimethyl ether, diethylene glycol diethyl ether, diethylene glycol methylethyl ether, diethylene glycol monobutyl ether acetate, diethylene glycol n-butyl ether, tripropylene glycol dimethyl ether, triethylene glycol ethyl ether, 1,2-dimethoxyethane, bis(2-methoxyethyl) ether, p-dioxane or the like, and polar compounds such as propylene carbonate, γ-butyrolactone, N-methyl-2-pyrolidone, N, N-dimethyl formamide (DMF), N, N-dimethyl acetamide (DMA), dimethyl sulfoxide, cyclohexanone, acetonitrile or the like. By using this type of liquid, while preventing unintended oxidation or the like of the metal powder 31, it is possible to have particularly excellent productivity of the metal powder 31, and to have particularly low variation of size, shape, and characteristics between the particles.

The shape of the constituent particles of the metal powder 31 can be any shape, such as a spherical shape, spindle shape, needle-shape, or the like, but it is preferable to be a scale like-shape. By doing this, the metal powder 31 can be arranged so that the metal particle main surface follows the surface shape of the second layer 3, so it is possible to more effectively exhibit the glossy appearance or the like that the metal material constituting the metal powder 31 has naturally on the recording material 10, it is possible to have a particularly excellent glossy appearance of the printing part (particularly the glossy appearance such as that a mirror surface has (shiny appearance)) and high class appearance, and possible to have particularly excellent abrasion resistance for the recording material 10.

With the invention, the scale-like shape means that, as with flat plate shapes, curved plate shapes and the like, a surface area when observed from a designated angle (as viewed in a planar view) has a bigger shape than a surface area as observed in a direction perpendicular to that observation direction, and specifically, the ratio ($S_1/S_0$) for the surface area $S_1$ [μm$^2$] when the projected area is observed from the direction at which it is maximum (when with a planar view), and the surface area $S_0$ [μm$^2$] when the projected area is observed from the direction at which the surface area is a maximum when observing among directions orthogonal to that observed direction is preferably 2 or greater, more preferably 5 or greater, and even more preferably 8 or greater. For example, this value can be obtained by performing the observation for any 10 particles and averaging the calculated values for these particles.

When the constituent particles of the metal powder 31 have a scale-like shape, the average thickness of the constituent particles is preferably 10 nm or greater and 100 nm or less, and more preferably 20 nm or greater and 80 nm or less. By doing this, the effect of the particles like those described having a scale-like shape is exhibited more markedly.

The average particle diameter of the metal powder 31 is preferably 500 nm or greater and 3.0 μm or less, and more preferably 800 nm or greater and 2.5 μm or less. By doing this, the glossy appearance (shiny appearance) of the printing part and the high class appearance are even more excellent. It is also possible to have even more excellent storage stability and discharge stability of the second ink 3'. With this specification, "average particle diameter" indicates the average particle diameter of the volume standard (volume average particle diameter ($D_{50}$)). As the measuring device, an example is the laser analysis dispersion type particle size analyzer Microtrac S3000 (made by Nikkiso Co., Ltd.).

Also, the maximum particle diameter of the metal powder 31 is preferably 5 μm or less, and more preferably 4.5 μm or less. By doing this, it is possible to have even more excellent storage stability and discharge stability for the second ink 3'.

Also, the constituent particles of the metal powder 31 (metal particles) can have surface processing implemented. By doing this, it is possible to effectively prevent gelation or the like of the second ink 3', and possible to have particularly excellent storage stability of the second ink 3' and discharge stability of the second ink 3'. Also, by including metal particles on which surface processing was implemented, while having excellent storage stability and the like of the second ink 3', it is possible later to suitably adjust the affinity between the dispersion medium (second polymerized compound 32' or the like) with the metal powder 31 (dispersoid) at the second ink applying step described above, possible to suitably arrange the metal powder 31 in the printing part of the recording material 10, and possible to have particularly excellent glossy appearance (shiny appearance) of the printing part.

The surface processing agent used for the surface processing noted above is not particularly limited, and examples include alkyl phosphate ester, higher fatty acid, fluorine based silane compound, fluorine based phosphate ester, fluorine based fatty acid, isocyanate compound, silane coupling agent, fatty acid metal salt, unsaturated organic acid, organic titanate, organic aluminate, resin acid, polyethyleneglycol and the like.

Among these, for the second ink 3', as the metal powder 31, it is preferable to include an item surface processed by one type or two or more types of the surface preparation agent selected from the group consisting of fluorine based silane compound, fluorine based phosphate ester, fluorine based fatty acid, and isocyanate compound. By doing this, it is possible to have particularly excellent storage stability for the second ink 3', and particularly excellent glossy appearance (shiny appearance) and abrasion resistance of the printing part of the recording material 10.

Following, among the surface preparation agents, we will give a detailed description of the fluorine based silane compound, fluorine based phosphate ester, fluorine based fatty acid, isocyanate compound, and alkyl phosphate ester.

First, among the surface preparation agents, we will give a detailed description of the fluorine based silane compound.

As the fluorine based silane compound, a silane compound having at least one fluorine atom within a molecule can be used.

Specifically, it is preferred that the fluorine based silane compound as the surface preparation agent has the chemical formula shown in formula (1) below.

$$R^1 SiX^1_a R^2_{(3-a)} \qquad (1)$$

(In formula (1), $R^1$ represents a hydrocarbon group in which a part or all of the hydrogen atoms are substituted by fluorine atoms, $X^1$ represents a hydrolysis group, ether group, chloro group or hydroxyl group, $R^2$ represents an alkyl group having a carbon number 1 to 4, and a represents an integer of 1 to 3.)

Because of this, the second ink 3' can be provided with particularly excellent storage stability, and the printing part of the recording material 10 can be provided with excellent glossy appearance (shiny appearance) and excellent abrasion resistance.

As $R^1$ in formula (1), examples include an alkyl group, alkenyl group, aryl group, or aralkyl group for which a part or all of the hydrogen atoms are substituted by fluorine atoms, and furthermore, at least a part of the hydrogen atoms (hydrogen atoms which are not substituted by fluorine atoms) included in the molecular configuration can be substituted by an amino group, carboxyl group, hydroxyl group, thiol group or the like, and hetero atoms or an aromatic ring of benzene or the like such as —O—, —S—, —NH—, —N= or the like can be sandwiched in a carbon chain. Concrete examples of $R^1$ include a phenyl group, benzyl group, phenethyl group, hydroxyphenyl group, chlorophenyl group, aminophenyl group, naphthyl group, anthranil group, pyrenyl group, thienyl group, pyrrolyl group, cyclohexyl group, cyclohexenyl group, cyclopentyl group, cyclopentenyl group, pyridinyl group, methyl group, ethyl group, n-propyl group, isopropyl group, n-butyl group, isobutyl group, sec-butyl group, tert-butyl group, octadecyl group, n-octyl group, chloromethyl group, methoxyethyl group, hydroxyethyl group, aminoethyl group, cyano group, mercaptopropyl group, vinyl group, allyl group, acryloxyethyl group, methacryloxyethyl group, glycidoxypropyl group, or acetoxy group for which a part or all of hydrogen atoms are substituted by fluorine atoms.

Concrete examples of the fluorine based silane compound shown in formula (1) are compounds having a constitution for which a part or all of the hydrogen atoms in a silane compound are substituted by fluorine atoms, the silane compounds including dimethyl dimethoxy silane, diethyl diethoxy silane, 1-propenyl methyl dichlorosilane, propyl dimethyl chlorosilane, propylmethyl dichlorosilane, propyl trichlorosilane, propyl triethoxysilane, propyl trimethoxysilane, styrylethyl trimethoxysilane, tetradecyl trichlorosilane, 3-thiocyanate propyl triethoxysilane, p-tolyl dimethylchlorosilane, p-tolyl methyl dichlorosilane, p-tolyl trichlorosilane, p-tolyl trimethoxysilane, p-tolyl triethoxysilane, di-n-propyl di-n-propoxysilane, diisopropyl di-isopropoxysilane, di-n-butyl di-n-butyloxysilane, di-sec-butyl di-sec-butyloxysilane, di-t-butyl di-t-butyloxysilane, octadecyltrichlorosilane, octadecyl methyl diethoxy silane, octadecyl triethoxysilane, octadecyl trimethoxysilane, octadecyl dimethylchlorosilane, octadecyl methyl dichlorosilane, octadecyl methoxy dichlorosilane, 7-octenyl dimethylchlorosilane, 7-octenyl trichlorosilane, 7-octenyl trimethoxysilane, octyl methyl dichlorosilane, octyl dimethyl chlorosilane, octyl trichlorosilane, 10-undecenyl dimethylchlorosilane, undecyl trichlorosilane, vinyl dimethyl chlorosilane, methyl octadecyl dimethoxysilane, methyl dodecyl diethoxysilane, methyl octadecyl dimethoxysilane, methyl octadecyl diethoxy silane, n-octyl methyl dimethoxy silane, n-octyl methyl diethoxy silane, triancotil dimethylchlorosilane, triancotil trichlorosilane, methyl trimethoxysilane, methyl triethoxysilane, methyltri-n-propoxysilane, methyl iso-propoxysilane, methyl-n-butyloxysilane, methyltri-sec-butyloxysilane, methyltri-t-butyloxysilane, ethyl trimethoxysilane, ethyl triethoxysilane, ethyl tri-n-propoxysilane, ethyl isopropoxysilane, ethyl-n-butyloxysilane, ethyl tri-sec-butyloxysilane, ethyl tri-t-butyloxysilane, n-propyl trimethoxysilane, isobutyl trimethoxysilane, n-hexyl trimethoxy silane, hexadecyl trimethoxysilane, n-octyl trimethoxysilane, n-dodecyl trimethoxy silane, n-octadecyl trimethoxysilane, n-propyl triethoxysilane, isobutyl triethoxysilane, n-hexyl triethoxysilane, hexadecyl triethoxysilane, n-octyl triethoxysilane, n-dodecyl trimethoxysilane, n-octadecyl triethoxysilane, 2-[2-(trichlorosilyl) ethyl]pyridine, 4-[2-(trichlorosilyl) ethyl]pyridine, diphenyl dimethoxysilane, diphenyl diethoxysilane, 1,3-(trichlorosilyl methyl) heptacosane, dibenzyl dimethoxysilane, dibenzyl diethoxy silane, phenyl trimethoxysilane, phenyl methyl dimethoxy silane, phenyl dimethyl methoxysilane, phenyl dimethoxysilane, phenyl diethoxysilane, phenyl methyl diethoxysilane, phenyl dimethyl ethoxysilane, benzyl triethoxysilane, benzyl trimethoxysilane, benzyl methyl dimethoxy silane, benzyl dimethyl methoxysilane, benzyl dimethoxysilane, benzyl diethoxysilane, benzyl methyl diethoxysilane, benzyl dimethyl ethoxylsilane, benzyl triethoxysilane, dibenzyl dimethoxysilane, dibenzyl diethoxysilane, 3-acetoxypropyl trimethoxysilane, 3-acryloxypropyl trimethoxysilane, allyl trimethoxysilane, allyl triethoxysilane, 4-aminobutyl triethoxysilane, (amino ethyl amino methyl) phenethyl trimethoxysilane, N-(2-aminoethyl)-3-aminopropylmethyl dimethoxysilane, N-(2-aminoethyl)-3-aminopropyl trimethoxysilane, 6-(aminohexyl aminopropyl) trimethoxysilane, p-aminophenyl trimethoxysilane, p-aminophenyl ethoxysilane, m-aminophenyl trimethoxysilane, m-aminophenyl ethoxysilane, 3-aminopropyl trimethoxysilane, 3-aminopropyl triethoxysilane, ω-aminoundecyl trimethoxysilane, amyl triethoxysilane, benzoxazocinepine dimethyl ester, 5-(bicyclo heptenyl) triethoxysilane, bis (2-hydroxyethyl)-3-aminopropyl triethoxysilane, 8-bromooctyl trimethoxysilane, bromophenyl trimethoxysilane, 3-bromopropyl trimethoxysilane, n-butyl trimethoxysilane, 2-chloromethyl triethoxysilane, chloromethyl methyl diethoxysilane, chloromethyl methyl diisopropoxysilane, p-(chloromethyl) phenyl trimethoxysilane, chloromethyl triethoxysilane, chlorophenyl triethoxysilane, 3-chloropropyl methyl dimethoxysilane, 3-chloropropyl triethoxysilane, 3-chloropropyl trimethoxysilane, 2-(4-chlorosulfonyl phenyl) ethyl trimethoxysilane, 2-cyanoethyl triethoxysilane, 2-cyanoethyl trimethoxysilane, cyanomethyl phenethyl triethoxysilane, 3-cyanopropyl triethoxysilane, 2-(3-cyclohexenyl) ethyl trimethoxysilane, 2-(3-cyclohexenyl) ethyl triethoxysilane, 3-cyclohexenyl trichlorosilane, 2-(3-cyclohexenyl) ethyl trichlorosilane, 2-(3-cyclohexenyl)

ethyl dimethyl chlorosilane, 2-(3-cyclohexenyl) ethyl methyl dichlorosilane, cyclohexyl dimethylchlorosilane, cyclohexyl ethyl dimethoxysilane, cyclohexyl methyl dichlorosilane, cyclohexyl methyl dimethoxysilane, (cyclohexyl methyl) trichlorosilane, cyclohexyl trichlorosilane, cyclohexyl trimethoxysilane, cyclooctyl trichlorosilane, (4-cyclooctenyl) trichlorosilane, cyclopentyl trichlorosilane, cyclopentyl trimethoxysilane, 1,1-diethoxy-1-Silacyclopenta-3-ene, 3-(2,4-dinitrophenyl amino) propyl triethoxysilane, (dimethyl chlorosilyl) methyl-7,7-dimethyl amino lupinane, (cyclohexyl aminomethyl) methyl diethoxysilane, (3-cyclopenta dienylpropyl) triethoxysilane, N, N-diethyl-3-aminopropyl) trimethoxysilane, 2-(3,4-epoxycyclohexyl) ethyltrimethoxysilane, 2-(3,4-epoxycyclohexyl) ethyl triethoxysilane, (furfuryl oxymethyl) triethoxysilane, 2-hydroxy-4-(3-tri-ethoxy propoxy) diphenyl ketone, 3-(p-methoxyphenyl) propyl methyl dichlorosilane, 3-(p-methoxyphenyl) propyl trichlorosilane, p-(methylphenethyl) methyl dichlorosilane, p-(methylphenethyl) trichlorosilane, p-(methylphenethyl) dimethylchlorosilane, 3-morpholinopropyl trimethoxysilane, (3-glycidoxypropyl) methyldiethoxysilane, 3-glycidoxypropyl trimethoxysilane, 1,2,3,4,7,7-hexachloro-6-methyldiethoxysilyl-2-norbornene, 1,2,3,4,7,7-hexachloro-6-triethoxysilyl-2-norbornene, 3-iodine propyl trimethoxysilane, 3-isocyanate propyl triethoxysilane, (mercaptomethyl) methyldiethoxysilane, 3-mercaptopropyl methyldimethoxy silane, 3-mercaptopropyl dimethoxysilane, 3-mercaptopropyl triethoxysilane, 3-methacryloxypropyl methyldiethoxysilane, 3-methacryloxypropyl trimethoxysilane, methyl-{2-(3-trimethoxysilyl propylamino) ethylamino}-3-propionate, 7-octenyl trimethoxysilane, R—N-α-phenethyl-N'-triethoxysilyl propyl urea, S—N-α-phenethyl-N'-triethoxysilyl propyl urea, phenethyl trimethoxysilane, phenethyl methyl dimethoxysilane, phenethyl dimethylsilane, phenethyl dimethoxysilane, phenethyl diethoxysilane, phenethyl methyl diethoxy silane, phenethyl dimethylethoxysilane, phenethyl triethoxysilane, (3-phenylpropyl) dimethylchlorosilane, (3-phenylpropyl) methyldichlorosilane, N-phenyl aminopropyl trimethoxysilane, N-(triethoxysilylpropyl) dansylamide, N-(3-triethoxysilylpropyl)-4,5-dihydroimidazole, 2-(triethoxysilylethyl)-5-(chloroacetoxy) bicycloheptane, (S)—N-triethoxysilylpropyl-O-menthocarbamate, 3-(triethoxysilylpropyl)-p-nitro-benzamide, 3-(triethoxysilyl) propyl succinate anhydride, N-[5-(trimethoxysilyl)-2-aza-1-oxo-pentyl]caprolactam,
2-(trimethoxysilylethyl) pyridine, N-(trimethoxysilylethyl) benzyl-N, N, N-trimethyl ammonium chloride, phenyl vinyl diethoxysilane, 3-thiocyanate propyltriethoxysilane, N—{3 acid (triethoxysilyl) propyl}phthalamic acid, 1-trimethoxysilyl-2-(chloromethyl) phenyl ethane, 2-(trimethoxysilyl) ethyl phenyl sulfonyl azide, β-trimethoxy silylethyl-2-pyridine, trimethoxysilylpropyl diethylene triamine, N-(3-trimethoxysilylpropyl) pyrrole, N-trimethoxysilylpropyl-N, N, N-tri-butyl ammonium bromide, N-trimethoxysilylpropyl-N, N, N-tributyl ammonium chloride, N-trimethoxysilylpropyl-N, N, N-trimethylammonium chloride, vinyl methyl diethoxysilane, vinyl triethoxysilane, vinyl trimethoxysilane, vinyl methyl dimethoxysilane, vinyl dimethyl methoxysilane, vinyl dimethyl ethoxysilane, vinyl methyl dichlorosilane, vinyl phenyl dichlorosilane, vinyl phenyl diethoxysilane, vinyl phenyl dimethylsilane, vinyl phenyl methyl chlorosilane, vinyl tri-phenoxysilane, vinyl tris-t-butoxysilane, adamantyl ethyl trichlorosilane, allyl phenyl trichlorosilane, (aminoethyl aminomethyl) phenethyl trimethoxysilane, 3-aminophenoxy dimethyl vinyl silane, phenyl trichlorosilane, phenyl dimethylchlorosilane, phenyl methyl dichlorosilane, benzyl trichloro silane, benzyl dimethyl chlorosilane, benzyl methyl dichlorosilane, phenethyl diisopropyl chlorosilane, phenethyl trichlorosilane, phenethyl dimethylchlorosilane, phenethyl methyldichlorosilane, 5-(bicyclo heptenyl) trichlorosilane, 5-(bicyclo heptenyl) triethoxy silane, 2-(bicyclo heptyl) dimethylchlorosilane, 2-(bicyclo heptyl) trichlorosilane, 1,4-bis (trimethoxysilylethyl) benzene, bromophenyl trichlorosilane, 3-phenoxypropyl dimethylchlorosilane, 3-phenoxypropyl trichlorosilane, t-butyl phenyl chlorosilane, t-butyl phenyl methoxysilane, t-butyl phenyl dichlorosilane, p-(t-butyl) phenethyl dimethylchlorosilane, p-(t-butyl) phenethyl trichlorosilane, 1,3-(dichloromethyl silylmethyl) heptacosane, ((chloromethyl) phenylethyl) dimethylchlorosilane, ((chloromethyl) phenylethyl) methyl dichlorosilane, ((chloromethyl) phenylethyl) trichlorosilane, ((chloromethyl) phenylethyl) trimethoxysilane, chlorophenyl trichlorosilane, 2-cyanoethyl trichlorosilane, 2-cyanoethyl methyl dichlorosilane, 3-cyanopropyl methyldiethoxysilane, 3-cyanopropyl methyl dichlorosilane, 3-cyanopropyl methyl dichlorosilane, 3-cyanopropyl dimethylethoxysilane, 3-cyanopropyl methyl dichlorosilane, 3-cyanopropyl trichlorosilane, or the like.

It is preferable that the fluorine based silane compound (surface preparation agent) have a perfluoroalkyl structure ($C_nF_{2n+1}$). By doing this, it is possible to have even more excellent storage stability for the second ink 3', and to have even more excellent glossy appearance (shiny appearance) and abrasion resistance of the printing part of the recording material 10.

As a fluorine based silane compound having a perfluoroalkyl structure ($C_nF_{2n+1}$), an example is shown in formula (4) below.

$$C_nF_{2n+1}(CH_2)_mSiX^1_aR^2_{(3-a)} \quad (4)$$

(In formula (4), $X^1$ represents a hydrolysis group, ether group, chloro group or hydroxyl group, $R^2$ represents an alkyl group having a carbon number from 1 to 4, n represents an integer from 1 to 14, m represents an integer from 2 to 6, and a represents an integer from 1 to 3.)

Concrete examples of the compounds having such a structure include $CF_3$—$CH_2CH_2$—$Si(OCH_3)_3$, $CF_3(CF_2)_3$—$CH_2CH_2$—$Si(OCH_3)_3$, $CF_3(CF_2)_5$—$CH_2CH_2$—$Si(OCH_3)_3$, $CF_3(CF_2)_5$—$CH_2CH_2$—$Si(OC_2H_5)_3$, $CF_3(CF_2)_7$—$CH_2CH_2$—$Si(OCH_3)_3$, $CF_3(CF_2)_{11}$—$CH_2CH_2$—$Si(OC_2H_5)_3$, $CF_3(CF_2)_3$—$CH_2CH_2$—$Si(CH_3)(OCH_3)_2$, $CF_3(CF_2)_7$—$CH_2CH_2$—$Si(CH_3)(OCH_3)_2$, $CF_3(CF_2)_8$—$CH_2CH_2$—$Si(CH_3)(OC_2H_5)_2$, $CF_3(CF_2)_8$—$CH_2CH_2$—$Si(C_2H_5)(OC_2H_5)_2$, or the like.

Also, as a fluorine based silane compound, it is also possible to use a perfluoroalkyl ether structure ($C_nF_{2n+1}O$) instead of perfluoroalkyl structure ($C_nF_{2n+1}$).

An example of a fluorine based silane compound having a perfluoroalkyl ether structure ($C_nF_{2n+1}O$) is shown in formula (5) below.

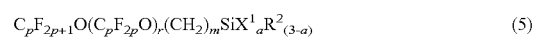

$$C_pF_{2p+1}O(C_pF_{2p}O)_r(CH_2)_mSiX^1_aR^2_{(3-a)} \quad (5)$$

(In formula (5), $X^1$ represents a hydrolysis group, ether group, chloro group or hydroxyl group, $R^2$ represents an alkyl group having a carbon number from 1 to 4, p represents an integer from 1 to 4, r represents an integer from 1 to 10, m represents an integer from 2 to 6, and a represents an integer from 1 to 3.)

Concrete examples of the compounds having such a structure include $CF_3O(CF_2O)_6$—$CH_2CH_2$—$Si(OC_2H_5)_3$, $CF_3O(C_3F_6O)_4$—$CH_2CH_2$—$Si(OCH_3)_3$, $CF_3O(C_3F_6O)_2(CF_2O)_3$—$CH_2CH_2$—$Si(OCH_3)_3$, $CF_3O(C_3F_6O)_8$—$CH_2CH_2$—$Si(OCH_3)_3$, $CF_3O(C_4F_9O)_5$—$CH_2CH_2$—$Si $(OCH_3)_3CF_3O(C_4F_9O)_5$—$CH_2CH_2$—$Si(CH_3)(OC_2H_5)_2$, $CF_3O(C_3F_6O)_4$—$CH_2CH_2$—$Si(C_2H_5)(OCH_3)_2$, or the like.

Next, among the surface preparation agents, we will give a detailed description of the fluorine based phosphate esters.

As the fluorine based phosphate ester, a phosphate ester having at least one fluorine atom within a molecule can be used.

Specifically, it is preferable that the fluorine based phosphate ester have the chemical formula shown in formula (2) below.

$$POR_n(OH)_{3-n} \quad (2)$$

(In formula (2), R represents $CF_3(CF_2)_m$—, $CF_3(CF_2)_m(CH_2)_l$—, $CF_3(CF_2)_m(CH_2O)_l$—, $CF_3(CF_2)_m(CH_2CH_2O)_l$—, $CF_3(CF_2)_mO$— or $CF_3(CF_2)_m(CH_2)_lO$—, n represents an integer from 1 to 3, m represents an integer from 2 to 18, and l represents an integer from 1 to 18.)

By doing this, it is possible to have particularly excellent storage stability for the second ink 3', and to have particularly excellent glossy appearance (shiny appearance) and abrasion resistance for the printing part of the recording material 10.

In formula (2), it is preferable that m be an integer between 3 to 14, but an integer between 4 to 12 is more preferable. By doing this, the effects noted above can be exhibited more markedly.

In addition, in formula (2), it is preferable that l be an integer from 1 to 14, but an integer from 1 to 10 is more preferable. By doing this, the effects noted above can be exhibited more markedly.

Also, it is preferable that the fluorine based phosphate ester (surface preparation agent) have the perfluoroalkyl structure ($C_nF_{2n+1}$). By doing this, it is possible to have even more excellent storage stability for the second ink 3', and more excellent glossy appearance (shiny appearance) and abrasion resistance for the printing part of the recording material 10.

Next, among the surface preparation agents, we will give a detailed description of the fluorine based fatty acids.

As fluorine based fatty acids, it is possible to used fatty acids having at least one fluorine atom within the molecule.

As fluorine based fatty acids, examples include $CF_3$—$CH_2CH_2$—$COOH$, $CF_3(CF_2)_3$—$CH_2CH_2$—$COOH$, $CF_3(CF_2)_5$—$CH_2CH_2$—$COOH$, $CF_3(CF_2)_6$—$CH_2CH_2$—$COOH$, $CF_3(CF_2)_7$—$CH_2CH_2$—$COOH$, $CF_3(CF_2)_9$—$CH_2CH_2$—$COOH$, but among these, $CF_3(CF_2)_5$—$CH_2CH_2$—$COOH$ is preferable. By doing this, a strong bond is formed with the metal atoms constituting the mother particles using a dehydration reaction by heating, and it is possible to form a dense film, so it is possible to effectively lower the particle surface energy.

Next, among the surface preparation agents, we will give a detailed description of isocynate compounds.

As isocyanate compounds, it is possible to use a compound having at least one isocyanate group in the molecule.

As the isocyanate compound, it is possible to use an item having the chemical structure expressed in formula (6) below.

$$RNCO \quad (6)$$

(In formula (6), R represents $CH_3(CH_2)_m$—, and m represents an integer from 2 to 18.)

By doing this, it is possible to have particularly excellent dispersion stability of the metal powder 31 in the second ink 3', and storage stability of the second ink 3'. Also, to improve the dispersion stability for various dispersion media, the breadth of selection is broad for dispersion media of the metal powder 31 in the second ink 3' (e.g. second polymerized compound 32'). It is also possible to have particularly excellent discharge stability of the second ink 3' using the inkjet method.

In formula (6), m is preferably an integer from 3 to 14, and more preferably an integer from 4 to 12. By doing this, the kinds of effects described above are exhibited more markedly.

Also, as the isocyanate compound, it is possible to use an item having the chemical structure represented by formula (7) below.

$$RfNCO \quad (7)$$

(In formula (7), Rf represents $CF_3(CF_2)_m$— or $CF_3(CF_2)_m(CH_2)_l$—, where m represents an integer from 2 to 18, and l represents an integer from 1 to 18.)

By doing this, it is possible to have particularly excellent storage stability for the second ink 3'. Also, with the recording material 10 produced using the second ink 3', it is possible to more suitably arrange the metal powder 31 near the outer surface of the second layer 3 (leafing), and to have particularly excellent glossy appearance (shiny appearance) of the printing part of the produced recording material 10. It is also possible to have particularly excellent abrasion resistance for the printing part of the produced recording material 10.

In formula (7), it is preferable that m be an integer from 3 to 14, but an integer from 4 to 12 is more preferable. By doing this, the kinds of effects described above can be more markedly exhibited.

In addition, in formula (7), it is preferable that l be an integer from 1 to 14, but an integer from 1 to 10 is more preferable. By doing this, the kinds of effects described above can be more markedly exhibited.

Next, among the surface preparation agents, we will give a detailed description of alkyl phosphate esters.

Alkyl phosphate esters are items having a structure for which at least a portion of the OH groups that the phosphate has is esterified by a functional group including an alkyl group ($C_nH_{2n+1}$—(where n is an integer of 1 or greater)).

The alkyl phosphate ester preferably has only C, H, P, and O as constituent elements. By doing this, it is possible to have particularly excellent glossy appearance (shiny appearance) and abrasion resistance of the finally obtained recording material 10, and possible to produce a recording material 10 that is less expensive than when using fluorine based phosphate esters or the like.

In particular, it is preferable that the alkyl phosphate ester have the chemical structure expressed in formula (3) below.

$$POR_n(OH)_{3-n} \quad (3)$$

(In formula (3), R represents $CH_3(CH_2)_m$—, $CH_3(CH_2)_m(CH_2O)_l$—, $CH_3(CH_2)_m(CH_2CH_2O)_l$— or $CH_3(CH_2)_mO$—, n represents an integer from 1 to 3, m represents an integer from 2 to 18, and l represents an integer from 1 to 18.)

By doing this, it is possible to have particularly excellent storage stability for the second ink 3', and particularly excellent glossy appearance (shiny appearance) and abrasion resistance for the printing part of the recording material 10.

In formula (3), m is preferably an integer from 3 to 14, and more preferably an integer from 4 to 12. By doing this, the kinds of effects described above are more markedly exhibited.

Also, in formula (3), l is preferably an integer from 1 to 14, and more preferably an integer from 1 to 10. By doing this, the kinds of effects described above are more markedly exhibited.

Specific examples of preferable alkyl phosphate esters include $((CH_3)_2CHO)_2P(=O)(OH)$, $((CH_3)_2CHO)P(=O)(OH)_2$, $(C_2H_5O)_2P(=O)(OH)$, $(C_2H_5O)P(=O)(OH)_2$, $(CH_3O)_2P(=O)(OH)$, $(C_4H_9O)P(=O)(OH)_2$, $(C_3H_7O)_2P(=O)(OH)$, $(C_3H_7O)P(=O)(OH)_2$ and the like.

The kind of surface preparation agents noted above can have processing done directly on the mother particles, but it is preferable to have processing performed using the surface preparation agent on those mother particles after having acid or base processing done on the mother particles. By doing this, it is possible to more reliably perform modifications using chemical bonding by the surface preparation agent on the surface of the mother particles, and possible to more effectively exhibit the effects due to using the kind of surface preparation agents noted above. Also, even when an oxide film is formed on the particles to become the mother particles before performing the surface processing using the surface preparation agent, it is possible to reliably remove that oxide film, and in a state with the oxide film removed, to perform the surface processing using the surface preparation agent, so it is possible to have particularly excellent glossy appearance of the produced metal powder 31. As an acid, for example, it is possible to use a proton acid of hydrochloric acid, sulfuric acid, phosphoric acid, nitric acid, acetic acid, carbonic acid, formic acid, benzoic acid, chlorous acid, hypochlorous acid, sulfurous acid, hyposulfurous acid, nitrous acid, hyponitrous acid, phosphorous acid, and hypophosphorous acid or the like. Among these, hydrochloric acid, phosphoric acid, and acetic acid are preferable. On the other hand, as a base, for example, sodium hydrate, potassium hydrate, calcium hydrate or the like can be used. Among these, sodium hydrate and potassium hydrate are preferable.

The content rate of metal powder in the second ink 3' is preferably 0.5 mass % or greater and 10.0 mass % or less, and more preferably 1.0 mass % or greater and 5.0 mass % or less.

The second polymerized compound 32' is in liquid form. By doing this, it is not necessary to use the liquid component removed (vaporized) in the production process of the recording material 10, and with the production of the recording material 10, it is not necessary to provide a step of removing this kind of liquid component, so it is possible to have particularly excellent productivity for the recording material 10. Also, since it is not necessary to use an organic solvent, an occurrence of the VOC (volatile organic compound) problem can be prevented.

The second ink 3' preferably includes as the second polymerized compound 32' the same compound as the first polymerized compound 21' constituting the first ink 2'. By doing this, it is possible to have particularly excellent adhesiveness between the first layer 2 and the second layer 3, and possible to have particularly excellent durability and reliability of the recording material 10.

As the second polymerized compound 32', it is acceptable as long as it is a component that can be polymerized by irradiating ultraviolet light, and for example, various types of monomer, various types of oligomer (including dimer, trimer, or the like), or the like can be used, but it is preferable that the second ink 3' use an item that at least includes a monomer component as the second polymerized compound 32'. A monomer is a component that generally has a lower viscosity than an oligomer component or the like, so the second ink 3' has an advantage of having particularly excellent discharge stability.

In particular, the second ink 3' preferably includes a monomer having an alicyclic structure as the second polymerized compound 32'. By doing this, it is possible to have particularly excellent dispersion stability of the metal powder 31 in the second ink 3', and storage stability of the second ink 3', and possible to have particularly excellent glossy appearance (shiny appearance) and abrasion resistance for the printing part of the recording material 10 produced using the second ink 3'. It is also possible to have particularly excellent adhesiveness of the hardened material 32 (second layer 3) formed with the second curing step on the hardened material 21 (first layer 2) and the like.

Examples of monomers having an alicyclic structure include tris (2-(meth) acryloyloxyethyl) isocyanurate, dicyclopentenyloxyethyl (meth) acrylate, adamantyl (meth) acrylate, γ-butyrolactone (meth) acrylate, N-vinyl caprolactam, N-vinylpyrrolidone, pentamethylpiperidyl (meth) acrylate, tetramethylpiperidyl (meth) acrylate, 2-methyl-2-adamantyl (meth) acrylate, 2-ethyl-2-adamantyl (meth) acrylate, mevalonic acid lactone (meth) acrylate, dimethylol tricyclodecanedi (meth) acrylate, dimethylol dicyclopentane di (meth) acrylate, dicyclopentenyl (meth) acrylate, dicyclopentanyl (meth) acrylate, isobornyl (meth) acrylate, cyclohexyl (meth) acrylate, (meth) acryloyl morpholine, tetrahydrofurfuryl (meth) acrylate, phenyl glycidyl ether (meth) acrylate, EO-modified hydrogenated bisphenol A di (meth) acrylate, di (meth) acrylated isocyanurate, tri (meth) acrylated isocyanurate and the like, but it is preferable to be an item including one type or two or more types selected from the group consisting of tris (2-acryloyloxyethyl) isocyanurate, dicyclopentenyloxyethyl ethyl acrylate, adamantyl acrylate, γ-butyrolactone acrylate, N-vinylcaprolactam, N-vinylpyrrolidone, pentamethylpiperidyl acrylate, tetramethylpiperidyl acrylate, 2-methyl-2-adamantyl acrylate, 2-ethyl-2-adamantyl acrylate, cyclohexane spiro-2-(1,3-dioxolan-4-yl) methyl acrylate, (2-methyl-2-ethyl-1,3-dioxolan-4-yl) methyl acrylate, mevalonic acid lactone acrylate, dimethylol tricyclodecane diacrylate, dimethylol dicyclopentane diacrylate, dicyclopentenyl acrylate, dicyclopentanyl acrylate, isobornyl acrylate, cyclohexyl acrylate, acryloyl morpholine, and tetrahydrofurfuryl acrylate. By doing this, it is possible to be even more excellent in terms of the glossy appearance (shiny appearance) and high class appearance of the produced recording material 10. It is also possible to have even more excellent adhesiveness of the hardened material 32 formed with the second curing step on the first layer 2, and possible to more easily form the hardened material 32 controlled to a desired shape. It is also possible to have more excellent storage stability and discharge stability for the second ink 3'.

Among these, when including one type or two or more types selected from the group consisting of acryloylmorpholine, tetrahydrofurfuryl acrylate, γ-butyrolactone acrylate, N-vinyl caprolactam, and N-vinylpyrrolidone, it is possible to have even more excellent dispersion stability of the metal powder 31 in the second ink 3', possible to more suitably arrange the metal powder 31 near the outer surface of the second layer 3 with the recording material 10 produced using the second ink 3', and possible to have more excellent glossy appearance (shiny appearance) of the obtained recording material 10.

Also, from the perspective of further improving the curing speed of the second ink 3' with the second curing step, and the productivity of the recording material 10, it is preferable to use an item including one type or two or more types selected from the group consisting of tris (2-acryloyloxyethyl) isocyanurate, dicyclopentenyloxyethyl ethyl acrylate, γ-butyrolactone acrylate, N-vinylpyrrolidone, dimethylol tricyclodecane diacrylate, dimethylol dicyclopentane diacrylate, dicyclopentenyl acrylate, dicyclopentanyl acrylate, acryloyl morpholine, and tetrahydrofurfuryl acrylate, more preferable to be an item including acryloylmorpholine and/or γ-butyrolactone acrylate, and even more preferable to be an item including γ-butyrolactone acrylate.

Also, when including one type or two or more types selected from the group consisting of cyclohexyl acrylate, tetrahydrofurfuryl acrylate, and benzyl acrylate, it is possible to have even more excellent flexibility of the hardened material 32 (second layer 3).

Also, from the perspective of further improving the abrasion resistance of the second layer 3 formed by curing the second ink 3', it is preferable to be an item including one type or two or more types selected from the group consisting of tris (2-acryloyloxyethyl) isocyanurate, dicyclopentenyloxyethyl ethyl acrylate, adamantyl acrylate, γ-butyrolactone acrylate, N-vinylcaprolactam, N-vinylpyrrolidone, dimethylol tricyclodecane diacrylate, dimethylol dicyclopentane diacrylate, dicyclopentenyl acrylate, dicyclopentanyl acrylate, isobornyl acrylate, and acryloyl morpholine, and more preferable to be an item including γ-butyrolactone acrylate and/or N-vinylcaprolactam.

Also, in the case of an item including one type or two or more types selected from the group consisting of γ-butyrolactone acrylate, N-vinyl caprolactam, N-vinylpyrrolidone, isobornyl acrylate, and tetrahydrofurfuryl acrylate, the shrinkage ratio during curing of the second ink 3' is smaller, and it is possible to more effectively prevent a decrease in glossy appearance (shiny appearance) due to the occurrence of unintended creases or the like in the hardened material 32 (second layer 3).

The content rate of the monomer having an alicyclic structure in the second ink 3' is preferably 40 mass % or greater and 90 mass % or less, more preferably 50 mass % or greater and 88 mass % or less, and even more preferably 55 mass % or greater and 85 mass % or less. By doing this, there is particularly excellent dispersion stability of the metal powder 31, and particularly excellent discharge stability is obtained over the long term. In particular, even when the second ink 3' does not include a dispersant, the kinds of excellent effects noted above can be obtained.

In contrast to this, when the content rate of the monomer having an alicyclic structure in the second ink 3' is less than the lower limit noted above, the dispersibility of the metal powder 31 decreases, and it is possible that there will be a decrease in the stability of the droplet discharge using the inkjet method. Also, in this case, it is possible for there to be a decrease in stability over time of the droplet discharge of the second ink 3'. Also, when the content rate of the monomer having an alicyclic structure in the second ink 3' exceeds the upper limit noted above, by there being an excessive increase in the dispersion stability of the metal powder 31, with the second ink 3' applied to the recording medium 1, the internal existence ratio of the metal powder 31 increases, it becomes difficult to suitably arrange the metal powder 31 near the outer surface of the applied second ink 3', and it is possible that there will be a decrease in the glossy appearance (shiny appearance) and abrasion resistance of the finally obtained recording material 10. The second ink 3' can also be an item including two or more compounds as the monomer having an alicyclic structure. In this case, it is preferable that the sum of the content rates of these be a value within the range noted above.

With the monomer having an alicyclic structure, the number of constituent atoms of the cyclic structure formed by covalent bonds is preferably 5 or more, and more preferably 6 or more. By doing this, it is possible to have particularly excellent storage stability for the second ink 3'.

With the second ink 3', as the monomer having an alicyclic structure, it is preferable to be an item including a monofunctional monomer including a heteroatom in the alicyclic structure (monofunctional monomer having a heterocycle not showing aromaticity). By doing this, there is particularly excellent dispersion stability of the metal powder 31, and particularly excellent discharge stability is obtained over a long time. In particular, even when the second ink 3' does not include a dispersant, the kinds of excellent effects noted above can be obtained. Examples of this kind of monofunctional monomer include tris (2-(meth) acryloyloxyethyl) isocyanurate, γ-butyrolactone (meth) acrylate, N-vinyl caprolactam, N-vinylpyrrolidone, pentamethylpiperidyl (meth) acrylate, tetramethylpiperidyl (meth) acrylate, mevalonic acid lactone (meth) acrylate, (meth) acryloyl morpholine, tetrahydrofurfuryl (meth) acrylate and the like.

The content rate of the monofunctional monomer (monofunctional monomer including a heteroatom in the alicyclic structure) in the second ink 3' is preferably 10 mass % or greater and 80 mass % or less, and more preferably 15 mass % or greater and 75 mass % or less. By doing this, the curing shrinkage is suppressed, there is little scattering, and it is possible to produce the recording material 10 equipped with a printing part with more excellent glossy appearance (shiny appearance). With the second ink 3', it is possible to include two or more types of compound as the monofunctional monomer including a heteroatom in the alicyclic structure. In this case, the sum of the content rates of these is preferably a value within the range noted above.

The polymerized compound constituting the second ink 3' can also be an item that includes a monomer that does not have an alicyclic structure.

Examples of this kind of monomer (monomer that does not have an alicyclic structure) include phenoxyethyl (meth) acrylate, benzyl (meth) acrylate, (meth) acrylate 2-(2-vinyloxy ethoxy) ethyl, dipropylene glycol di (meth) acrylate, tripropylene glycol di (meth) acrylate, 2-hydroxy-3-phenoxypropyl (meth) acrylate, and 4-hydroxybutyl (meth) acrylate, lauryl (meth) acrylate, 2-methoxyethyl (meth) acrylate, isooctyl (meth) acrylate, stearyl (meth) acrylate, 2-ethoxyethyl (meth) acrylate, benzyl (meth) acrylate, 1H, 1H, 5H-octafluoropentyl (meth) acrylate, 2-hydroxyethyl (meth) acrylate, 2-hydroxypropyl (meth) acrylate, isobutyl (meth) acrylate, t-butyl (meth) acrylate, ethyl carbitol (meth) acrylate, 2,2,2-trifluoroethyl (meth) acrylate, 2,2,3,3-tetrafluoropropyl (meth) acrylate, methoxy triethylene glycol (meth) acrylate, PO-modified nonylphenol (meth) acrylate, EO-modified nonylphenol (meth) acrylate, EO-modified 2 ethylhexyl (meth) acrylate, phenoxy diethylene glycol (meth) acrylate, EO-modified phenol (meth) acrylate, EO-modified cresol (meth) acrylate, methoxy polyethylene glycol (meth) acrylate, dipropylene glycol (meth) acrylate, 2-n-butyl-2-ethyl-1,3-propanediol di (meth) acrylate, tetraethylene glycol di (meth) acrylate, 1,9-nonanediol di (meth) acrylate, 1,4-butanediol di (meth) acrylate, bisphenol A EO-modified di (meth) acrylate, 1,6-hexanediol di (meth) acrylate, polyethylene glycol 200 di (meth) acrylate, polyethylene glycol 300 di (meth) acrylate, neopentyl glycol hydroxypivalate di (meth) acrylate, 2-ethyl-2-butyl-propanediol di (meth) acrylate, polyethylene glycol 400 di (meth) acrylate, polyethylene glycol 600 di (meth) acrylate, polypropylene glycol di (meth) acrylate, bisphenol A EO-modified di (meth) acrylate, PO-modified bisphenol A di (meth) acrylate, trimethylolpropane tri (meth) acrylate, pentaerythritol tri (meth) acrylate, trimethylolpropane EO-modified tri (meth) acrylate, glycerin PO-added tri (meth) acrylate, tris (meth) acryloyloxyethyl phosphate, pentaerythritol tetra (meth) acrylate, PO modified trimethylolpropane tri (meth) acrylate, 2-(meth) acryloyloxyethyl phthalate, 3-(meth) acryloyloxypropyl acrylate, w-carboxy (meth) acryloyloxyethyl phthalate, di-trimethylolpropane tetra (meth) acrylate, dipentaerythritol penta-/hexa-(meth) acrylate, dipentaerythritol hexa (meth) acrylate and the like, but it is preferable to be an item including one type or two or more types selected from the group consisting of phenoxy ethyl acrylate, benzyl acrylate, acrylic acid 2-(2-vinyloxyethoxy) ethyl, dipropylene glycol diacrylate, tripropylene glycol diacrylate, 2-hydroxy 3-phenoxy propyl acrylate, and 4-hydroxy butyl acrylate. In addition to monomers having an alicyclic structure, by including this kind of monomer that does not have an alicyclic structure, while having excellent storage stability and discharge stability for the second ink 3', there is particularly excellent reactivity of the second ink 3' after discharging using the inkjet method, it is possible to have particularly excellent productivity of the recording material 10, and it is possible to have particularly excellent abrasion resistance of the formed pattern and the like.

Among these, in the case of an item including phenoxyethyl acrylate, with the produced recording material 10, it is possible to suitably arrange the metal powder 31 near the outer surface of the second layer 3, and possible to have even more excellent glossy appearance (shiny appearance) of the recording material 10.

Also, in the case of an item including acrylic acid 2-(2-vinyloxyethoxy) ethyl, it is possible to have even more excellent curing speed of the second ink 3' when irradiating ultraviolet light, and productivity of the recording material 10.

Also, in the case of an item including phenoxy ethyl acrylate and/or 2-hydroxy 3-phenoxypropyl acrylate, it is possible to have even more excellent flexibility of the hardened material 32 (second layer 3).

Also, from the perspective of further improving the abrasion resistance of the printing part, it is preferable to include one type or two or more types selected from the group consisting of 2-(2-vinyloxyethoxy) ethyl acrylate, dipropylene glycol diacrylate, and tripropylene glycol diacrylate, and more preferable to include acrylic acid 2-(2-vinyloxyethoxy) ethyl.

Also, when including phenoxy ethyl acrylate, the shrinkage ratio during curing of the second ink 3' is smaller, and it is possible to more effectively prevent a decrease in the glossy appearance (shiny appearance) or the like due to unintended creases or the like in the hardened material 32 (second layer 3).

The content rate of the monomer other than a monomer having an alicyclic structure in the second ink 3' is preferably 5 mass % or greater and 50 mass % or less, and more preferably 10 mass % or greater and 40 mass % or less. By doing this, it is possible to make adjusting even easier for the curing speed of the second ink 3', the flexibility, the shrinkage ratio and the like. The second ink 3' can also be an item including two or more types of compounds as the monomer that does not have an alicyclic structure. In this case, it is preferable that the sum of the content rates of these be a value within the range noted above.

Other than a monomer, the second ink 3' can also include as the polymerized compound an oligomer (including dimer, trimer or the like), a prepolymer or the like. As the oligomer or prepolymer, for example it is possible to use the kind of monomers described above as constituent components. It is preferable that the second ink 3' include a multifunctional oligomer. By doing this, while having excellent storage stability of the second ink 3', it is possible to have particularly excellent abrasion resistance and the like of the formed printing part. As the oligomer, it is preferable to use a urethane oligomer for which the repeated structure is urethane, and to use an epoxy oligomer for which the repeated structure is epoxy or the like.

The content rate of the polymerized compound in the second ink 3' is preferably 70 mass % or greater and 99 mass % or less, and more preferably 80 mass % or greater and 98 mass % or less. By doing this, it is possible to have the second ink 3' be even more excellent in terms of storage stability, discharge stability, and hardenability. The second ink 3' can also include two types or more of compounds as the polymerized compound. In this case, it is preferable that the sum of the content rates of these compounds be a value within the range noted above.

The second ink 3' can also include a dispersant. By doing this, it is possible to have excellent dispersion stability of the metal powder 31 in the second ink 3', and possible to have even more excellent storage stability of the second ink 3'.

In particular, the second ink 3' can include as a dispersant an item that is basic and has a polymeric structure (hereafter also called a "basic polymeric dispersant"). By doing this, it is possible to have even more excellent storage stability for the second ink 3'.

With the invention, the basic polymeric dispersant can be any item that is basic and has a polymeric structure, and the molecular weight is not specifically limited.

The polymeric structure constituting the basic polymeric dispersant is not limited, and examples include an acrylic polymeric structure (including copolymers), a methacrylic polymeric structure (including copolymers), a polyurethane type polymeric structure, a hydroxyl group-containing carboxylic acid ester structure, a polyether type polymeric structure, a silicone type polymeric structure or the like.

The amine number of the basic polymeric dispersant is not particularly limited, but it is preferably 3 mg KOH/g or greater and 80 mg KOH/g or less, and more preferably 10 mg KOH/g or greater and 70 mg KOH/g or less.

Concrete examples of the basic polymeric dispersants that can be used in the invention include DISPERBYK-116 (made by BYK Chemie Company), DISPERBYK-182 (made by BYK Chemie Company), DISPERBYK-183 (made by BYK Chemie Company), DISPERBYK-184 (made by BYK Chemie Company), DISPERBYK-2155 (made by BYK Chemie Company), DISPERBYK-2164 (made by BYK Chemie Company), DISPERBYK-108 (made by BYK Chemie Company), DISPERBYK-112 (made by BYK Chemie Company), DISPERBYK-198 (made by BYK Chemie Company), DISPERBYK-2150 (made by BYK Chemie Company), PAA-1112 (made by Nittobo Co., Ltd.) and the like.

The content rate of the basic polymeric dispersant in the second ink 3' is preferably 0.01 mass % or greater and 5.0 mass % or less, and more preferably, 0.1 mass % or greater and 2.0 mass % or less. Because of this, the second ink 3' can be provided with even more excellent storage stability, discharge stability, and hardenability, and the recording material 10 can have even more excellent glossy appearance (shiny appearance), durability and the like. The second ink 3' can include more than 2 types of compositions as a basic polymeric dispersant. In this case, the sum of the content rates of these compounds is preferably a value within the range noted above.

Also, with the second ink 3', it is preferable to include a substance A having the partial structure shown in formula (8) below.

(8)

(In formula (8), $R^1$ represents an oxygen atom, a hydrogen atom, a hydrocarbon group, or an alkoxyl group, and $R^2$, $R^3$, $R^4$, and $R^5$ respectively independently represent a hydrogen atom or a hydrocarbon group.)

By the second ink 3' including a substance A having this kind of chemical structure (in particular, including it together with the metal powder 31 for which the kind of surface processing noted above is implemented), it is possible to have particularly excellent storage stability and hardenability of the second ink 3'. Also, with the recording material 10, the glossy appearance that the metal material constituting the metal powder 31 has naturally and the high class appearance are exhibited more effectively, and it is possible to have particularly excellent glossy appearance (shiny appearance) and durability of the recording material 10.

In formula (8), $R^1$ is acceptable if it represents a hydrogen atom, a hydrocarbon group, or alkoxyl group (this is a chain or alicyclic hydrocarbon group bonded to an oxygen atom), but it is especially preferable to be a hydrogen atom, methyl group, or octyloxy group. By doing this, the second ink 3' can be provided with excellent storage stability and excellent discharge stability, and the recording material 10 can be provided with excellent glossy appearance (shiny appearance) and durability.

Also, in formula (8), $R^2$ to $R^5$ are respectively independently acceptable as long as they represent a hydrogen atom or hydrocarbon group, but it is preferable to be an alkyl group of a carbon number 1 to 3, and more preferable to be a methyl group. By doing this, the second ink 3' can be provided with excellent storage stability and excellent discharge stability, and the recording material 10 can be provided with excellent glossy appearance (shiny appearance) and durability.

The content rate of the substance A in the second ink 3' is preferably 0.1 mass % or greater and 5.0 mass % or less, and more preferably 0.5 mass % or greater and 3.0 mass % or less. By doing this, the second ink 3' can be provided with even more excellent storage stability, discharge stability, and hardenability, and the recording material 10 can be provided with excellent glossy appearance (shiny appearance) and durability and the like. The second ink 3' can include more than 2 types of compounds as the substance A. In this case, the sum of the content rates of these compounds is preferably a value within the range noted above.

When the content rate of the substance A is $X_A$ [mass %] and the content rate of the metal powder 31 is $X_M$ [mass %], it is preferable to satisfy a relationship of $0.01 \leq X_A/X_M \leq 0.8$, and a relationship of $0.05 \leq X_A/X_M \leq 0.4$ is more preferable. By satisfying these relationships, the second ink 3' can be provided with excellent storage stability and discharge stability, and the recording material 10 can be provided with even more excellent glossy appearance (shiny appearance) and durability.

The second ink 3' can include components (other components) besides the components discussed above. As these components, examples include coloring agents, photopolymerization initiators, slip agents (leveling agents), polymerization accelerators, polymerization inhibitors, penetration enhancers, wetting agents (humectants), fixing agents, antifungal agents, preservatives, antioxidants, chelating agents, thickeners, sensitizers (sensitizing dyes) and the like.

As the photopolymerization initiator, for example, it is possible to use the same item as explained as the constituent component of the first ink. By doing this, the same effects as noted above can be obtained.

The content rate of the photopolymerization initiator in the second ink 3' is preferably 0.5 mass % or greater and 10 mass % or less. When the content rate of the photopolymerization initiator is in the range noted above, the ultraviolet curing speed is sufficiently high, and in addition, there are almost no remains of melted photopolymerization initiator or coloration caused by the photopolymerization initiator.

When the second ink 3' includes a slip agent, by a leveling action, the surface of the recording material 10 becomes smoother, and the abrasion resistance is improved.

As a slip agent, it is not particularly limited, but for example, it is possible to use silicone surfactants of polyester modified-silicone, polyether modified-silicone, acrylic silicone or the like, and it is preferable to use polyester modified-polydimethylsiloxane or polyether modified-polydimethylsiloxane.

The second ink 3' can include a polymerization inhibitor, but even when the polymerization inhibitor is included, the content rate of the polymerization inhibitor in the second ink 3' is preferably 0.6 mass % or less and more preferably 0.2 mass % or less. By doing of this, since it is possible to have the content of the second polymerized compound 32' in the second ink 3' be relatively high, it is possible for there to be particularly excellent adhesiveness of the second layer 3 formed using the second ink 3' in relation to the first layer 2 or the like.

Also, it is preferable that the second ink 3' does not include an organic solvent that is removed (vaporized) in the production process of the recording material 10. Because of this, an occurrence of the VOC (volatile organic compound) problem can be effectively prevented.

The contact angle of the second ink 3' to the first layer 2 is preferably 10 degrees or greater and 90 degrees or less, and more preferably 30 degrees or greater and 60 degrees or less. Also, the contact angle of the second ink 3' to the base material 1 is preferably 30 degrees or greater and 85 degrees or less, more preferably 35 degrees or greater and 80 degrees or less, and even more preferably 40 degrees or greater and 75 degrees or less. By fulfilling these kinds of conditions, there is excellent affinity of the second ink 3' in relation to the first layer 3, and while having excellent adhesiveness of the second layer 3 formed at a later step to the first layer 2, it is possible to reliably prevent wetting and spreading of the second ink 3' to the surface of the base material 1 (area at which the first layer 2 is not formed), and possible to have the second layer 3 reliably have the desired shape. With the invention, as "the contact angle in relation to the first layer," it is possible to use the contact angle of the ink in relation to the first layer at 25° C. measured in conformance with the θ/2 method.

The viscosity of the second ink 3' at room temperature (25° C.) is preferably 4 mPa·s or greater and 40 mPa·s or less, and more preferably 6 mPa·s or greater and 30 mPa·s or less. By doing this, while having particularly excellent discharge stability for the second ink 3', it is possible to more effectively inhibit unintended bleeding of the droplets of the second ink 3' when landing, and possible to have particularly excellent glossy appearance (shiny appearance) of the recording material 10.

The absolute value of the difference in the viscosity of the first ink 2' at room temperature (25° C.) and the viscosity of the second ink 3' at room temperature (25° C.) is preferably 1.0 mPa·s or less, more preferably 0.6 mPa·s or less, and even more preferably 0.4 mPa·s or less. By doing this, setting and adjusting the discharge conditions or the like of the ink using the inkjet method (first ink 2' and second ink 3') is easy.

The surface tension of the second ink 3' at 25° C. is preferably 14 mN/m or greater and 50 mN/m or less. By doing this, while have particularly excellent discharge stability for the second ink 3', it is possible to more effectively inhibit unintended bleeding of the second ink 3' droplets when they land, and possible to have particularly excellent glossy appearance (shiny appearance) of the recording material 10.

This step can be performed using the kind of droplet discharge method (inkjet method) described with the first ink applying step. This step can also be the same method as the first ink applying step, or it can be performed using a different method from the first ink applying step.

Also, this step can be performed using the same device (droplet discharge device) as was used with the first ink applying step, or can also be performed using a different device (droplet discharge device) as that used with the first ink applying step.

Second Curing Step

Figure 1D:
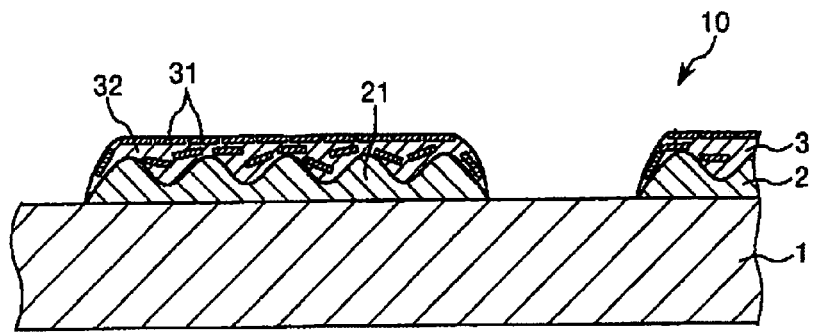

Next, by irradiating ultraviolet light, the second polymerized compound 32' is polymerized and cured (FIG. 1D). By doing this, the second layer 3 for which the metal powder 31 is fixed is formed using the hardened material 32 of the second polymerized compound 32'.

This step is performed so as to satisfy the kinds of conditions noted below. Specifically, the time after droplets of the second ink 3' discharged at the second ink applying step described previously land in the area on which the first layer 2 is formed until irradiation of the ultraviolet light on those droplets with this step (second ink 3' droplets) is performed is 5.0 seconds or greater and 60.0 seconds or less. In this way, by implementing the curing process using ultraviolet light irradiation after a relatively long time has elapsed from landing of the second ink 3' droplets (a longer time than the time after the first ink 2' droplets land on the base material 1 at the first ink applying step until the ultraviolet light is irradiated on those drops with the first curing step), it is possible to reliably form the second layer 3 with the metal powder 31 suitably arranged. Then, coupled with the fact that the discharged volume of the second ink 3' at the second ink applying step is the necessary and sufficient volume, it is possible to have the surface of the second layer 3 be smooth, and possible to obtain a shiny glossy appearance (shiny appearance) such as that which a mirror surface has.

In contrast to this, when the time from when the droplets of the second ink 3' land in the area noted above with the second ink applying step until irradiation of ultraviolet light on those droplets at this step is less than the lower limit noted above, the second polymerized compound 32' is cured before the metal powder 31 is suitably arranged, and the metal powder 31 becomes fixed, so it is not possible to obtain the shiny glossy appearance (shiny appearance) such as that which a mirror surface has. Also, when the time from when the droplets of the second ink 3' land in the area noted above with the second ink applying step until irradiation of ultraviolet light on those droplets at this step exceeds the upper limit noted above, the productivity of the recording material 10 decreases. Also, the second ink 3' protrudes to outside the range noted above, so it is not possible to form the printing part with high precision.

As noted above, it is acceptable for the time from when the droplets of the second ink 3' land in the area noted above with the second ink applying step until irradiation of ultraviolet light on those droplets at this step to be 5.0 seconds or greater and 60.0 second or less, but it is preferably 6.0 seconds or greater and 30.0 seconds or less, and more preferably 7.0 seconds or greater and 20.0 seconds or less. By doing this, the effects described above are more markedly exhibited.

Also, with this step, the time from when irradiation of ultraviolet light on the droplets of the second ink 3' until the level of curing of the second polymerized compound 32' included in those droplets reaches 90% is preferably 0.5 seconds or less, more preferably 0.3 seconds or less, and even more preferably 0.2 seconds or less. In this way, by having the curing reaction advance in a sufficiently short time, it is possible to more reliably prevent unintended deformation of the hardened material 32 (second layer 3). It is also advantageous for further improving the productivity of the recording material 10.

With this step, as the ultraviolet light source, it is possible to use an item not described with the first ink applying step. This step can be performed using the same ultraviolet light source as was used with the first ink applying step, or it can also be performed using a different ultraviolet light source from that used with the first ink applying step.

The surface roughness Ra of the second layer 3 formed with this step is preferably 0.9 μm or less. By doing this, it is possible to have particularly excellent glossy appearance (shiny appearance) of the recording material 10.

Recording Material

Next, we will describe the recording material of the invention.

The recording material of the invention is produced using the method of the invention as described above. This kind of recording material has the printing part having an excellent glossy appearance (shiny appearance) such as that of a mirror surface provided with good precision.

The recording material of the invention can be used for any purpose, and for example, it can be used for a decorative product or other purpose. Specific examples of the invention include interior decorations for vehicles such as a console lid, a switch-base, a center cluster, an interior panel, an emblem, a center console, an indicator panel, or the like, or indicators such as the operating unit (key switches) of various electronic devices, a decorative part exhibiting decorative characteristics, an index, a logo, or the like.

Above, we described the invention based on the preferred embodiments, but the invention is not limited to these.

For example, with the production method of the invention, in addition to the kinds of steps described above, it is also possible to have other steps (pre-processing steps, interim processing steps, post-processing steps).

Also, the ink set of the invention (set of the first ink and the second ink) is acceptable as long as it is equipped with at least one type of the respective first ink and second ink as described above, and for example it can also be equipped with two or more types of the first ink, or can be equipped with two or more types of the second ink. Also, with the invention, it is also possible to use the same ink in common as the first ink and the second ink.

Also, with the modes described previously, the focus of the description was on cases when the first layer was formed as an item of a form as a film for covering the surface of the base material in a designated area (item for which the first ink droplets are bonded to each other), but with the invention, the first layer can be an item provided at a plurality of discrete points rather than the first ink droplets being bonded to each other.

EMBODIMENTS

Next, we will describe specific embodiments of the invention.

1 Production of Recording Material

Embodiment 1

First, the ink (first ink and second ink) was produced as described hereafter.

Production of Ink (First Ink and Second Ink)

First of all, a film made of polyethylene terephthalate, which has a smooth surface, (surface roughness Ra is 0.02 µm or less) was prepared.

Next, silicone oil was applied all over one surface of this film.

Next, using the vapor deposition method, a film constituted by Al was formed on the surface on which the silicone oil was applied.

Next, a film made of polyethylene terephthalate on which an Al film was formed (base material) was placed in a liquid constituted by 99 parts diethylene glycol diethylether and 1 part $CF_3(CF_2)_5(CH_2)_2O(P)(OH)_2$, and ultrasonic vibration of 27 kHz was applied for 3 hours at 55° C. By doing this, a dispersion liquid of metal powder consisting of scale-like shaped particles on which surface processing was implemented using $CF_3(CF_2)_5(CH_2)_2O(P)(OH)_2$ on mother particles made of Al was obtained.

The average particle diameter of the metal powder obtained in this way was 0.9 µm, the maximum particle diameter was 2.0 µm, and the average thickness was 60 nm.

Next, the ink was obtained by mixing the metal powder dispersion liquid with γ-butyrolactone acrylate as the monomer having an alicyclic structure (polymerized compound), phenoxyethyl acrylate as the monomer not having an alicyclic structure (polymerized compound), substance A having the chemical structure represented by formula (9) below, DISPERBYK-182 (made by BYK Chemie Company) as a basic polymeric dispersant, Irgacure 819 (made by Chiba Japan Company) as a photopolymerization initiator, Speedcure TPO (made by ACETO Company) as a photopolymerization initiator, and Speedcure DETX (made by Lambson Company) as a photopolymerization initiator.

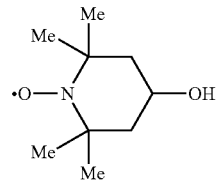

(9)

Producing Recording Material

The ink obtained as described above was used as the first ink and the second ink and the recording material was produced as described below. With the method described hereafter, the first ink applying step and the second ink applying step were performed under the conditions of the base material conveying speed: 350 mm/second, resolution: 720×720 dpi, base material-nozzle surface distance (gap): 1 mm.

First Ink Applying Step

First, a droplet discharge device installed inside a chamber (thermal chamber) was prepared, and the first ink was applied to the surface of the non-porous base material made of non-liquid absorbing polycarbonate in a designated pattern (a pattern for which four square solid patterns of 5.0 cm squared are arranged two each vertically and horizontally so that the corresponding sides are parallel, with a 0.5 mm gap set to exist between these) (see FIG. 1A). The discharged volume ($X_1$) of the first ink in the area to which the first ink was applied was 10.0 g/m².

First Curing Step

Next, by irradiating ultraviolet light, the first polymerized compound was polymerized and cured, and the first layer in film form constituted by a material including the hardened material of the first polymerized compound was formed (see FIG. 1B).

This step is performed so that the time ($T_1$) from when the first ink droplets land on the base material with the first ink applying step until irradiation of the ultraviolet light on those droplets starts is 0.01 seconds.

Also, as the ultraviolet light source (light source), an RX FireFly UV Light System (made by Phoseon) was used.

Second Ink Applying Step

Next, from a different droplet discharge head of the same droplet discharge device used with the first ink applying step, the second ink was selectively applied to the area on which the first layer was formed (surface of the first layer). The discharged volume ($X_2$) of the second ink on the area to which the second ink was applied (area on which the first layer was formed) was 10.0 g/m².

Second Curing Step

Next, by irradiating ultraviolet light, the second polymerized compound was polymerized and cured, and the second layer in film form constituted by a material including the hardened material of the second polymerized compound and a metal powder was formed.

This step is performed so that the time ($T_2$) from when the second ink droplets land on the area on which the first layer was formed (first layer surface) at the second ink applying step until irradiation of the ultraviolet light on those droplets starts is 10.0 seconds.

Also, as the ultraviolet light source, the same item as was used with the first curing step was used (RX FireFly UV Light System (made by Phoseon)).

Embodiments 2 Through 20

The recording material was produced in the same manner as with embodiment 1 except for the ink compositions used for production of the recording material being made to be as shown in table 1, table 2, table 4, and table 5, and for the following items being made to be as shown in table 7: the type of base material (recording medium) used for producing the recording material, the discharged volume $X_1$ of the first ink, the time $T_1$ from when the first ink droplets land on the base material with the first ink applying step until irradiation of ultraviolet light is started on those droplets, the discharged volume $X_2$ of the second ink, and the time $T_2$ from when the second ink droplets land on the area on which the first layer was formed (first layer surface) until irradiation of ultraviolet light is started on those droplets.

Comparative Example 1

Other than omitting the first ink applying step and the first curing step, the recording material was produced in the same manner as with embodiment 1.

Comparative Example 2

Other than having the time $T_1$ from when the second ink droplets land on the surface of the base material until irradiation of ultraviolet light starts on those droplets being 1.0 second, the recording material was produced in the same manner as with comparative example 1.

Comparative Example 3

Other than having the discharged volume of the first ink ($X_1$) in the area of the first ink applying step (area in which the first ink is applied) be 1.9 g/m$^2$, the recording material was produced in the same manner as with embodiment 1.

Comparative Example 4

Other than having the discharged volume of the first ink ($X_1$) in the area of the first ink applying step (area in which the first ink is applied) be 21.0 g/m$^2$, the recording material was produced in the same manner as with embodiment 1.

Comparative Example 5

Other than the time ($T_1$) from when the first ink droplets land on the base material at the first ink applying step until irradiation of ultraviolet light starts on those droplets being set to 0.0001 seconds, the recording material was produced in the same manner as with embodiment 1.

Comparative Example 6

Other than the time ($T_1$) from when the first ink droplets land on the base material at the first ink applying step until irradiation of ultraviolet light starts on those droplets being set to 1.1 seconds, the recording material was produced in the same manner as with embodiment 1.

Comparative Example 7

Other than having the discharged volume of the second ink ($X_2$) in the area with the second ink applying step (area on which the first layer is formed) being set to 7.9 g/m$^2$ (ratio of the second ink discharged volume to the first ink discharged volume in that area is 79 volume %), the recording material was produced in the same manner as with embodiment 1.

Comparative Example 8

Other than having the discharged volume of the second ink ($X_2$) in the area with the second ink applying step (area on which the first layer is formed) being set to 20.1 g/m$^2$ (ratio of the second ink discharged volume to the first ink discharged volume in that area is 201 volume %), the recording material was produced in the same manner as with embodiment 1.

Comparative Example 9

Other than the time ($T_2$) from when the second ink droplets land on the area on which the first layer is formed with the second ink applying step (first layer surface) until irradiation of the ultraviolet light is started on those droplets being set to 4.9 seconds, the recording material was produced in the same manner as with embodiment 1.

Comparative Example 10

Other than the time ($T_2$) from when the second ink droplets land on the area on which the first layer is formed with the second ink applying step (first layer surface) until irradiation of the ultraviolet light is started on those droplets being set to 61.0 seconds, the recording material was produced in the same manner as with embodiment 1.

Comparative Example 11

Other than using spherical particles made of Al produced using a gas atomizing method as the mother particles of the constituent particles of the metal powder included in the first ink and the second ink, the recording material was produced in the same manner as with comparative example 10.

For each embodiment and comparative example, the ink compositions are shown collectively in table 1 through table 6, and table 7 collectively shows the conditions of the constitutional materials of the base material used to produce the recording material, the discharged volume $X_1$ [g/m$^2$] of the first ink in the area noted above, the time $T_1$ [seconds] from when the first ink droplets land until irradiation of ultraviolet light on those droplets, the discharged volume $X_2$ [g/m$^2$] of the second ink in the area noted above, the time $T_2$ [seconds] from when the second ink droplets land until irradiation of ultraviolet light on those droplets, and the ratio R [volume %] of the second ink discharged volume to the first ink discharged volume in the area noted above. In the tables, FAP1" represents $CF_3(CF_2)_5(CH_2)_2O(P)(OH)_2$ as fluorine based phosphate ester compound, "FAP2" represents $CF_3(CF_2)_5(CH_2)_2O(P)(OH)(OC_2H_5)$ as fluorine based phosphate ester compound, "FAS1" represents $(CF_3(CF_2)_7CH_2CH_2Si(OC_2H_5)_3)$ as fluorine based silane compound, "FAST" represents $(CF_3(CF_2)_5CH_2CH_2Si(OC_2H_5)_3)$ as fluorine based silane compound, "FFA1" represents $CF_3(CF_2)_7(CH_2)_2COOH$ as fluorine based fatty acid, "IS1" represents $CF_3(CF_2)_7(CH_2)_2NCO$ as isocyanate compound, "IS2" represents $CF_3(CF_2)_7NCO$ as isocyanate compound, "IS3" represents $CF_3(CF_2)_5(CH_2)_2NCO$ as isocyanate compound, "IS4" represents $CH_3(CH_2)_7NCO$ as isocyanate compound, "IS5" represents $CH_3(CH_2)_{12}NCO$ as isocyanate compound, "IS6" represents $CH_3(CH_2)_{17}NCO$ as isocyanate compound, "S1" represents $CF_3(CF_2)_5(CH_2)_2O(P)(OH)_2$ as isocyanate compound, "S2" represents $CF_3(CF_2)_5(CH_2)_2O(P)(OH)(OCH_2CH_3)$ as isocyanate compound, "S3" represents $CF_3(CF_2)_5—CH_2CH_2—Si(OC_2H_5)_3$ isocyanate compound, "S4" represents $CF_3—CH_2CH_2—Si$ (OCH$_3$)$_3$ as isocyanate compound, "S5" represents CH$_3$(CH$_2$)$_7$O—PO(OH)$_2$ as isocyanate compound, "BLA" represents γ-butyrolactone acrylate as a monomer (polymerized compound) containing an alicyclic structure, "THFA" represents tetrahydrofurfuryl acrylate as a monomer (polymerized compound) containing an alicyclic structure, "VC" represents N-vinyl caprolactam as a monomer (polymerized compound) containing an alicyclic structure, "VP" represents N-vinylpyrrolidone as a monomer (polymerized compound) containing an alicyclic structure, "AMO" represents acryloylmorpholine as a monomer (polymerized compound) containing an alicyclic structure, "TAOEI" represents tris (2-acryloyloxyethyl) isocyanurate as a monomer (polymerized compound) containing an alicyclic structure, "DCPTeOEA" represents dicyclopentenyloxyethyl acrylate as a monomer (polymerized compound) containing an alicyclic structure, "AA" represents adamantyl acrylate as a monomer (polymerized compound) containing an alicyclic structure, "DMTCDDA" represents dimethylol tricyclodecane diacrylate as a monomer (polymerized compound) containing an alicyclic structure, "DMDCPTA" represents dimethylol dicyclopentane diacrylate as a monomer (polymerized compound) containing an alicyclic structure, "DCPTeA" represents dicyclopentenyl acrylate as a monomer (polymerized compound) containing an alicyclic structure, "DCPTaA" represents dicyclopentenyl acrylate as a monomer (polymerized compound) containing an alicyclic structure, "IBA" represents isobornyl acrylate as a monomer (polymerized compound) containing an alicyclic structure, "CHA" represents cyclohexyl acrylate as a monomer (polymerized compound) containing an alicyclic structure, "DAI" represents isocyanurate diacrylate as a monomer (polymerized compound) containing an alicyclic structure, "TAI" represents isocyanurate triacrylate as a monomer (polymerized compound) containing an alicyclic structure, "BLM" represents γ-butyrolactone methacrylate as a monomer (polymerized compound) containing an alicyclic structure, "THFM" represents tetrahydrofurfuryl methacrylate as a monomer (polymerized compound) containing an alicyclic structure, "DCPTeOEM" represents dicyclopentenyloxyethyl methacrylate as a monomer (polymerized compound) containing an alicyclic structure, "AM" represents adamantyl methacrylate as a monomer (polymerized compound) containing an alicyclic structure, "PMPM" represents pentamethyl piperidyl methacrylate as a monomer (polymerized compound) containing an alicyclic structure, "TMPM" represents tetramethylpiperidyl methacrylate as a monomer (polymerized compound) containing an alicyclic structure, "MAM" represents 2-methyl-2-adamantyl methacrylate as a monomer (polymerized compound) containing an alicyclic structure, "EAM" represents 2-ethyl-2-adamantyl methacrylate as a monomer (polymerized compound) containing an alicyclic structure, "MLM" represents mevalonic acid lactone methacrylate as a monomer (polymerized compound) containing an alicyclic structure, "DCPTeM" represents dicyclopentenyl methacrylate as a monomer (polymerized compound) containing an alicyclic structure, "DCPTaM" represents dicyclopentanyl methacrylate as a monomer (polymerized compound) containing an alicyclic structure, "IBM" represents isobornyl methacrylate as a monomer (polymerized compound) containing an alicyclic structure, "CHM" represents cyclohexyl methacrylate as a monomer (polymerized compound) containing an alicyclic structure, "CHDOLA" represents cyclohexane spiro-2-(1,3-dioxolan-4-yl) methyl acrylate as a monomer (polymerized compound) containing an alicyclic structure, "MEDOLA" represents (2-methyl-2-ethyl-1,3-dioxolan-4-yl) methyl acrylate as a monomer (polymerized compound) containing an alicyclic structure, "PEA" represents phenoxyethyl acrylate as a monomer (polymerized compound) not containing an alicyclic structure, "DPGDA" represents dipropylene glycol diacrylate as a monomer (polymerized compound) not containing an alicyclic structure, "TPGDA" represents tripropylene glycol diacrylate as a monomer (polymerized compound) not containing an alicyclic structure, "HPPA" represents 2-hydroxy-3-phenoxypropyl acrylate as a monomer (polymerized compound) not containing an alicyclic structure, "HBA" represents 4-hydroxybutyl acrylate as a monomer (polymerized compound) not containing an alicyclic structure, "ECA" represents ethylcarbitol acrylate as a monomer (polymerized compound) not containing an alicyclic structure, "MTEGA" represents methoxy triethylene glycol acrylate as a monomer (polymerized compound) not containing an alicyclic structure, "TBA" represents t-butyl acrylate as a monomer (polymerized compound) not containing an alicyclic structure, "BA" represents benzyl acrylate as a monomer (polymerized compound) not containing an alicyclic structure, "VEEA" represents 2-(2-hydroxyethoxy) ethyl acrylate as a monomer (polymerized compound) not containing an alicyclic structure, "BM" represents benzyl methacrylate as a monomer (polymerized compound) not containing an alicyclic structure, "UA" represents urethane acrylate as a monomer (polymerized compound) not containing an alicyclic structure, "D2" represents DISPERBYK-182 (made by BKY Chemi Company, amine number: 13 mgKOH/g) as a basic polymeric dispersant, "D5" represents DISPERBYK-2155 (made by BKY Chemi Company, amine number: 48 mgKOH/g) as a basic polymeric dispersant, "A1" represents a compound (substance A) shown in the formula (9) noted above, "A2" represents a compound (substance A) shown in the formula (10) noted above, "A3" represents a compound (substance A) shown in the formula (11) noted below, "A4" represents a compound (substance A) shown in the formula (12) noted below, "ic819" represents Irgacure 819 (made by Chiba Japan Company), "scTPO" represents Speedcure TPO (made by ACETO Company), "scDETX" represents Speedcure DETX (made by Lambson Company), "UV3500" represents UV-3500 (made by BKY Chemi Company), "MEHQ" represents hydroquinone monomethyl ether, "1,2HD" represents 1,2-hexanediol, "TMP" represents trimethylolpropane, "S465" represents Surfynol 465 (made by Nissin Chemical Industry Co., Ltd.), "TEA" represents triethanolamine, "GL" represents glycerin, "LHP" represents LHP-96 (made by Kusumoto Chemicals, Ltd.), "LF" represents LF-1984 (made by Kusumoto Chemicals, Ltd.), "PF401" represents Polyflow 401 (made by Nissin Chemical Industry Co., Ltd.), "PC" represents polycarbonate, and "PET" represents polyethylene terephthalate.

Also, in the tables, for embodiment 15, the composition of the constitutional material of the mother particles is shown with the content rate of each element by weight ratio. Also, the viscosity at 25° C. of the inks used with each embodiment noted above measured in compliance with JIS Z8809 using a vibration type viscometer were all values within the range of 6 mPa·s or greater and 30 mPa·s or less. Also, the surface tension at 25° C. of the inks used with the embodiments noted above measured in compliance with JIS K 3362 were all values within the range of 14 mN/m or greater and 50 mN/m or less. Also, for the first ink used with the embodiments noted above, the contact angle in relation to the base material at 25° C. measured in compliance with the θ/2 method were all 40 degrees or greater and 75 degrees or less. Also, for the second ink used with the embodiments noted above, the contact angle in relation to the first layer at 25° C. measured in compliance with the θ/2 method were all 30 degrees or greater and 85 degrees or less. Also, for the second ink used with the embodiments noted above, the contact angle in relation to the base material at 25° C. measured in compliance with the θ/2 method were all 40 degrees or greater and 75 degrees or less. Also, for the metal powder constituting the inks used with the embodiments noted above, observation was performed on any 10 metal particles of each, the ratio ($S_1/S_0$) was obtained for the surface area $S_1$ [μm²] when the projected area is observed from the direction at which it is maximum (when with a planar view) and the surface area $S_0$ [μm²] when the projected area is observed from the direction at which the surface area is a maximum when observing among directions orthogonal to that observed direction, and when the average value of these was obtained, the average value for $S_1/S_0$ was always 19 or greater. Also, D2 and D5 are both items which are basic and have a polymeric structure (basic polymeric dispersant). Also, the base material used with each of the embodiments and comparative examples noted above were all non-porous and non-liquid absorbing. Also, with each of the embodiments and comparative examples noted above, the droplet volume of the first ink with one discharge operation and the droplet volume of the second ink with one discharge operation are both values within the range of 7 ng or greater and 20 ng or less. Also, with each of the embodiments noted above, the time from the start of irradiation of ultraviolet light on the first ink droplets until the level of curing of the first polymerized compound included in those droplets reaches 90%, and the time from the start of irradiation of ultraviolet light on the second ink droplets until the level of curing of the second polymerized compound included in those droplets reaches 90% was always 0.1 second or less. Also, for the recording material of each of the embodiments noted above, the surface roughness Ra of the second layer, when measured in compliance with JIS B 0601, was always 0.8 μm or less. Also, for each of the embodiments noted above, the surface roughness Ra of the first layer, when measured in compliance with JIS B 0601, was always 15 μm or greater and 20 μm or less.

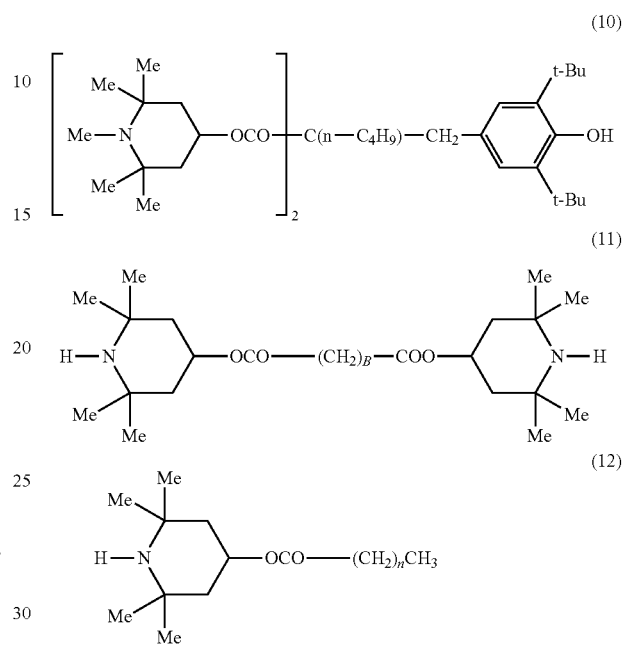

(The substance A shown in formula (12) is a mixture of a plurality of compounds for which n in the formula is 10 or greater and 19 or less (the main component is a compound for which n in the formula is 15 or greater and 18 or less).)

TABLE 1

| | Metal Powder Constitution | | | | | | First Ink Constitution | |
|---|---|---|---|---|---|---|---|---|
| | | | | Metal Powder | | | | |
| | Constituent Material of Mother Particles | Materials Used for Surface Preparation | Shape | Average Particle Diameter (μm) | Maximum Particle Diameter (μm) | Average Thickness (nm) | Content Rate (Mass Part) | Polymerized Compound |
| | | | | | | | | Content Rate (Mass Part) |
| Embodiment 1 | Al | FAP1 | Scale-like | 0.9 | 2.0 | 60 | 2.0 | BLA/PEA | 60.0/27.8 |
| Embodiment 2 | Al | IS1 | Scale-like | 0.9 | 0.9 | 20 | 4.0 | BLA/THFA | 41.5/43.3 |
| Embodiment 3 | Al | FAP2 | Scale-like | 2.0 | 2.0 | 20 | 2.0 | VC/VP/ AMO/VEEA | 25.8/32.1 17.5/9.6 |
| Embodiment 4 | Al | IS2 | Scale-like | 1.0 | 1.0 | 80 | 2.0 | BLM/THFM/ TAOEI/DCPTeOEA/ AA/PEA/DPGDA | 7.4/5.1/ 31.0/32.0/ 5.5/4.0/3.9 |
| Embodiment 5 | Al | IS3 | Scale-like | 0.9 | 0.9 | 80 | 2.0 | AM/PMPM/TMPM/ MAM/EAM/DCPTeA/ PEA/TPGDA/VEEA | 3.9/7.9/3.0/ 3.0/3.1/59.1/ 3.2/1.2/2.0 |
| Embodiment 6 | Al | IS4 | Scale-like | 0.8 | 0.8 | 60 | 2.0 | DCPTeOEM/MLM/ DMTCDDA/DCPTaA/ IBA/CHM/PEA/HPPA | 3.8/3.6/ 19.6/29.1/ 9.6/9.4/6.5/5.0 |
| Embodiment 7 | Al | IS5 | Scale-like | 0.8 | 0.8 | 60 | 2.0 | DMDCPTA/DCPTeM/ DCPTaM/IBM/CHA/ PEA/HBA/VEEA | 45.42/5.5/ 6.6/5.9/17.8/ 4.1/1.1/1.0 |
| Embodiment 8 | Al | IS6 | Scale-like | 0.9 | 0.9 | 20 | 4.0 | BLA/THFA/ PEA/HBA/AMO | 29.1/34.0/ 9.5/9.0/3.2 |

TABLE 1-continued

| | | | | | | | | | |
|---|---|---|---|---|---|---|---|---|---|
| Embodiment 9 | Al | IS1 | Scale-like | 2.0 | 2.0 | 20 | 2.0 | BLA/THFA/VC/PEA | 25.2/32.7/7.2/19.9 |
| Embodiment 10 | Al | FAS1 | Scale-like | 1.1 | 1.1 | 20 | 2.0 | BLA/THFA/TBA/VEEA/UA | 26.6/23.5/15.0/9.5/12.6 |

| | First Ink Constitution ||||||
|---|---|---|---|---|---|---|
| | Dispersant || Substance A || Other Components ||
| | | Content Rate (Mass Part) | | Content Rate (Mass Part) | | Content Rate (Mass Part) |
| Embodiment 1 | D2 | 1.0 | A1 | 0.2 | ic819/scTPO/scDETX | 4.0/4.0/2.0 |
| Embodiment 2 | — | — | A2 | 0.8 | ic819/scTPO/scDETX/UV3500/MEHQ | 4.0/4.0/2.0/0.2/0.2 |
| Embodiment 3 | D2 | 1.4 | A1 | 1.4 | ic819/scTPO/SCDETX/UV3500 | 4.0/4.0/2.0/0.2 |
| Embodiment 4 | — | — | A3 | 0/7 | ic819/scTPO/UV3500/MEHQ | 4.0/4.0/0.2/0.2 |
| Embodiment 5 | — | — | A4 | 1.2 | ic819/scTPO/SCDETX/UV3500/MEHQ | 4.0/4.0/2.0/0.2/0.2 |
| Embodiment 6 | — | — | A1 | 1.0 | ic819/scTPO/scDETX/UV3500/MEHQ | 4.0/4.0/2.0/0.2/0.2 |
| Embodiment 7 | — | — | A1 | 0.58 | ic819/scTPO/scDETX | 4.0/4.0/2.0 |
| Embodiment 8 | — | — | A2 | 0.8 | ic819/scTPO/scDETX/UV3500/MEHQ | 4.0/4.0/2.0/0.2/0.2 |
| Embodiment 9 | D2 | 1.4 | A1 | 1.4 | ic819/scTPO/scDETX/LF | 4.0/4.0/2.0/0.2 |
| Embodiment 10 | — | — | A1 | 0.4 | ic819/scTPO/scDETX/UV3500/MEHQ | 4.0/4.0/2.0/0.2/0.2 |

TABLE 2

| | Metal Powder Constitution || First Ink Constitution |||||||
|---|---|---|---|---|---|---|---|---|---|
| | Constituent Material of Mother Particles | Materials Used for Surface Preparation | Metal Powder ||||| |
| | | | Shape | Average Particle Diameter (μm) | Maximum Particle Diameter (μm) | Average Thickness (nm) | Content Rate (Mass Part) | Polymerized Compound |
| Embodiment 11 | Al | FAS2 | Scale-like | 1.0 | 1.0 | 20 | 2.0 | BLA/THFA/VP/PEA |
| Embodiment 12 | Al | IS1 + S1 | Scale-like | 0.7 | 0.7 | 40 | 4.0 | BLA/THFA/VEEA/BM/UA |
| Embodiment 13 | Al | IS1 + IS2 | Scale-like | 0.9 | 1.5 | 20 | 2.0 | BLA/THFA/PEA |
| Embodiment 14 | Al | IS2 + IS3 | Scale-like | 1.5 | 1.8 | 15 | 1.0 | DAI/TAI/ECA/MTEGA/IBA/BA |
| Embodiment 15 | Ni49.5Fe50.5 | IS4 + IS5 | Scale-like | 1.8 | 1.5 | 40 | 2.0 | BLA/THFA/TBA/VEEA/UA |
| Embodiment 16 | SUS316L | IS1 + IS6 | Scale-like | 1.5 | 0.8 | 40 | 2.0 | BLA/THFA/VEEA/BM/MEDOLA |
| Embodiment 17 | Al | IS1 + S3 | Scale-like | 0.9 | 0.9 | 20 | 1.5 | AMO/THFA |
| Embodiment 18 | Al | FFA1 + S4 | Scale-like | 0.9 | 0.9 | 20 | 1.2 | AMO/THFA/BA |

TABLE 2-continued

| | | | | | | | | |
|---|---|---|---|---|---|---|---|---|
| Embodiment 19 | A1 | IS1 + S5 | Scale-like | 0.9 | 0.8 | 20 | 1.2 | AMO/BA/DCPTaA/CHDOLA |
| Embodiment 20 | A1 | IS1 | Scale-like | 0.8 | 0.8 | 20 | 2.0 | VEEA/PEA |

| | First Ink Constitution | | | |
|---|---|---|---|---|
| | Polymerized Compound | Dispersant | Substance A | Other Components |
| | Content Rate (Mass Part) | Content Rate (Mass Part) | Content Rate (Mass Part) | Content Rate (Mass Part) |
| Embodiment 11 | 33.5/34.9/3.5/16.9 | — | A3 0.8 | ic819/scTPO/UV3500/MEHQ 4.0/4.0/0.2/0.2 |
| Embodiment 12 | 24.9/23.9/14.1/16.1/10.2 | D5 0.2 | A1 0.2 | ic819/scTPO/UV3500/MEHQ 4.0/2.0/0.2/0.2 |
| Embodiment 13 | 32.0/34.1/20.3 | — | A4 1.2 | ic819/scTPO/scDETX/UV3500/MEHQ 4.0/4.0/2.0/0.2/0.2 |
| Embodiment 14 | 20.8/20.0/18.1/17.2/6.0/5.5 | — | A1 1.0 | ic819/scTPO/scDETX/UV3500/MEHQ 4.0/4.0/2.0/0.2/0.2 |
| Embodiment 15 | 27.0/26.5/13.8/15.5/4.0 | — | A2 0.8 | ic819/scTPO/scDETX/UV3500/MEHQ 4.0/4.0/2.0/0.2/0.2 |
| Embodiment 16 | 26.2/27.6/14.1/15.5/4.0 | D5 0.2 | A1 0.2 | ic819/scTPO/scDETX/LHP 4.0/4.0/2.0/0.2 |
| Embodiment 17 | 52.2/34.8 | — | A2 0.3 | ic819/scTPO/scDETX/LHP/LF 4.0/4.0/2.0/0.2/0.2 |
| Embodiment 18 | 40.0/40.0/7.0 | — | A2 0.6 | ic819/scTPO/scDETX/LHP/LF 4.0/4.0/2.0/0.2/0.2 |
| Embodiment 19 | 21.8/21.8/26.0/17.4 | — | A2 0.6 | ic819/scTPO/scDETX/LHP/LF 4.0/4.0/2.0/0.2/0.2 |
| Embodiment 20 | 51.5/34.1 | D2 1.0 | A1 1.0 | ic819/scTPO/scDETX/UV3500/MEHQ 4.0/4.0/2.0/0.2/0.2 |

TABLE 3

| | Metal Powder Constitution | | First Ink Constitution | | | | | |
|---|---|---|---|---|---|---|---|---|
| | | | Metal Powder | | | | | |
| | Constituent Material of Mother Particles | Materials Used for Surface Preparation | Shape | Average Particle Diameter (μm) | Maximum Particle Diameter (μm) | Average Thickness (nm) | Content Rate (Mass Part) | Polymerized Compound |
| Comparative Example 1 | — | — | — | — | — | — | — | — |
| Comparative Example 2 | — | — | — | — | — | — | — | — |
| Comparative Example 3 | A1 | FAP1 | Scale-like | 0.9 | 2.0 | 60 | 2.0 | BLA/PEA |
| Comparative Example 4 | A1 | FAP1 | Scale-like | 0.9 | 2.0 | 60 | 2.0 | BLA/PEA |
| Comparative Example 5 | A1 | FAP1 | Scale-like | 0.9 | 2.0 | 60 | 2.0 | BLA/PEA |
| Comparative Example 6 | A1 | FAP1 | Scale-like | 0.9 | 2.0 | 60 | 2.0 | BLA/PEA |
| Comparative Example 7 | A1 | FAP1 | Scale-like | 0.9 | 2.0 | 60 | 2.0 | BLA/PEA |
| Comparative Example 8 | A1 | FAP1 | Scale-like | 0.9 | 2.0 | 60 | 2.0 | BLA/PEA |

TABLE 3-continued

| | | | | | | | | |
|---|---|---|---|---|---|---|---|---|
| Comparative Example 9 | A1 | FAP1 | Scale-like | 0.9 | 2.0 | 60 | 2.0 | BLA/PEA |
| Comparative Example 10 | A1 | FAP1 | Scale-like | 0.9 | 2.0 | 60 | 2.0 | BLA/PEA |
| Comparative Example 11 | A1 | FAP1 | Sphere | 0.8 | 10 | — | 2.0 | BLA/PEA |

| | First Ink Constitution | | | | | | | |
|---|---|---|---|---|---|---|---|---|
| | Polymerized Compound | Dispersant | | Substance A | | Other Components | | |
| | Content Rate (Mass Part) | | Content Rate (Mass Part) | | Content Rate (Mass Part) | | Content Rate (Mass Part) | |
| Comparative Example 1 | — | — | — | — | — | — | — | |
| Comparative Example 2 | — | — | — | — | — | — | — | |
| Comparative Example 3 | 60.0/27.8 | D2 | 1.0 | A1 | 0.2 | ic819/scTPO/scDETX | 4.0/4.0/2.0 | |
| Comparative Example 4 | 60.0/27.8 | D2 | 1.0 | A1 | 0.2 | ic819/scTPO/scDETX | 4.0/4.0/2.0 | |
| Comparative Example 5 | 60.0/27.8 | D2 | 1.0 | A1 | 0.2 | ic819/scTPO/scDETX | 4.0/4.0/2.0 | |
| Comparative Example 6 | 60.0/27.8 | D2 | 1.0 | A1 | 0.2 | ic819/scTPO/scDETX | 4.0/4.0/2.0 | |
| Comparative Example 7 | 60.0/27.8 | D2 | 1.0 | A1 | 0.2 | ic819/scTPO/scDETX | 4.0/4.0/2.0 | |
| Comparative Example 8 | 60.0/27.8 | D2 | 1.0 | A1 | 0.2 | ic819/scTPO/scDETX | 4.0/4.0/2.0 | |
| Comparative Example 9 | 60.0/27.8 | D2 | 1.0 | A1 | 0.2 | ic819/scTPO/scDETX | 4.0/4.0/2.0 | |
| Comparative Example 10 | 60.0/27.8 | D2 | 1.0 | A1 | 0.2 | ic819/scTPO/scDETX | 4.0/4.0/2.0 | |
| Comparative Example 11 | 60.0/27.8 | D2 | 1.0 | A1 | 0.2 | ic819/scTPO/scDETX | 4.0/4.0/2.0 | |

TABLE 4

| | Metal Powder Constitution | | Second Ink Constitution | | | | | |
|---|---|---|---|---|---|---|---|---|
| | Constituent Material of Mother Particles | Materials Used for Surface Preparation | Metal Powder | | | | | Polymerized Compound |
| | | | Shape | Average Particle Diameter (μm) | Maximum Particle Diameter (μm) | Average Thickness (nm) | Content Rate (Mass Part) | |
| Embodiment 1 | A1 | FAP1 | Scale-like | 0.9 | 2.0 | 60 | 2.0 | BLA/PEA |
| Embodiment 2 | A1 | IS1 | Scale-like | 0.9 | 0.9 | 20 | 4.0 | BLA/THFA |
| Embodiment 3 | A1 | FAP2 | Scale-like | 2.0 | 2.0 | 20 | 2.0 | VC/VP/AMO/VEEA |
| Embodiment 4 | A1 | IS2 | Scale-like | 1.0 | 1.0 | 80 | 2.0 | BLM/THFM/TAOEI/DCPTeOEA/AA/PEA DPGDA |
| Embodiment 5 | A1 | IS3 | Scale-like | 0.9 | 0.9 | 80 | 2.0 | AM/PMPM/TMPM/MAM/EAM/DCPTeA/PEA/TPGDA/VEEA |
| Embodiment 6 | A1 | IS4 | Scale-like | 0.8 | 0.8 | 60 | 2.0 | DCPTeOEM/MLM/DMTCDDA/DCPTaA/IBA/CHM/PEA/HPPA |

TABLE 4-continued

| | | | | | | | | |
|---|---|---|---|---|---|---|---|---|
| Embodiment 7 | A1 | IS5 | Scale-like | 0.8 | 0.8 | 60 | 2.0 | DMDCPTA/DCPTeM/DCPTaM/IBM/CHA/PEA/HBA/VEEA |
| Embodiment 8 | A1 | IS6 | Scale-like | 0.9 | 0.9 | 20 | 4.0 | BLA/THFA/PEA/HBA/AMO |
| Embodiment 9 | A1 | IS1 | Scale-like | 2.0 | 2.0 | 20 | 2.0 | BLA/THFA/VC/PEA |
| Embodiment 10 | A1 | FAS1 | Scale-like | 1.1 | 1.1 | 20 | 20 | BLA/THFA/TBA/VEEA/UA |

| | Second Ink Constitution | | | | | | |
|---|---|---|---|---|---|---|---|
| | Polymerized Compound | Dispersant | | Substance A | | Other Components | |
| | Content Rate (Mass Part) | | Content Rate (Mass Part) | | Content Rate (Mass Part) | | Content Rate (Mass Part) |
| Embodiment 1 | 60.0/27.8 | D2 | 1.0 | A1 | 0.2 | ic819/scTPO/scDETX | 4.0/4.0/2.0 |
| Embodiment 2 | 41.5/43.3 | — | — | A2 | 0.8 | ic819/scTPO/scDETX/UV3500/MEHQ | 4.0/4.0/2.0/0.2/0.2 |
| Embodiment 3 | 25.8/32.1/17.5/9.6 | D2 | 1.4 | A1 | 1.4 | ic819/scTPO/scDETX/UV3500 | 4.0/4.0/2.0/0.2 |
| Embodiment 4 | 7.4/5.1/31.0/32.0/5.5/4.0/3.9 | — | — | A3 | 0.7 | ic819/scTPO/UV3500/MEHQ | 4.0/4.0/0.2/0.2 |
| Embodiment 5 | 3.9/7.9/3.0/3.0/3.1/59.1/3.2/1.2/2.0 | — | — | A4 | 1.2 | ic819/scTPO/scDETX/UV3500/MEHQ | 4.0/4.0/2.0/0.2/0.2 |
| Embodiment 6 | 3.8/3.6/19.6/29.1/9.6/9.4/6.5/5.0 | — | — | A1 | 1.0 | ic819/scTPO/scDETX/UV3500/MEHQ | 4.0/4.0/2.0/0.2/0.2 |
| Embodiment 7 | 45.42/5.5/6.6/5.9/17.8/4.1/1.1/1.0 | — | — | A1 | 0.58 | ic819/scTPO/scDETX | 4.0/4.0/2.0 |
| Embodiment 8 | 29.1/34.0/9.5/9.0/3.2 | — | — | A2 | 0.8 | ic819/scTPO/scDETX/UV3500/MEHQ | 4.0/4.0/2.0/0.2/0.2 |
| Embodiment 9 | 25.2/32.7/7.2/19.9 | D2 | 1.4 | A1 | 1.4 | ic819/scTPO/scDETX/LF | 4.0/4.0/2.0/0.2 |
| Embodiment 10 | 26.6/23.5/15.0/9.5/12.6 | — | — | A1 | 0.4 | ic819/scTPO/scDETX/UV3500/MEHQ | 4.0/4.0/2.0/0.2/0.2 |

TABLE 5

| | Metal Powder Constitution | | Second Ink Constitution | | | | | |
|---|---|---|---|---|---|---|---|---|
| | Constituent Material of Mother Particles | Materials Used for Surface Preparation | Metal Powder | | | | | |
| | | | Shape | Average Particle Diameter (μm) | Maximum Particle Diameter (μm) | Average Thickness (nm) | Content Rate (Mass Part) | Polymerized Compound |
| Embodiment 11 | A1 | FAS2 | Scale-like | 1.0 | 1.0 | 20 | 2.0 | BLA/THFA/VP/PEA |
| Embodiment 12 | A1 | IS1 + S1 | Scale-like | 0.7 | 0.7 | 40 | 4.0 | BLA/THFA/VEEA/BM/UA |

TABLE 5-continued

| | | | | | | | | |
|---|---|---|---|---|---|---|---|---|
| Embodiment 13 | A1 | IS1 + IS2 | Scale-like | 0.9 | 1.5 | 20 | 2.0 | BLA/THFA/PEA |
| Embodiment 14 | A1 | IS2 + IS3 | Scale-like | 1.5 | 1.8 | 15 | 1.0 | DAI/TAI/ECA/MTEGA/IBA/BA |
| Embodiment 15 | Ni49.5 Fe50.5 | IS4 + IS5 | Scale-like | 1.8 | 1.5 | 40 | 2.0 | BLA/THFA/TBA/VEEA/UA |
| Embodiment 16 | SUS316L | IS1 + IS6 | Scale-like | 1.5 | 0.8 | 40 | 2.0 | BLA/THFA/VEEA/BM/MEDOLA |
| Embodiment 17 | A1 | IS1 + S3 | Scale-like | 0.9 | 0.9 | 20 | 1.5 | AMO/THFA |
| Embodiment 18 | A1 | FFA1 + S4 | Scale-like | 0.9 | 0.9 | 20 | 1.2 | AMO/THFA/BA |
| Embodiment 19 | A1 | IS1 + S5 | Scale-like | 0.9 | 0.8 | 20 | 1.2 | AMO/BA/DCPTaA/CHDOLA |
| Embodiment 20 | A1 | IS1 | Scale-like | 0.8 | 0.8 | 20 | 2.0 | VEEA/PEA |

| | Second Ink Constitution | | | | | | | |
|---|---|---|---|---|---|---|---|---|
| | Polymerized Compound | | Dispersant | | Substance A | | Other Components | |
| | Content Rate (Mass Part) | | Content Rate (Mass Part) | | Content Rate (Mass Part) | | | Content Rate (Mass Part) |
| Embodiment 11 | 33.5/34.9/3.5/16.9 | | — | — | A3 | 0.8 | ic819/scTPO/UV3500/MEHQ | 4.0/4.0/0.2/0.2 |
| Embodiment 12 | 24.9/23.9/14.1/16.1/10.2 | | D5 | 0.2 | A1 | 0.2 | ic819/scTPO/UV3500/MEHQ | 4.0/2.0/0.2/0.2 |
| Embodiment 13 | 32.0/34.1/20.3 | | — | — | A4 | 1.2 | ic819/scTPO/scDETX/UV3500/MEHQ | 4.0/4.0/2.0/0.2/0.2 |
| Embodiment 14 | 20.8/20.0/18.1/17.2/6.0/5.5 | | — | — | A1 | 1.0 | ic819/scTPO/scDETX/UV3500/MEHQ | 4.0/4.0/2.0/0.2/0.2 |
| Embodiment 15 | 27.0/26.5/13.8/15.5/4.0 | | — | — | A2 | 0.8 | ic819/scTPO/scDETX/UV3500/MEHQ | 4.0/4.0/2.0/0.2/0.2 |
| Embodiment 16 | 26.2/27.6/14.1/15.5/4.0 | | D5 | 0.2 | A1 | 0.2 | ic819/scTPO/scDETX/LHP | 4.0/4.0/2.0/0.2 |
| Embodiment 17 | 52.2/34.8 | | — | — | A2 | 0.3 | ic819/scTPO/scDETX/LHP/LF | 4.0/4.0/2.0/0.2/0.2 |
| Embodiment 18 | 40.0/40.0/7.0 | | — | — | A2 | 0.6 | ic819/scTPO/scDETX/LHP/LF | 4.0/4.0/2.0/0.2/0.2 |
| Embodiment 19 | 21.8/21.8/26.0/17.4 | | — | — | A2 | 0.6 | ic819/scTPO/scDETX/LHP/LF | 4.0/4.0/2.0/0.2/0.2 |
| Embodiment 20 | 51.5/34.1 | | D2 | 1.0 | A1 | 1.0 | ic819/scTPO/scDETX/UV3500/MEHQ | 4.0/4.0/2.0/0.2/0.2 |

TABLE 6

| | Metal Powder Constitution | | Second Ink Constitution | | | | | |
|---|---|---|---|---|---|---|---|---|
| | Constituent Material of Mother Particles | Materials Used for Surface Preparation | Metal Powder | | | | | Polymerized Compound |
| | | | Shape | Average Particle Diameter (μm) | Maximum Particle Diameter (μm) | Average Thickness (nm) | Content Rate (Mass Part) | |
| Comparative Example 1 | A1 | FAP1 | Scale-like | 0.9 | 2.0 | 60 | 2.0 | BLA/PEA |
| Comparative Example 2 | A1 | FAP1 | Scale-like | 0.9 | 2.0 | 60 | 2.0 | BLA/PEA |
| Comparative Example 3 | A1 | FAP1 | Scale-like | 0.9 | 2.0 | 60 | 2.0 | BLA/PEA |
| Comparative Example 4 | A1 | FAP1 | Scale-like | 0.9 | 2.0 | 60 | 2.0 | BLA/PEA |
| Comparative Example 5 | A1 | FAP1 | Scale-like | 0.9 | 2.0 | 60 | 2.0 | BLA/PEA |
| Comparative Example 6 | A1 | FAP1 | Scale-like | 0.9 | 2.0 | 60 | 2.0 | BLA/PEA |
| Comparative Example 7 | A1 | FAP1 | Scale-like | 0.9 | 2.0 | 60 | 2.0 | BLA/PEA |
| Comparative Example 8 | A1 | FAP1 | Scale-like | 0.9 | 2.0 | 60 | 2.0 | BLA/PEA |
| Comparative Example 9 | A1 | FAP1 | Scale-like | 0.9 | 2.0 | 60 | 2.0 | BLA/PEA |
| Comparative Example 10 | A1 | FAP1 | Scale-like | 0.9 | 2.0 | 60 | 2.0 | BLA/PEA |
| Comparative Example 11 | A1 | FAP1 | Sphere | 0.8 | 10 | — | 2.0 | BLA/PEA |

| | Second Ink Constitution | | | | | | | |
|---|---|---|---|---|---|---|---|---|
| | Polymerized Compound Content Rate (Mass Part) | Dispersant | Content Rate (Mass Part) | Substance A | Content Rate (Mass Part) | Other Components | Content Rate (Mass Part) | |
| Comparative Example 1 | 60.0/27.8 | D2 | 1.0 | A1 | 0.2 | ic819/scTPO/scDETX | 4.0/4.0/2.0 | |
| Comparative Example 2 | 60.0/27.8 | D2 | 1.0 | A1 | 0.2 | ic819/scTPO/scDETX | 4.0/4.0/2.0 | |
| Comparative Example 3 | 60.0/27.8 | D2 | 1.0 | A1 | 0.2 | ic819/scTPO/scDETX | 4.0/4.0/2.0 | |
| Comparative Example 4 | 60.0/27.8 | D2 | 1.0 | A1 | 0.2 | ic819/scTPO/scDETX | 4.0/4.0/2.0 | |
| Comparative Example 5 | 60.0/27.8 | D2 | 1.0 | A1 | 0.2 | ic819/scTPO/scDETX | 4.0/4.0/2.0 | |
| Comparative Example 6 | 60.0/27.8 | D2 | 1.0 | A1 | 0.2 | ic819/scTPO/scDETX | 4.0/4.0/2.0 | |
| Comparative Example 7 | 60.0/27.8 | D2 | 1.0 | A1 | 0.2 | ic819/scTPO/scDETX | 4.0/4.0/2.0 | |
| Comparative Example 8 | 60.0/27.8 | D2 | 1.0 | A1 | 0.2 | ic819/scTPO/scDETX | 4.0/4.0/2.0 | |
| Comparative Example 9 | 60.0/27.8 | D2 | 1.0 | A1 | 0.2 | ic819/scTPO/scDETX | 4.0/4.0/2.0 | |
| Comparative Example 10 | 60.0/27.8 | D2 | 1.0 | A1 | 0.2 | ic819/scTPO/scDETX | 4.0/4.0/2.0 | |
| Comparative Example 11 | 60.0/27.8 | D2 | 1.0 | A1 | 0.2 | ic819/scTPO/scDETX | 4.0/4.0/2.0 | |

TABLE 7

| | Base Material Constituent Material | $X_1$ (g/m$^2$) | $T_1$ (seconds) | $X_2$ (g/m$^2$) | $T_2$ (seconds) | R (Volume %) |
|---|---|---|---|---|---|---|
| Embodiment 1 | PC | 10.0 | 0.010 | 10.0 | 10.0 | 100 |
| Embodiment 2 | PET | 5.0 | 0.50 | 7.0 | 20.0 | 140 |
| Embodiment 3 | Glass | 16.0 | 0.008 | 18.0 | 7.0 | 113 |
| Embodiment 4 | PC | 7.0 | 0.030 | 8.4 | 15.0 | 120 |
| Embodiment 5 | PET | 12.0 | 0.15 | 19.2 | 9.0 | 160 |
| Embodiment 6 | Glass | 3.2 | 0.75 | 5.4 | 7.5 | 169 |
| Embodiment 7 | PC | 17.8 | 0.006 | 26.7 | 12.0 | 150 |
| Embodiment 8 | PET | 11.0 | 0.20 | 13.2 | 6.5 | 120 |

TABLE 7-continued

| | Base Material Constituent Material | $X_1$ (g/m²) | $T_1$ (seconds) | $X_2$ (g/m²) | $T_2$ (seconds) | R (Volume %) |
|---|---|---|---|---|---|---|
| Embodiment 9 | Glass | 8.0 | 0.015 | 8.8 | 28.0 | 110 |
| Embodiment 10 | PC | 14.0 | 0.20 | 18.2 | 11.0 | 130 |
| Embodiment 11 | PET | 11.0 | 0.30 | 16.5 | 13.0 | 150 |
| Embodiment 12 | Glass | 12.0 | 0.40 | 20.4 | 16.0 | 170 |
| Embodiment 13 | PC | 13.0 | 0.050 | 22.8 | 18.0 | 175 |
| Embodiment 14 | PET | 9.0 | 0.080 | 14.0 | 9.5 | 156 |
| Embodiment 15 | Glass | 2.0 | 0.0010 | 40 | 60.0 | 200 |
| Embodiment 16 | PC | 10.0 | 0.25 | 9.5 | 15.0 | 95 |
| Embodiment 17 | PET | 12.0 | 0.015 | 12.0 | 12.0 | 100 |
| Embodiment 18 | PC | 11.0 | 0.080 | 11.0 | 11.0 | 100 |
| Embodiment 19 | Glass | 20.0 | 1.0 | 16.0 | 5.0 | 80 |
| Embodiment 20 | PC | 10.0 | 0.035 | 18.5 | 14.0 | 185 |
| Comparative Example 1 | PC | — | — | 10.0 | 10.0 | — |
| Comparative Example 2 | PC | — | — | 10.0 | 1.0 | — |
| Comparative Example 3 | PC | 1.9 | 0.010 | 10.0 | 10.0 | 526 |
| Comparative Example 4 | PC | 21.0 | 0.010 | 10.0 | 10.0 | 48 |
| Comparative Example 5 | PC | 10.0 | 0.0001 | 10.0 | 10.0 | 100 |
| Comparative Example 6 | PC | 10.0 | 1.1 | 10.0 | 10.0 | 100 |
| Comparative Example 7 | PC | 10.0 | 0.010 | 7.9 | 10.0 | 79 |
| Comparative Example 8 | PC | 10.0 | 0.010 | 20.1 | 10.0 | 201 |
| Comparative Example 9 | PC | 10.0 | 0.010 | 10.0 | 4.9 | 100 |
| Comparative Example 10 | PC | 10.0 | 0.010 | 10.0 | 61.0 | 100 |
| Comparative Example 11 | PC | 10.0 | 0.010 | 10.0 | 61.0 | 100 |

2 Recording Material Evaluation

The following types of evaluations were done for each recording material obtained as noted above.

2.1 Printing Part Shape (Printing Part Precision)

Each recording material produced with each of the embodiments and comparative examples noted above was observed from the side of the surface on which the base material printing part (first layer, second layer) was provided, and the printing part shape was evaluated in accordance with the four levels of standards hereafter.

A: The average gap in the solid pattern of adjacent squares is 0.3 mm or greater and less than 0.7 mm.

B: The average gap in the solid pattern of adjacent squares is 0.2 mm or greater and less than 0.3 mm, or 0.7 mm or greater and less than 0.8 mm.

C: The average gap in the solid pattern of adjacent squares is 0.1 mm or greater and less than 0.2 mm, or 0.8 mm or greater and less than 0.9 mm.

D: The average gap in the solid pattern of adjacent squares is 0 mm (in contact) or greater and less than 0.1 mm, or 0.9 mm or greater.

2.2 Recording Material External Appearance Evaluation

The recording material produced with each of the embodiments and comparative examples noted above was observed by visual inspection from the side on which the printing part (first layer, second layer) was provided, and the aesthetic external appearance (esthetics) was evaluated in accordance with the standard of the seven levels hereafter.

A: Has a glossy appearance (shiny appearance) overflowing with a high class appearance like that which a mirror surface has, has an extremely excellent external appearance.

B: Has a glossy appearance (shiny appearance) overflowing with a high class appearance like that which a mirror surface has, has a very excellent external appearance.

C: Has a glossy appearance (shiny appearance) with a high class appearance like that which a mirror surface has, has an excellent external appearance.

D: Has a glossy appearance (shiny appearance) with a high class appearance like that which a mirror surface has, has a good external appearance.

E: Has an inferior glossy appearance (shiny appearance), external appearance is somewhat poor.

F: Has an inferior glossy appearance (shiny appearance), external appearance is poor.

G: Has an inferior glossy appearance (shiny appearance), external appearance is very poor.

2.3 Degree of Glossiness

Regarding the printing parts of the recording materials produced with each of the embodiments and comparative examples noted above, the degree of glossiness was measured at a flap angle of 60° using a gloss meter (MULTI GLOSS 268 made by Konica Minolta), the degree of the glossiness measured at a flap angle of 60° was evaluated in accordance with standards below. Measurement of the glossiness was performed from the side of the surface on which the printing part (first layer, second layer) was provided.

A: Degree of glossiness of 300 or greater.

B: Degree of glossiness of 200 or greater and less than 300.

C: Degree of glossiness of less than 200.

2.4 Abrasion Resistance

Regarding the recording materials produced with each of the embodiments and comparative examples noted above, at the point when 48 hours elapsed from the production of the recording material, an abrasion resistance test was performed using polyethylene terephthalate film as photo paper (Mitsubishi Plastic, Inc., DIAFOIL 0440E) using a Sutherland rub tester in accordance with JIS K5701. With the same method as discussed above 2.3, the degree of glossiness (flap angle 60°) was measured for the recording materials after the abrasion resistance test, the decrease rate of the degree of glossiness after the abrasion resistance test was obtained, and the evaluation was performed according to the standards below.

A: Glossiness decrease rate is less than 5%.

B: Glossiness decrease rate is 5% or greater and less than 13%.

C: Glossiness decrease rate is 13% or greater and less than 23%.

D: Glossiness decrease rate is 23% or greater and less than 27%.

E: Glossiness decrease rate is 27% or greater, or the metal particles are omitted and the surface of the base material is exposed.

3 Evaluation of Ink Used in Production of Recording Material

The recording materials obtained as noted above were evaluated as noted hereafter.

3.1 Droplet Discharge Stability Evaluation (Discharge Stability Evaluation)

The inks used for each of the embodiments noted above were evaluated using the kind of test shown hereafter.

First, a droplet discharge device equipped in a chamber (thermal chamber) and the inks used with each of the embodiments noted above were prepared, and in a state with the drive waveform of the piezo-element optimized, in an environment of 25° C., 50% RH, for each ink, the droplets were continuously discharged 2,000,000 times (2,000,000 drops) from each nozzle of the droplet discharge head. After that, operation of the droplet discharge device was stopped, and in a state with each ink filled in the flow path of the droplet discharge device, this was left for 360 hours in an environment of 25° C., 50% RH.

After that, continuous discharge of the droplets was performed 4,000,000 times (4,000,000 drops) from each nozzle of the droplet discharge head in an environment of 25° C., 50% RH. After being left for 360 hours, in regards to the droplets discharged 4,000,000 times from the nozzles specified near the center of the droplet discharge head, the average value of the skew amount d from the center target position that the respective droplets were mainly targeted to land at was obtained, and an evaluation was performed in accordance with the five level standards below. We can say that the smaller that this value became, the more effective the prevention of a flying curve.

A: The average value of the skew volume d is less than 0.07 μm.
B: The average value of the skew volume d is 0.07 μm or greater and less than 0.14 μm.
C: The average value of the skew volume d is 0.14 μm or greater and less than 0.17 μm.
D: The average value of the skew volume d is 0.17 μm or greater and less than 0.21 μm.
E: The average value of the skew volume d is 0.21 μm or greater.

3.2 Ink Frequency Characteristics

A droplet discharge device equipped in a chamber (thermal chamber) and the inks used with each of the embodiments noted above were prepared, and in a state with the drive waveform of the piezo-element optimized, in an environment of 25° C., 50% RH, for each ink, droplet discharge was performed while changing the piezo-element vibration count (frequency) from all the nozzles of the droplet discharge head. The droplet discharge time for each frequency was 20 minutes. Up to the frequency for which the undischarged nozzle count is less than 1% of the total nozzle count at the point when 20 minutes of discharge ends is used as the maximum frequency that can be actually used, evaluation of the actually usable frequency range was done according to the four level standards hereafter. The larger this value, the more excellent the frequency characteristics.

A: 15 kHz or greater.
B: 11 kHz or greater and less than 15 kHz.
C: 5 kHz or greater and less than 11 kHz.
D: Less than 5 kHz.

3.3 Evaluation of Ink Storage Stability (Long Term Stability Evaluation)

3.3.1 Settleability

The inks used with the embodiments noted above were respectively placed in a micro tube of height 3 cm, left to stand in an environment of 40° C., and the time was measured until the thickness of the clear layer of supernatant (layer not including metal powder) reached 2 mm, and evaluation was done according to the standards noted hereafter.

A: Time until the clear layer of the supernatant reached 2 mm was two weeks or greater.
B: Time until the clear layer of the supernatant reached 2 mm was one week or greater and less than two weeks.
C: Time until the clear layer of the supernatant reached 2 mm was three days or greater and less than one week.
D: Time until the clear layer of the supernatant reached 2 mm was less than three days.

3.3.2 Occurrence of Foreign Objects (Aggregates) on Filter

After leaving for 60 days in an environment of 40° C., the inks used with the embodiments noted above were filtered in 10 mL under reduced pressure using a membrane filter with filtration accuracy 10 μm. After that, the number of ink derived foreign objects (aggregates) existing in the filter were counted, and these were evaluated according to the standards hereafter.

A: Foreign matter (aggregates) in the filter are not found.
B: Foreign matter (aggregates) existing in the filter are 1 or more and 4 or less.
C: Foreign matter (aggregates) existing in the filter are 5 or more and 29 or less.
D: Foreign matter (aggregates) existing in the filter are 30 or more.

3.4 Rise of Viscosity

After the inks used with the embodiments noted above were left for 30 days in an environment of 60° C., the viscosity of the inks used with each of the embodiments noted above were measured at 25° C. using a vibration type viscometer in compliance with JIS Z8809, rise of viscosity immediately after production was found, and an evaluation was done according to the standards below.

A: The rise of viscosity is less than 10%.
B: The rise of viscosity is 10% or greater and less than 15%.
C: The rise of viscosity is 15% or greater and less than 20%.
D: The rise of viscosity is 20% or greater and less than 25%.
E: The rise of viscosity is 25% or greater, or the occurrence of foreign matter was found.

3.5 Hardenability

For the inks used with each of the embodiments noted above, an Epson inkjet printer PM800C was introduced, and solid printing was performed using DIAFOIL G440E made by Mitsubishi Plastic Corp. as the recording medium (thickness 38 μm) with an ink volume wet at 9 g/m$^2$, and after printing, irradiation of ultraviolet light was done after printing using the RX Firefly LED-UV lamp made by Phoseon Inc. (gap 6 mm, peak wavelength 395 nm, 1000 mW/cm$^2$), confirmation was done of whether the ink was hardened, and evaluation was done according to the five levels of standards below. To determine whether the ink was hardened, the surface was rubbed using a cotton swab, and a determination was made of whether or not unhardened ink was adhered. It is possible to calculate whether or not the irradiation volumes A to E below are applicable depending on how many seconds the lamp was irradiated.

A: Hardened using an ultraviolet light irradiation volume of less than 100 mJ/cm$^2$.
B: Hardened using an ultraviolet light irradiation volume of 100 mJ/cm$^2$ or more and less than 200 mJ/cm$^2$.
C: Hardened using an ultraviolet light irradiation volume of 200 mJ/cm$^2$ or more and less than 500 mJ/cm$^2$.
D: Hardened using an ultraviolet light irradiation volume of 500 mJ/cm$^2$ or more and less than 1000 mJ/cm$^2$.
E: Hardened using an ultraviolet light irradiation volume of 1000 mJ/cm$^2$ or more, or did not harden at all.

These results are shown in table 8 and table 9.

TABLE 8

|  | Printing Part Precision | External Appearance Evaluation | Glossiness | Abrasion Resistance |
| --- | --- | --- | --- | --- |
| Embodiment 1 | A | A | A | A |
| Embodiment 2 | A | A | A | A |

TABLE 8-continued

|  | Printing Part Precision | External Appearance Evaluation | Glossiness | Abrasion Resistance |
|---|---|---|---|---|
| Embodiment 3 | A | A | A | A |
| Embodiment 4 | A | A | A | A |
| Embodiment 5 | A | A | A | A |
| Embodiment 6 | B | A | A | B |
| Embodiment 7 | B | A | A | B |
| Embodiment 8 | A | B | A | A |
| Embodiment 9 | B | A | A | A |
| Embodiment 10 | A | A | A | A |
| Embodiment 11 | A | A | A | A |
| Embodiment 12 | A | A | A | A |
| Embodiment 13 | A | A | A | A |
| Embodiment 14 | A | A | A | A |
| Embodiment 15 | C | B | A | A |
| Embodiment 16 | A | B | A | A |
| Embodiment 17 | A | A | A | A |
| Embodiment 18 | A | A | A | A |
| Embodiment 19 | C | C | A | B |
| Embodiment 20 | B | A | A | A |
| Comparative Example 1 | D | F | B | A |
| Comparative Example 2 | A | G | C | A |
| Comparative Example 3 | D | F | B | A |
| Comparative Example 4 | D | G | C | B |
| Comparative Example 5 | D | F | B | A |
| Comparative Example 6 | D | C | A | A |
| Comparative Example 7 | A | G | C | B |
| Comparative Example 8 | D | D | A | A |
| Comparative Example 9 | A | G | C | E |
| Comparative Example 10 | D | D | A | A |
| Comparative Example 11 | D | G | C | A |

TABLE 9

|  | Discharge Stability | Frequency Characteristics | Settleability | Long-Term Stability | | Hardenability |
|---|---|---|---|---|---|---|
|  |  |  |  | Occurrence of Foreign Matter | Rise of Viscosity |  |
| Embodiment 1 | A | A | A | A | A | A |
| Embodiment 2 | A | A | A | A | A | A |
| Embodiment 3 | A | A | A | A | A | A |
| Embodiment 4 | A | A | A | A | A | A |
| Embodiment 5 | A | A | A | A | A | A |
| Embodiment 6 | A | A | A | A | A | A |
| Embodiment 7 | A | A | A | B | B | A |
| Embodiment 8 | A | A | A | B | B | A |
| Embodiment 9 | A | A | B | A | A | A |
| Embodiment 10 | A | A | A | A | A | A |
| Embodiment 11 | A | A | A | A | A | A |
| Embodiment 12 | B | A | B | A | A | A |
| Embodiment 13 | A | A | A | A | A | A |
| Embodiment 14 | B | A | B | A | A | A |
| Embodiment 15 | A | A | A | A | A | A |
| Embodiment 16 | A | A | A | A | A | B |
| Embodiment 17 | A | B | A | B | B | A |
| Embodiment 18 | A | B | A | B | A | A |
| Embodiment 19 | B | B | B | B | B | B |
| Embodiment 20 | A | A | A | A | A | A |

As is clear from table 8, the recording material of the invention has the printed part of the desired shape provided with good precision, has excellent glossy appearance (particularly the glossy appearance (shiny appearance) like that a mirror surface has) and external appearance, and is also excellent in terms of the abrasion resistance of the printing part. Also, with the invention, the kinds of excellent effects noted above can be obtained regardless of the type of base material. Also, as is clear from table 9, the ink used with the invention has excellent droplet discharge stability, storage stability, and hardenability. In contrast to this, with the comparative examples, satisfactory results could not be obtained.

Following, we will give a detailed description of other preferred embodiments of the invention.

Recording Material Production Method

First, we will describe the recording material production method of the invention.

The production method of the invention is a method of producing a recording material using the inkjet method.

From the past, as a manufacturing method of a decorative product which exhibits a glossy appearance, metallic plating, stamp-printing using a metallic foil, thermal transfer using a metallic foil or the like have been used.

However, with these methods, there was the problem that it was difficult to form fine patterns, or to apply to a curved surface part. Also, with stamp-printing, there was the problem that it was not possible to print metal tones with gradations for which the on-demand capability is low, and it is difficult to handle multi-product production.

On the other hand, as a recording method to a recording medium (base material) by using compositions including pigments or colorants, a recording method using an inkjet method is used. The inkjet method is excellent in terms of formation of fine patterns, in terms of being suitably applied for recording on curved surface parts as well, and in terms of being able to print at specific sites on demand, and being able to print with gradations. Also, in recent years, a composition (ultraviolet-curable ink for inkjet), which becomes hardened by irradiating ultraviolet light, has been used in order to provide an item that is particularly excellent in terms of abrasion resistance, water resistance, solvent resistance, or the like with the inkjet method.

However, with the ultraviolet-curable ink for inkjet, when metal powder was used instead of pigments or colorants, there was a problem that characteristics such as the glossy appearance that the metal has naturally or the like cannot be sufficiently exhibited. "Glossy appearance" includes a shiny glossy appearance having a mirror surface (shiny appearance), or when observing a designated area of a subject, a sparkly glossy appearance (sparkly appearance) for which there is a big difference in the situation of the changes in the reflective state for each site within the area as the observation direction changes such as with lamé, and the like, but when using the ultraviolet-curable ink for inkjet, there was the problem that it was particularly difficult to express the kind of sparkly appearance noted above.

In light of that, the inventors achieved the invention as a result of intense research with the object of resolving the kinds of problems noted above. Specifically, the production method of the invention has a first ink applying step for applying to a base material using an inkjet method a first ink including a first polymerized compound polymerized by irradiation of ultraviolet light, a first curing step for forming a first layer by polymerizing and curing the first polymerized compound by irradiating ultraviolet light, a second ink applying step for applying to an area on which the first layer is formed using the inkjet method a second ink containing a second polymerized compound polymerized by irradiation of ultraviolet light and a metal powder, and a second curing step for forming a second layer by polymerizing and curing the second polymerized compound by irradiation of ultraviolet light, wherein the discharged volume of the first ink in the area is 2.0 g/m$^2$ or greater and 20.0 g/m$^2$ or less, the time from landing of the first ink droplets until irradiation of ultraviolet light on those droplets is 0.0010 second or greater and 1.0 second or less, the discharged volume of the second ink per unit surface area of the area is 10 volume % or greater and 80 volume % or less than the discharged volume of the first ink, and the time from landing of the second ink droplets until irradiation of ultraviolet light on those droplets is 5.0 seconds or greater and 60.0 seconds or less.

In this way, with the invention, before forming the second layer including metal powder by doing ultraviolet light curing for a relatively long time, the first layer which is a scaffold of the second layer is formed by performing ultraviolet light curing for a relatively short time, and by stipulating the volume of ink used for forming the first layer (ink volume per unit surface area) and the volume of ink used for forming the second layer (ink volume per unit surface area), it is possible to fix the hardened material of the first ink droplets on various types of base materials having a desired shape at a desired location, and also possible to form the second layer as an item for which the metal powder arrangement status is suitably controlled, and having a surface shape on which the dents and bumps of the first surface layer are reflected (having fine dents and bumps) in the area in which the first layer (hardened material of first ink droplets) is formed. As a result, it is possible to reliably manufacture stably and with good efficiency a recording material for which there is reliable prevention of a decrease in printing pattern precision due to unintended wetting and spreading (excessive wetting and spreading) or repelling of the ink, and having a printing part that has the desired shape, and also has a sparkly glossy appearance (sparkly appearance) for which there is a big difference in the situation of the changes in the reflective state for each site such as with lamd as the observation direction changes.

Following, we will give a detailed description of preferred embodiments of the production method of the invention while referring to the attached drawings.

FIGS. 2A-2D are cross section views schematically showing a preferred embodiment of the recording material production method of the invention.

As shown in FIGS. 2A-2D, the production method of this embodiment a first ink applying step (FIG. 2A) of using the inkjet method to apply a first ink 2' including a first polymerized compound 21' polymerized by irradiation of ultraviolet light on a surface for which at least the surface is a base material (recording medium) 1, a first curing step (FIG. 2B) of forming a first layer 2 as the hardened material 21 for which the first polymerized compound 21' was polymerized and hardened by irradiation of ultraviolet light, a second ink applying step (FIG. 2C) using the inkjet method to apply a second ink 3' containing a second polymerized compound 32' polymerized by irradiation of ultraviolet light and a metal powder 31 to an area on which the first layer 2 is formed (area on which a second layer 3 is to be formed as a film with no gaps), and a second curing step (FIG. 2D) for forming the second layer 3 as a hardened material 32 for which the second polymerized compound 32' was polymerized and hardened by irradiation of ultraviolet light.

First Ink Applying Step

Figure 2A:
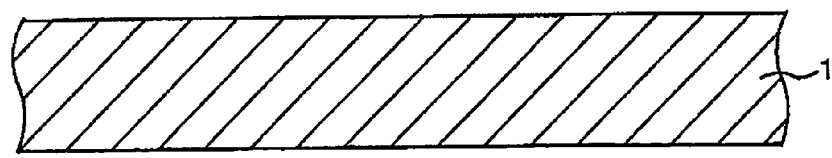
FIGS. 2A, 2B, 2C, 2D are cross section views schematically showing another preferred embodiment of the recording material production method of the invention.

With this step, the first ink 2' is applied using the inkjet method to the surface of the base material (recording material) 1 (FIG. 2A).

The base material 1 can be anything, so absorbability or non-absorbability can be used and for example, it is possible to use paper (regular paper, paper for inkjet or the like), plastic material, metal, ceramic, wood material, shells, or natural fiber or synthetic fiber such as cotton, polyester, wool or the like, non-woven fiber or the like, and it is preferable to have at least the surface (site at which the first ink 2' is applied) be constituted using a non-liquid absorbing material (e.g. plastic material, metal, ceramic, shells or the like). By doing this, when using a non-absorbable (non-liquid absorbing) item as the base material 1, it is possible to more suitably perform control of the shape of the hardened material 21 of the first ink 2'.

With the invention, a non-absorbable recording medium means an item that substantially does not absorb ink, and more specifically, means an item for which the contact angle of droplets after landing is 10 degrees or greater.

Among these, it is preferable that the base material 1 have at least the surface be constituted using polyester. By doing this, it is possible to more reliably cure the first polymerized compound 21' (in particular, the first polymerized compound 21' including a monomer having an alicyclic structure described in detail later) into the desired shape.

As the polyester constituting the base material 1, examples include polyethylene terephthalate, polytrimethylene terephthalate, polybutylene terephthalate and the like, but polyethylene terephthalate is preferable. By doing this, it is possible to have particularly excellent adhesiveness between the first layer 2 (in particular, the first layer 2 formed using the first ink 2' including a monomer having the alicyclic structure described in detail later as the first polymerized compound 21') and the base material 1, and it is also possible to have particularly excellent heat resistance of the finally obtained recording material 10.

The first ink 2' is an item including the first polymerized compound 21' polymerized by irradiation of ultraviolet light. The first polymerized compound 21' is an item that is polymerized and cured with the first curing step described in detail later to form the hardened material 21.

The first polymerized compound 21' is in liquid form. By doing this, it is not necessary to use the liquid component removed (vaporized) in the production process of the recording material 10, and with the production of the recording material 10, it is not necessary to provide a step of removing this kind of liquid component, so it is possible to have particularly excellent productivity for the recording material 10. Also, since it is not necessary to use an organic solvent, an occurrence of the VOC (volatile organic compound) problem can be prevented.

As the first polymerized compound 21', it is acceptable as long as it is a component that can be polymerized by irradiating ultraviolet, and for example, various types of monomer, various types of oligomer (including dimer, trimer, or the like), or the like can be used, but it is preferable that the first ink 2' use an item that at least includes a monomer component as the first polymerized compound 21'. A monomer is a component that generally has a lower viscosity than an oligomer component or the like, so the first ink 2' has an advantage of having particularly excellent discharge stability.

In particular, the first ink 2' preferably includes a monomer having an alicyclic structure as the first polymerized compound 21'. By doing this, it is possible to have particularly excellent adhesiveness of the hardened material 21 (first layer 2) formed with the first curing step on the base material 1, and possible to more easily form the hardened material 21 (first layer 2) controlled to the desired shape.

Examples of a monomer having an alicyclic structure include tris (2-(meth) acryloyloxyethyl) isocyanurate, dicyclopentenyloxyethyl (meth) acrylate, adamantyl (meth) acrylate, γ-butyrolactone (meth) acrylate, N-vinyl caprolactam, N-vinylpyrrolidone, pentamethylpiperidyl (meth) acrylate, tetramethylpiperidyl (meth) acrylate, 2-methyl-2-adamantyl (meth) acrylate, 2-ethyl-2-adamantyl (meth) acrylate, mevalonic acid lactone (meth) acrylate, dimethylol tricyclodecanedi (meth) acrylate, dimethylol dicyclopentane di (meth) acrylate, dicyclopentenyl (meth) acrylate, dicyclopentanyl (meth) acrylate, isobornyl (meth) acrylate, cyclohexyl (meth) acrylate, (meth) acryloyl morpholine, tetrahydrofurfuryl (meth) acrylate, phenyl glycidyl ether (meth) acrylate, EO-modified hydrogenated bisphenol A di (meth) acrylate, di (meth) acrylated isocyanurate, tri (meth) acrylated isocyanurate and the like, but it is preferable to be an item including one type or two or more types selected from the group consisting of tris (2-acryloyloxyethyl) isocyanurate, dicyclopentenyloxyethyl ethyl acrylate, adamantyl acrylate, γ-butyrolactone acrylate, N-vinylcaprolactam, N-vinylpyrrolidone, pentamethylpiperidyl acrylate, tetramethylpiperidyl acrylate, 2-methyl-2-adamantyl acrylate, 2-ethyl-2-adamantyl acrylate, cyclohexane spiro-2-(1,3-dioxolan-4-yl) methyl acrylate, (2-methyl-2-ethyl-1,3-dioxolan-4-yl) methyl acrylate, mevalonic acid lactone acrylate, dimethylol tricyclodecane diacrylate, dimethylol dicyclopentane diacrylate, dicyclopentenyl acrylate, dicyclopentanyl acrylate, isobornyl acrylate, cyclohexyl acrylate, acryloyl morpholine, and tetrahydrofurfuryl acrylate. By doing this, it is possible to have an item that is even more excellent in terms of adhesiveness of the hardened material 21 (first layer 2) formed with the first curing process with the base material 1, and possible to more easily form the hardened material 21 (first layer 2) controlled to the desired shape. It is also possible to have the first ink 2' have even more excellent storage stability and discharge stability.

Among those, from the perspective of the curing speed of the first ink 2' with the first curing step, and further improving the productivity of the recording material 10, it is preferable to be an item including one type or two or more types selected from the group consisting of tris (2-acryloyloxyethyl) isocyanurate, dicyclopentenyloxyethyl ethyl acrylate, γ-butyrolactone acrylate, N-vinylpyrrolidone, dimethylol tricyclodecane diacrylate, dimethylol dicyclopentane diacrylate, dicyclopentenyl acrylate, dicyclopentanyl acrylate, acryloyl morpholine, and tetrahydrofurfuryl acrylate, more preferable to be an item including acryloyl morpholine and/or γ-butyrolactone acrylate, and even more preferable to be an item including γ-butyrolactone acrylate.

Also, when it is an item including one type or two or more types selected from the group consisting of cyclohexyl acrylate, tetrahydrofurfuryl acrylate, and benzyl acrylate, it is possible to have an item even more excellent in terms of flexibility of the hardened material 21 (first layer 2).

Also, when it is an item including one type or two or more types selected from the group consisting of γ-butyrolactone acrylate, N-vinylcaprolactam, N-vinylpyrrolidone, isobornyl acrylate, and tetrahydrofurfuryl acrylate, the shrinkage ratio during curing of the first ink 2' is smaller, and it is possible to more effectively prevent the occurrence of unintended creases in the hardened material 21 (first layer 2).

The content rate of the monomer having an alicyclic structure in the first ink 2' is preferably 40 mass % or greater and 90 mass % or less, more preferably 50 mass % or greater and 88 mass % or less, and even more preferably 55 mass % or greater and 85 mass % or less. The first ink 2' can also be an item that includes two or more compounds as the monomer having an alicyclic structure. In this case, the sum of the content rates of these is preferably a value in the range noted above.

The monomer having an alicyclic structure is preferably an item for which the number of constituent atoms of the cyclic structure formed by covalent bond is 5 or greater, and more preferably 6 or greater. By doing this, it is possible to have particularly excellent storage stability of the first ink 2'.

As the monomer having an alicyclic structure, the first ink 2' preferably includes a monofunctional monomer including a heteroatom in the alicyclic structure (monofunctional monomer having a heterocycle that does not indicate aromaticity). By doing this, it is possible to obtain particularly excellent discharge stability over a long time. Examples of this kind of monofunctional monomer include, for example, tris (2-(meth) acryloyloxyethyl) isocyanurate, γ-butyrolactone (meth) acrylate, N-vinyl caprolactam, N-vinylpyrrolidone, pentamethylpiperidyl (meth) acrylate, tetramethylpiperidyl (meth) acrylate, mevalonic acid lactone (meth) acrylate, (meth) acryloyl morpholine, tetrahydrofurfuryl (meth) acrylate and the like.

The content rate of the monofunctional monomer in the first ink 2' (monofunctional monomer having a heteroatom in the alicyclic structure) is preferably 10 mass % or greater and 80 mass % or less, more preferably 15 mass % or greater and 75 mass % or less. By doing this, it is possible to more effectively suppress curing shrinkage. The first ink 2' can also be an item including two types or more of compounds as the monofunctional monomer including a heteroatom in the alicyclic structure. In this case, it is preferable that the sum of the content rates of these be a value within the range noted above.

The polymerized compound constituting the first ink 2' can also be an item including a monomer that does not have an alicyclic structure.

As this kind of monomer (monomer not having an alicyclic structure), it is preferable to be an item including one type or two types or more selected from the group consisting of, for example, phenoxyethyl (meth) acrylate, benzyl (meth) acrylate, (meth) acrylate 2-(2-vinyloxy ethoxy) ethyl, dipropylene glycol di (meth) acrylate, tripropylene glycol di (meth) acrylate, 2-hydroxy-3-phenoxypropyl (meth) acrylate, and 4-hydroxybutyl (meth) acrylate, lauryl (meth) acrylate, 2-methoxyethyl (meth) acrylate, isooctyl (meth) acrylate, stearyl (meth) acrylate, 2-ethoxyethyl (meth) acrylate, benzyl (meth) acrylate, 1H, 1H, 5H-octafluoropentyl (meth) acrylate, 2-hydroxyethyl (meth) acrylate, 2-hydroxypropyl (meth) acrylate, isobutyl (meth) acrylate, t-butyl (meth) acrylate, ethyl carbitol (meth) acrylate, 2,2,2-trifluoroethyl (meth) acrylate, 2,2,3,3-tetrafluoropropyl (meth) acrylate, methoxy triethylene glycol (meth) acrylate, PO-modified nonylphenol (meth) acrylate, EO-modified nonylphenol (meth) acrylate, EO-modified 2 ethylhexyl (meth) acrylate, phenoxy diethylene glycol (meth) acrylate, EO-modified phenol (meth) acrylate, EO-modified cresol (meth) acrylate, methoxy polyethylene glycol (meth) acrylate, dipropylene glycol (meth) acrylate, 2-n-butyl-2-ethyl-1,3-propanediol di (meth) acrylate, tetraethylene glycol di (meth) acrylate, 1,9-nonanediol di (meth) acrylate, 1,4-butanediol di (meth) acrylate, bisphenol A EO-modified di (meth) acrylate, 1,6-hexanediol di (meth) acrylate, polyethylene glycol 200 di (meth) acrylate, polyethylene glycol 300 di (meth) acrylate, neopentyl glycol hydroxypivalate di (meth) acrylate, 2-ethyl-2-butyl-propanediol di (meth) acrylate, polyethylene glycol 400 di (meth) acrylate, polyethylene glycol 600 di (meth) acrylate, polypropylene glycol di (meth) acrylate, bisphenol A EO-modified di (meth) acrylate, PO-modified bisphenol A di (meth) acrylate, trimethylolpropane tri (meth)) acrylate, pentaerythritol tri (meth) acrylate, trimethylolpropane EO-modified tri (meth) acrylate, glycerin PO-added tri (meth) acrylate, tris (meth) acryloyloxyethyl phosphate, pentaerythritol tetra (meth) acrylate, PO modified trimethylolpropane tri (meth) acrylate, 2-(meth) acryloyloxyethyl phthalate, 3-(meth) acryloyloxypropyl acrylate, w-carboxy (meth) acryloyloxyethyl phthalate, di-trimethylolpropane tetra (meth) acrylate, dipentaerythritol penta-/hexa-(meth) acrylate, dipentaerythritol hexa (meth) acrylate and the like, but it is preferable to include one type or two or more types selected from the group consisting of phenoxy ethyl acrylate, benzyl acrylate, acrylic acid 2-(2-vinyloxyethoxyl) ethyl, dipropylene glycol diacrylate, tripropylene glycol diacrylate, 2-hydroxy 3-phenoxy propyl acrylate, and 4-hydroxy butyl acrylate. In addition to the monomer having an alicyclic structure, by including this kind of monomer that does not have an alicyclic structure, it is possible to have an item with excellent storage stability and discharge stability for the first ink 2', to have particularly excellent reactivity of the first ink 2' after discharge using the inkjet method, and to have particularly excellent productivity of the recording material 10.

Among these, when it is an item including acrylic acid 2-(2-vinyloxyethoxy) ethyl, it is possible to have more excellent curing speed of the first ink 2' when irradiating the ultraviolet light, and productivity of the recording material 10.

Also, when it is an item including phenoxyethyl acrylate and/or 2-hydroxy 3-phenoxypropyl acrylate, it is possible to have even more excellent flexibility of the hardened material 21 (first layer 2).

Also, when it is an item including phenoxyethyl acrylate, it is possible to make the shrinkage ratio during curing of the first ink 2' lower, and to more effectively prevent the occurrence of unintended creases in the hardened material 21 (first layer 2).

The content rate of the monomer other than a monomer having an alicyclic structure in the first ink 2' is preferably 5 mass % or greater and 50 mass % or less, and more preferably 10 mass % or greater and 40 mass % or less. By doing this, while having particularly excellent curing speed of the first ink 2' and flexibility of the hardened material 21 (first layer 2), it is easier to adjust the shrinkage ratio during curing or the like. It is also possible to have the first ink 2' be an item that includes two types or more of a compound as the monomer that does not have an alicyclic structure. In this case, it is preferable that the sum of the content rates of these be a value within the range noted above.

Also, as a polymerized compound, besides monomers, the first ink 2' can include oligomers (including dimer, trimer, or the like). As a prepolymer, oligomers can use an item that has monomers such as those described above as constituent components, for example. The first ink 2' preferably is an item including a multifunctional oligomer. By doing this, it is possible to have the first ink 2' have particularly excellent storage stability. Also, for example when the first ink 2' does not include metal powder, it is possible to prevent the viscosity of the first ink 2' from becoming too low, and possible to suitably adjust the viscosity balance with the second ink 3'. As the oligomer, it is preferable to use a urethane oligomer for which the repeated structure is urethane, and to use an epoxy oligomer for which the repeated structure is epoxy or the like.

The content rate of the polymerized compound in the first ink T is preferably 70 mass % or greater and 99 mass % or less, and more preferably 80 mass % or greater and 98 mass % or less. By doing this, it is possible to have more excellent storage stability, discharge stability, and hardenability of the first ink 2'. The first ink 2' can also include two or more types of compounds as the polymerized compound. In that case, it is preferable that the sum of the content rates of these be a value within the range noted above.

The first ink 2' can also include a component aside from those described above (other components). Examples of such components include, for example, coloring agents, metal powder, photopolymerization initiators, slip agents (leveling agents), polymerization accelerators, polymerization inhibitors, penetration enhancers, wetting agents (humectants), fixing agents, antifungal agents, preservatives, antioxidants, chelating agents, thickeners, sensitizers (sensitizing dyes) and the like.

When the first ink 2' includes a coloring agent, it is possible to suitably adjust the color tone of the printing part having the first layer 2 and the second layer 3. Also, when the first ink 2' includes a coloring agent, for example even if the base material 1 is constituted with a material with high transparency, it is possible to increase the concealing capability, and possible to increase the visibility of the printing part (in particular, the printing part by the second ink 3' (second layer 3)).

Also, the first ink 2' can include a metal powder such as described as a constituent component of the second ink 3' described in detail later. By doing this, even if the base material 1 is constituted with a material having high transparency, it is possible to exhibit particularly high concealing capability, possible to increase the visibility of the printing part (particularly the printing part using the second ink 3' (second layer 3)), and it is also possible to do a supplementary increase in the glossy appearance of the printing part, and as a result, it is possible to have particularly excellent glossy appearance for the printing part of the recording material 10. When the first ink 2' includes metal powder, in the first layer formed using the first ink 2', that metal powder does not have to be arranged methodically as with the metal powder 31 in the second layer 3 described in detail later. This is because the metal powder in the first layer 2 exhibits nothing more than the function of doing a supplementary increase in the glossy appearance of the overall printing part, and the metal powder 31 in the second layer 3 is predominant for the glossy appearance of the overall printing part.

The photopolymerization initiator is not particularly limited as long as it can generate an active species such as radical, cation, or the like by the irradiation of ultraviolet light and it can start the polymerization reaction of the polymerized compound noted above (first polymerized compound). As a photopolymerization initiator, a photo-radical polymerization initiator or a photo-cation polymerization initiator can be used, but it is preferable to use the photo-radical polymerization initiator. When the photopolymerization initiator is used, it is preferable that the photopolymerization initiator have an absorption peak in the ultraviolet range.

Examples of the photo-radical polymerization initiator include aromatic ketones, acyl phosphine oxide compounds, aromatic onium salt compounds, organic peroxides, thio compounds (thioxanthone compounds, and thiophenyl group-containing compounds), hexaarylbiimidazole compounds, ketoxime ester compounds, borate compounds, azinium compounds, metal locene compounds, active ester compounds, compounds having a carbon-halogen bond, alkylamine compounds, or the like.

Among these, in view of resolvability in the polymerized compound (first polymerized compound) and hardenability, it is preferable to have at least one type selected from acyl phosphine oxide compound and thioxanthone compound, and it is more preferable to combine acyl phosphine oxide compound and thioxanthone compound.

Concrete examples of the photo-radical polymerization initiator include acetophenone, acetophenone benzyl ketal, 1-hydroxy cyclohexyl phenyl ketone, 2,2-dimethoxy-2-phenylacetophenone, xanthone, fluorenone, benzaldehyde, fluorene, anthraquinone, triphenylamine, carbazole, 3-methyl-aceto phenone, 4-chlorobenzophenone, 4,4'-dimethoxy-benzophenone, 4,4'-diamino benzophenone, Michler's ketone, benzoin propyl ether, benzoin ethyl ether, benzyl dimethyl ketal, 1-(4-isopropyl-phenyl)-2-hydroxy-2-methylpropane-1-one, 2-hydroxy-2-methyl-1-phenylpropan-1-one, thioxanthone, diethyl thioxanthone, 2-isopropylthioxanthone, 2-chlorothioxanthone, 2-methyl-1-[4-(methylthio)phenyl]-2-morpholino-propan-1-one, bis (2,4,6-trimethyl benzoyl)-phenyl phosphine oxide, 2,4,6-trimethylbenzoyl-diphenyl-phosphine oxide, 2,4-diethyloxan, and bis (2,6-dimethylbenzoyl)-2,4,4-trimethylpentyl phosphine oxide, or the like, and it is possible to select one type or two or more types of compounds from among these and use them in combination.

The content rate of the photopolymerization initiator in the first ink 2' is preferably 0.5 mass % or more and 10 mass % or less. When the content rate of the photopolymerization initiator is in the range noted above, the ultraviolet curing speed is sufficiently high, and in addition, there are almost no remains of melted photopolymerization initiator or coloration caused by the photopolymerization initiator.

The first ink 2' can include a polymerization inhibitor, but even when it includes a polymerization inhibitor, it is preferable that the content rate of the polymerization inhibitor in the first ink 2' be 0.6 mass % or less, and more preferably 0.2 mass % or less. By doing this, it is possible to have an item that has a relatively high content rate of the first polymerized compound 21' in the first ink 2', so it is possible to have particularly excellent adhesiveness of the first layer 2 formed using the first ink 2' in relation to the base material 1.

Also, the first ink 2' can include a dispersant and a substance A described in detail later as constituent components of the second ink 3'. By doing this, the same effects as those described in detail later can be obtained.

Also, it is preferable that the first ink 2' not include an organic solvent that is removed (vaporized) in the production process of the recording material 10. Because of this, an occurrence of the VOC (volatile organic compound) problem can be effectively prevented.

Also, the first ink 2' preferably includes shared components with the second ink 3' described in detail later (particularly items having the same composition as the polymerized compound), and more preferably is an item including the same composition as the second ink 3'. By doing this, it is easier to do the setting, adjustment and the like of the discharge conditions of the ink (first ink 2' and second ink 3') using the inkjet method. Also, it is possible to have particularly excellent affinity of the first layer 2 formed using the first ink 2' with the second ink 3', so it is possible to more effectively prevent unintended wetting and spreading or the like of the second ink 3', and possible to more reliably form the second layer 3 selectively in the area on which the first layer 2 is formed. As a result it is possible to more easily and more reliably have a high precision printing part. Also, with the finally obtained recording material 10, it is possible to have an item that is particularly excellent in terms of adhesiveness between the first layer 2 formed using the first ink 2' and the second layer 3 formed using the second ink 3', and possible to have particularly excellent durability and reliability for the recording material 10.

The contact angle of the first ink 2' to the base material 1 is preferably 30 degrees or greater and 85 degrees or less, more preferably 35 degrees or greater and 80 degrees or less, and even more preferably 40 degrees or greater and 75 degrees or less. By doing this, with appropriately excellent affinity of the first ink 2' to the base material 1, while having particularly excellent adhesiveness of the first layer 2 formed on the base material 1 with a later step, it is possible to more reliably prevent having more wetting and spreading than necessary or the like of the first ink 2' on the base material 1, and to have the first layer 2 more reliably have the desired shape. With the invention, as the "contact angle to the base material," it is possible to use a contact angle in relation to the base material of ink at 25° C. measured in conformance with the θ/2 method.

The viscosity of the first ink 2' at room temperature (25° C.) is preferably 4 mPa·s or greater and 40 mPa·s or less, and more preferably 6 mPa·s or greater and 30 mPa·s or less. By doing this, while having particularly excellent discharge stability for the first ink 2', it is possible to more effectively inhibit bleeding of the first ink 2' when droplets land, and possible to more reliably harden the first ink 2' droplets to the desired shape. With the invention, the viscosity of the first ink (also the same for the second ink) can be measured in compliance with JIS Z88009 using a vibration type viscometer.

The surface tension of the first ink 2' at 25° C. is preferably 14 mN/m or greater and 50 mN/m or less. By doing this, while having particularly excellent discharge stability for the first ink 2', it is possible to more effectively inhibit bleeding of the first ink 2' when the droplets land, and possible to more reliably harden the first ink 2' droplets to the desired shape. With the invention, the surface tension of the first ink (also the same for the second ink) can be measured in compliance with JIS K 3362.

As a droplet discharge method (inkjet method), a piezo method or a method that discharges ink using bubbles generated by heating ink or the like can be used, but from the viewpoint of the difficulty of making property changes in the constituent components of the ink and the like, the piezo method is preferable.

A publicly known droplet discharge device can be used for performing the discharging of the ink using the inkjet method.

The discharged volume per unit surface area of the first ink 2' on the area to which the first ink 2' is applied with this step (the area on which the first layer 2 is formed) is preferably 2.0 g/m$^2$ or greater and 20.0 g/m$^2$ or less. By having the discharged volume of the first ink 2' be a value within the range noted above, it is possible to reliably form the first layer 2 in the desired shape at a later step, and at an even later step, it is possible to have that first layer 2 reliably exhibit a function as a scaffold when forming the second layer 3. Also, since it is possible to reliably form the first layer 2 of the desired shape (first layer 2 having dents and bumps on the surface), it is possible to form the second layer 3 as an item having a surface shape for which the dents and bumps of the surface of the first layer 2 are reflected (having fine dents and bumps). As a result, it is possible to reliably produce the recording material 10 for which the printing part having a sparkly glossy appearance (sparkly appearance) for which there is a big difference in the situation of the changes in the reflective state for each site such as with lamé as the observation direction changes is provided with good precision.

In contrast to this, when the discharged volume of the first ink 2' is less than the lower limit noted above, the first layer 2 obtained by curing the first ink 2' cannot sufficiently exhibit the function as a scaffold when forming the second layer 3 as described previously, and it is not possible to obtain the recording material 10 for which the printing part is provided with good precision. Also, when the discharged volume of the first ink 2' is less than the lower limit noted above, it is not possible to have the first layer 2 obtained by curing the first ink 2' of the desired shape (having dents and bumps on the surface, and being a shape for which their difference of elevation is sufficiently large), and it is not possible to be an item for which the second layer 3 formed on the first layer 2 has dents and bumps having a suitable difference in elevation on the surface. As a result, it is not possible to form a printing part having a sparkly appearance. Also, when the discharged volume of the first ink 2' exceeds the upper limit noted above, the first layer 2 obtained by curing the first ink 2' cannot sufficiently exhibit the function as a scaffold when forming the second layer 3 as described previously, and it is not possible to obtain the recording material 10 for which the printing part is provided with good precision.

As noted above, it is acceptable for the discharged volume per unit surface area of the first ink 2' on the area to which the first ink 2' is applied (the area on which the first layer 2 is formed) to be 2.0 g/m$^2$ or greater and 20.0 g/m$^2$ or less, but it is preferable to be 3.0 g/m$^2$ or greater and 18.0 g/m$^2$ or less, and more preferably 5.0 g/m$^2$ or greater and 16.0 g/m$^2$ or less. By doing this, the kind of effects described above are more markedly exhibited.

The droplet volume of the first ink 2' discharged by one discharge operation using the inkjet method is preferably 3 ng or greater and 30 ng or less, more preferably 5 ng or greater and 25 ng or less, and even more preferably 7 ng or greater and 20 ng or less. By doing this, it is possible to more reliably form the first layer 2 of the desired shape at a later step, and at even later steps, it is possible to more effectively exhibit the function as the scaffold when forming the second layer 3 on that first layer 2, and to more reliably control the surface shape of the second layer 3, and as a result, it is possible to more reliably produce the recording material 10 for which the printing part having an excellent glossy appearance (sparkly appearance) like that of lamé is provided with good precision, and it is possible to have particularly excellent productivity for the recording material 10.

In contrast to this, when the droplet volume of the first ink 2' discharged by one discharge operation using the inkjet method is less than the lower limit noted above, the productivity of the recording material 10 decreases. Also, when the droplet volume of the first ink 2' discharged by one discharge operation using the inkjet method is less than the lower limit noted above, it is difficult to form the first layer 2 as an item having dents and bumps on the surface with a sufficiently large difference in elevation, and as a result, there is a possibility of it being difficult to have the sparkly appearance (excellent glossy appearance such as with lamé) for the printing part that the recording material 10 has. Also, when the droplet volume of the first ink 2' discharged by one discharge operation using the inkjet method exceeds the upper limit noted above, due to the composition of the first ink 2' and the like, it is difficult to have the first layer 2 have the desired shape, it is difficult for the first layer 2' obtained by curing the first ink 2' to exhibit the function as the scaffold when forming the second layer 3 as described previously, it is difficult to reliably control the surface shape of the second layer 3, and it is possible that it will be difficult for the printing part that the finally obtained recording material 10 has to have a sufficiently excellent sparkly appearance (excellent glossy appearance such as lamé has), or sufficiently excellent precision.

First Curing Step

Figure 2B:
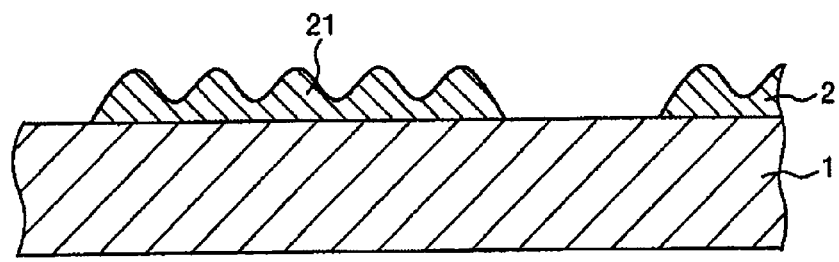

Next, by irradiating ultraviolet light, the first polymerized compound 21' is polymerized and cured (FIG. 2B). By doing this, the first layer 2 is formed constituted by a material including the hardened material 21 of the first polymerized compound 21'.

This step is performed to satisfy the conditions noted hereafter. Specifically, after the first ink 2' droplets land on the base material 1 with the first ink applying step described previously, this is performed so that the time until the ultraviolet light is irradiated on those droplets with this step is 0.001 seconds or more and 1.0 second or less. In this way, by implementing the curing process for a sufficiently short time after landing of the first ink 2' droplets, it is possible to reliably prevent having the droplets of the first ink 2' be wetted and spread more than necessary on the base material 1, possible to reliably have the hardened material 21' (first layer 2) of the first polymerized compound 21' have the desired shape at the desired site, and to reliably have excellent adhesiveness of the base material 1 and the hardened material 21 (first layer 2). As a result, it is possible to suitably arrange the metal powder 31 in the second layer 3 while the second layer 3 formed using the second ink 3' with a step described in detail later reliably has the desired shape. As a result, it is possible to reliably obtain the recording material 10 equipped with the printing part having a sparkly glossy appearance (sparkly appearance) for which there is a big difference in the situation of the changes in the reflective state for each site such as with lamé as the observation direction changes. In particular, it is possible to stably obtain the kinds of effects described above for various types of base material 1.

In contrast to this, when the time from when the droplets of the first ink 2' land on the base material 1 at the first ink applying step until irradiation of the ultraviolet light on those droplets with this step is less than the lower limit noted above, the adhesiveness between the base material 1 and the hardened material 21 (first layer 2) decreases, and the defective product rate increases due to progression of the curing reaction before landing of the droplets of the first ink 2' on the base material 1. Also, when the time from when the droplets of the first ink 2' land on the base material 1 with the first ink applying step until irradiation of the ultraviolet light on those droplets with this step exceeds the upper limit noted above, depending on the type of base material 1, due to the first ink 2' excessively wetting and spreading on the base material 1, or the first ink 2' applied on the base material 1 being repelled, it is difficult to form the first layer 2 having the desired shape with good precision. As a result, it is not possible to have an item that is sufficiently excellent in terms of the precision of the printing part with the finally obtained recording material 10. Also, when the droplet volume of the first ink 2' discharged by one discharge operation using the inkjet method until irradiation of the ultraviolet light on those droplets with this step exceeds the upper limit noted above, it is difficult to form the first layer 2 as an item having dents and bumps for which the difference in elevation on the surface is sufficiently large, and as a result, there may be cases when it is not possible for the printing part that the finally obtained recording material 10 has to have a sufficiently excellent sparkly appearance (excellent glossy appearance such as lamé has).

As described above, after the droplets of the first ink 2' land on the base material 1 with the first ink applying step, the time until irradiation of the ultraviolet light on those droplets with this step can be 0.0010 seconds or greater and 1.0 second or less, but is preferably 0.005 seconds or greater and 0.8 seconds or less, and more preferably 0.008 seconds or greater and 0.5 seconds or less. By doing this, the effects described above are more markedly exhibited.

Also, with this step, the time from when irradiation of ultraviolet light on droplets of the first ink 2' starts until the level of curing of the first polymerized compound 21' included in those droplets reaches 90% is preferably 0.5 seconds or less, more preferably 0.3 seconds or less, and even more preferably 0.2 seconds or less. In this way, by the curing reaction advancing in a sufficiently short time, it is possible to more reliably prevent unintended deformation of the hardened material 21 (first layer 2).

Measurement of the level of curing can be performed using various devices such as the DSC-60 (made by Shimadzu Corporation), for example.

As a source of the ultraviolet light, for example, a mercury lamp, a metal halide lamp, an ultraviolet light emitting diode (UV-LED), an ultraviolet laser diode (UV-LD) or the like can be used. Among these, from the viewpoint of compact size, long life, high efficiency, and low cost, the ultraviolet light emitting diode (UV-LED) and the ultraviolet laser diode (UV-LD) are preferable.

The surface roughness Ra of the first layer 2 formed with this step is preferably 3.0 µm or greater and 100 µm or less, more preferably 5.0 mm or greater and 50 µm or less, and even more preferably 12.0 µm or greater and 30 µm or less. By doing this, it is possible to more effectively exhibit the function as a scaffold when forming the second layer 3 as described previously. With the invention, the surface roughness Ra means the value measured in compliance with JIS B 0601.

Second Ink Applying Step

Figure 2C:
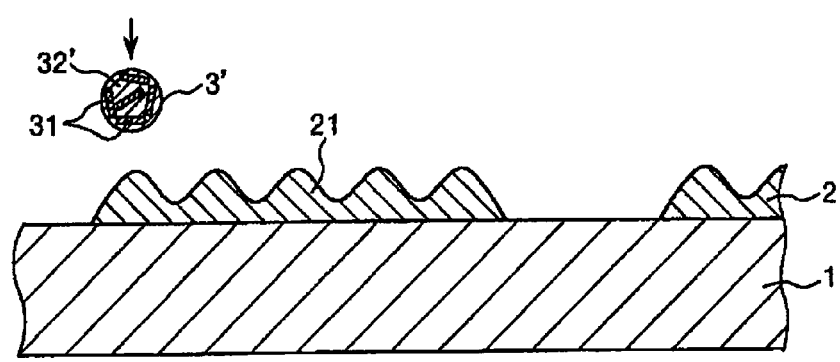

Next, the second ink 3' is applied on the first layer 2 (area on which the first layer 2 is formed) using the inkjet method (FIG. 2C).

The second ink 3' includes the metal powder 31 and the second polymerized compound 32' polymerized by irradiating ultraviolet light.

By including the metal powder 31, it is possible to have excellent glossy appearance of the printing part of the finally obtained recording material 10.

The discharged volume of the second ink 3' per unit surface area in the area noted above is 10 volume % or greater and less than 80 volume % in relation to the discharged volume of the first ink 2'. By doing this, the second ink 3' can selectively cover the inside of the area without a gap, and the second layer 3 formed with the second curing step described in detail later can be formed with good precision selectively at desired sites (formed as an item selectively covering the inside of the area without a gap). Also, it is possible for the second layer 3 to have a surface shape reflecting the dents and bumps of the surface of the first layer 2 (fine dents and bumps), to have the orientation state of the metal powder 31 suitably controlled, and possible for the finally obtained recording material 10 to have a sparkly glossy appearance (sparkly appearance) for which there is a big difference in the situation of the changes in the reflective state for each site such as with lamé as the observation direction changes.

In contrast to this, when the discharged volume of the second ink 3' per unit surface area in the area noted above is less than the lower limit noted above, it is difficult for the second ink 3' to cover the inside of the area noted above without a gap, and it is not possible to obtain an excellent sparkly appearance with a high class appearance with the finally obtained recording material. Also, when the discharged volume of the second ink 3' per unit surface area in the area noted above exceeds the upper limit noted above (when it is 80 volume % or greater), it is difficult to keep the second ink 3' in the area noted above, and the second ink 3' protrudes to outside the range noted above, so it is not possible to form the printing part with a high level of precision, and it is not possible form the second layer 3 having a surface shape in which the dents and bumps of the surface of the first layer 2 are reflected (fine dents and bumps), and the recording material 10 having an excellent glossy appearance (sparkly appearance) like that of lamé cannot be obtained.

As described above, the discharged volume of the second ink 3' per unit surface area in the area noted above is acceptable if it is 10 volume % or greater and less than 80 volume % in relation to the discharged volume of the first ink 2', but it is preferably 15 volume % or greater and 70 volume % or less in relation to the discharged volume of the first ink 2', and more preferably 17 volume % or greater and 60 volume % or less in relation to the discharged volume of the first ink 2'. By doing this, the effects such as those described above are exhibited more markedly.

As a specific value for the discharged volume of the second ink 3' per unit surface area in the area noted above, it is preferable to be 1.5 g/m$^2$ or greater and 7.0 g/m$^2$ or less. By doing this, the kinds of effects described above are exhibited more markedly.

The droplet volume of the second ink 3' discharged by one discharge operation using the inkjet method is preferably 3 ng or greater and 30 ng or less, more preferably 5 ng or greater and 25 ng or less, and even more preferably 7 ng or greater and 20 ng or less. By doing this, skewing of the landing position of the second ink 3' and excessive wetting and spreading and the like are more reliably prevented, and while having particularly excellent precision of the printing part that the finally obtained recording material 10 has, it is possible to have particularly excellent productivity of the recording material 10.

The second polymerized compound 32' is polymerized and cured with the second curing step described in detail later, to form the hardened material 32.

The metal powder 31 is constituted with a plurality of particles. The constituent particles of the metal powder 31 (the mother particles of the metal powder 31 when the surface processing described in detail later is implemented; same hereafter) can have at least near the surface constituted using a metal material, and for example the entirety can be constituted using a metal material, and the constitution can also be such that the surface of a base part constituted using a non-metal material is covered by a layer constituted using the metal material.

Also, as the metal material constituting the metal powder 31, it is possible to use a metal by itself or various alloys or the like, but the constituent particles of the metal powder 31 are preferably constituted with mainly Al at least near the surface. By doing this, it is possible to have particularly excellent glossy appearance of the printing part (sparkly appearance). Also, when the constituent particles of the metal powder 31 are constituted mainly of Al at least near the surface, in the case of an item for which surface process like that described in detail later is implemented (when the item has mother particles for which the particles constituting the metal powder 31 are constituted mainly of Al at least near the surface, and a layer using a surface preparation agent covering that), the effect by implementing the surface processing using the kind of surface preparation agent described in detail later is exhibited more markedly. With this specification, "mainly" can be an item for which the content rate among the overall constituent components of the subject site is naturally high, and preferably the content rate at the subject site is 50 mass % or greater, more preferably 80 mass % or greater, and even more preferably 95 mass % or greater.

Also, the metal powder 31 can be produced by any method, but it is preferable to obtain it by forming a film constituted by a metal material using the vapor deposition method, and after that, by pulverizing that film. By doing this, it is possible to more effectively express the glossy appearance or the like that the metal material has naturally. It is also possible to inhibit variation of characteristics between particles. Also, by using this method, even a relatively thin metal powder 31 can be suitably produced.

When the metal powder 31 is produced using this type of method, for example, by performing the formation of film (film formation) constituted by a metal material on the base material, it is possible to suitably produce the metal powder 31. As the base material, for example, a plastic film or the like such as polyethylene terephthalate or the like can be used. Also, the base material can also have a parting agent layer on the film forming surface (e.g. a parting agent layer constituted using a polymeric parting agent).

Also, it is preferable that the pulverizing is performed in a liquid by applying ultrasonic vibration to the film. By doing this, it is possible to easily and reliably obtain metal powder 31 with the kind of particle diameter described later, and possible to suppress the occurrence of variations in size, shape, and characteristics between the particles.

Also, when performing pulverization with the above described method, as the liquid, it is possible to suitably use alcohols such as methanol, ethanol, propanol, butanol or the like, carbon hydride compounds such as n-heptane, n-octane, decane, dodecane, tetra-decane, toluene, xylene, cymene, durene, indene, dipentene, tetrahydronaphthalene, decahydronaphthalene, cyclohexylebenzene or the like, ether compounds such as ethyl glycol dimethyl ether, ethylene glycol diethyl ether, ethylene glycol methylethyl ether, diethylene glycol dimethyl ether, diethylene glycol diethyl ether, diethylene glycol methylethyl ether, diethylene glycol monobutyl ether acetate, diethylene glycol n-butyl ether, tripropylene glycol dimethyl ether, triethylene glycol ethyl ether, 1,2-dimethoxyethane, bis(2-methoxyethyl) ether, p-dioxane or the like, and polar compounds such as propylene carbonate, γ-butyrolactone, N-methyl-2-pyrolidone, N, N-dimethyl formamide (DMF), N, N-dimethyl acetamide (DMA), dimethyl sulfoxide, cyclohexanone, acetonitrile or the like. By using this type of liquid, while preventing unintended oxidation or the like of the metal powder 31, it is possible to have particularly excellent productivity of the metal powder 31, and to have particularly low variation of size, shape, and characteristics between the particles.

The shape of the constituent particles of the metal powder 31 can be any shape, such as a spherical shape, spindle shape, needle-shape, or the like, but it is preferable to be a scale like-shape. By doing this, the metal powder 31 can be arranged so that the metal particle main surface follows the surface shape of the second layer 3, so it is possible to more effectively exhibit the glossy appearance or the like that the metal material constituting the metal powder 31 has naturally on the recording material 10, it is possible to have a particularly excellent glossy appearance of the printing part (sparkly appearance) and high class appearance, and possible to have particularly excellent abrasion resistance for the recording material 10.

With the invention, the scale-like shape means that, as with flat plate shapes, curved plate shapes and the like, a surface area when observed from a designated angle (as viewed in a planar view) has a bigger shape than a surface area as observed in a direction perpendicular to that observation direction, and specifically, the ratio $(S_1/S_0)$ for the surface area $S_1 [\mu m^2]$ when the projected area is observed from the direction at which it is maximum (when with a planar view), and the surface area $S_0$ $[\mu m^2]$ when the projected area is observed from the direction at which the surface area is a maximum when observing among directions orthogonal to that observed direction is preferably 2 or greater, more preferably 5 or greater, and even more preferably 8 or greater. For example, this value can be obtained by performing the observation for any 10 particles and averaging the calculated values for these particles.

When the constituent particles of the metal powder 31 have a scale-like shape, the average thickness of the constituent particles is preferably 10 nm or greater and 100 nm or less, and more preferably 20 nm or greater and 80 nm or less. By doing this, the effect of the particles like those described having a scale-like shape is exhibited more markedly.

The average particle diameter of the metal powder 31 is preferably 500 nm or greater and 3.0 μm or less, and more preferably 800 nm or greater and 2.5 μm or less. By doing this, the glossy appearance (sparkly appearance) of the printing part and the high class appearance are even more excellent. It is also possible to have even more excellent storage stability and discharge stability of the second ink 3'. With this specification, "average particle diameter" indicates the average particle diameter of the volume standard (volume average particle diameter ($D_{50}$)). As the measuring device, an example is the laser analysis dispersion type particle size analyzer Microtrac S3000 (made by Nikkiso Co., Ltd.).

Also, the maximum particle diameter of the metal powder 31 is preferably 5 μm or less, and more preferably 4.5 μm or less. By doing this, it is possible to have even more excellent storage stability and discharge stability for the second ink 3'.

Also, the constituent particles of the metal powder 31 (metal particles) can have surface processing implemented. By doing this, it is possible to effectively prevent gelation or the like of the second ink 3', and possible to have particularly excellent storage stability of the second ink 3' and discharge stability of the second ink 3'. Also, by including metal particles on which surface processing was implemented, while having excellent storage stability and the like of the second ink 3', it is possible later to suitably adjust the affinity between the dispersion medium (second polymerized compound 32' or the like) with the metal powder 31 (dispersoid) at the second ink applying step described above, possible to suitably arrange the metal powder 31 in the printing part of the recording material 10, and possible to have particularly excellent glossy appearance (sparkly appearance) of the printing part.

The surface processing agent used for the surface processing noted above is not particularly limited, and examples include alkyl phosphate ester, higher fatty acid, fluorine based silane compound, fluorine based phosphate ester, fluorine based fatty acid, isocyanate compound, silane coupling agent, fatty acid metal salt, unsaturated organic acid, organic titanate, organic aluminate, resin acid, polyethyleneglycol and the like.

Among these, for the second ink 3', as the metal powder 31, it is preferable to include an item surface processed by one type or two or more types of the surface preparation agent selected from the group consisting of fluorine based silane compound, fluorine based phosphate ester, fluorine based fatty acid, and isocyanate compound. By doing this, it is possible to have particularly excellent storage stability for the second ink 3', and particularly excellent glossy appearance (sparkly appearance) and abrasion resistance of the printing part of the recording material 10.

Following, among the surface preparation agents, we will give a detailed description of the fluorine based silane compound, fluorine based phosphate ester, fluorine based fatty acid, isocyanate compound, and alkyl phosphate ester.

First, among the surface preparation agents, we will give a detailed description of the fluorine based silane compound.

As the fluorine based silane compound, a silane compound having at least one fluorine atom within a molecule can be used.

Specifically, it is preferred that the fluorine based silane compound as the surface preparation agent has the chemical formula shown in formula (21) below.

(In formula (21), $R^1$ represents a hydrocarbon group in which a part or all of the hydrogen atoms are substituted by fluorine atoms, $X^1$ represents a hydrolysis group, ether group, chloro group or hydroxyl group, $R^2$ represents an alkyl group having a carbon number 1 to 4, and a represents an integer of 1 to 3.)

Because of this, the second ink 3' can be provided with particularly excellent storage stability, and the printing part of the recording material 10 can be provided with excellent glossy appearance (sparkly appearance) and excellent abrasion resistance.

As $R^1$ in formula (21), examples include an alkyl group, alkenyl group, aryl group, or aralkyl group for which a part or all of the hydrogen atoms are substituted by fluorine atoms or the like, and furthermore, at least a part of the hydrogen atoms (hydrogen atoms which are not substituted by fluorine atoms) included in the molecular configuration can be substituted by an amino group, carboxyl group, hydroxyl group, thiol group or the like, and hetero atoms or an aromatic ring of benzene or the like such as —O—, —S—, —NH—, —N═ or the like can be sandwiched in a carbon chain. Concrete examples of R' include a phenyl group, benzyl group, phenethyl group, hydroxyphenyl group, chlorophenyl group, aminophenyl group, naphthyl group, anthranil group, pyrenyl group, thienyl group, pyrrolyl group, cyclohexyl group, cyclohexenyl group, cyclopentyl group, cyclopentenyl group, pyridinyl group, methyl group, ethyl group, n-propyl group, isopropyl group, n-butyl group, isobutyl group, sec-butyl group, tert-butyl group, octadecyl group, n-octyl group, chloromethyl group, methoxyethyl group, hydroxyethyl group, aminoethyl group, cyano group, mercaptopropyl group, vinyl group, allyl group, acryloxyethyl group, methacryloxyethyl group, glycidoxypropyl group, or acetoxy group for which a part or all of hydrogen atoms are substituted by fluorine atoms.

Concrete examples of the fluorine based silane compound shown in formula (21) are compounds having a constitution for which a part or all of the hydrogen atoms in a silane compound are substituted by fluorine atoms, the silane compounds including dimethyl dimethoxy silane, diethyl diethoxy silane, 1-propenyl methyl dichlorosilane, propyl dimethyl chlorosilane, propylmethyl dichlorosilane, propyl trichlorosilane, propyl triethoxysilane, propyl trimethoxysilane, styrylethyl trimethoxysilane, tetradecyl trichlorosilane, 3-thiocyanate propyl triethoxysilane, p-tolyl dimethylchlorosilane, p-tolyl methyl dichlorosilane, p-tolyl trichlorosilane, p-tolyl trimethoxysilane, p-tolyl triethoxysilane, di-n-propyl di-n-propoxysilane, diisopropyl di-isopropoxysilane, di-n-butyl di-n-butyloxysilane, di-sec-butyl di-sec-butyloxysilane, di-t-butyl di-t-butyloxysilane, octadecyltrichlorosilane, octadecyl methyl diethoxy silane, octadecyl triethoxysilane, octadecyl trimethoxysilane, octadecyl dimethylchlorosilane, octadecyl methyl dichlorosilane, octadecyl methoxy dichlorosilane, 7-octenyl dimethylchlorosilane, 7-octenyl trichlorosilane, 7-octenyl trimethoxysilane, octyl methyl dichlorosilane, octyl dimethyl chlorosilane, octyl trichlorosilane, 10-undecenyl dimethylchlorosilane, undecyl trichlorosilane, vinyl dimethyl chlorosilane, methyl octadecyl dimethoxysilane, methyl dodecyl diethoxysilane, methyl octadecyl dimethoxysilane, methyl octadecyl diethoxy silane, n-octyl methyl dimethoxy silane, n-octyl methyl diethoxy silane, triancotil dimethylchlorosilane, triancotil trichlorosilane, methyl trimethoxysilane, methyl triethoxysilane, methyltri-n-propoxysilane, methyl iso-propoxysilane, methyl-n-butyloxysilane, methyltri-sec-butyloxysilane, methyltri-t-butyloxysilane, ethyl trimethoxysilane, ethyl triethoxysilane, ethyl tri-n-propoxysilane, ethyl isopropoxysilane, ethyl-n-butyloxysilane, ethyl tri-sec-butyloxysilane, ethyl tri-t-butyloxysilane, n-propyl trimethoxysilane, isobutyl trimethoxysilane, n-hexyl trimethoxy silane, hexadecyl trimethoxysilane, n-octyl trimethoxysilane, n-dodecyl trimethoxy silane, n-octadecyl trimethoxysilane, n-propyl triethoxysilane, isobutyl triethoxysilane, n-hexyl triethoxysilane, hexadecyl triethoxysilane, n-octyl triethoxysilane, n-dodecyl trimethoxysilane, n-octadecyl triethoxysilane, 2-[2-(trichlorosilyl) ethyl]pyridine, 4-[2-(trichlorosilyl) ethyl]pyridine, diphenyl dimethoxysilane, diphenyl diethoxysilane, 1,3-(trichlorosilyl methyl) heptacosane, dibenzyl dimethoxysilane, dibenzyl diethoxy silane, phenyl trimethoxysilane, phenyl methyl dimethoxy silane, phenyl dimethyl methoxysilane, phenyl dimethoxysilane, phenyl diethoxysilane, phenyl methyl diethoxysilane, phenyl dimethyl ethoxysilane, benzyl triethoxysilane, benzyl trimethoxysilane, benzyl methyl dimethoxy silane, benzyl dimethyl methoxysilane, benzyl dimethoxysilane, benzyl diethoxysilane, benzyl methyl diethoxysilane, benzyl dimethyl ethoxylsilane, benzyl triethoxysilane, dibenzyl dimethoxysilane, dibenzyl diethoxysilane, 3-acetoxypropyl trimethoxysilane, 3-acryloxypropyl trimethoxysilane, allyl trimethoxysilane, allyl triethoxysilane, 4-aminobutyl triethoxysilane, (amino ethyl amino methyl) phenethyl trimethoxysilane, N-(2-aminoethyl)-3-aminopropylmethyl dimethoxysilane, N-(2-aminoethyl)-3-aminopropyl trimethoxysilane, 6-(aminohexyl aminopropyl) trimethoxysilane, p-aminophenyl trimethoxysilane, p-aminophenyl ethoxysilane, m-aminophenyl trimethoxysilane, m-aminophenyl ethoxysilane, 3-aminopropyl trimethoxysilane, 3-aminopropyl triethoxysilane, co-aminoundecyl trimethoxysilane, amyl triethoxysilane, benzoxazocinepine dimethyl ester, 5-(bicyclo heptenyl) triethoxysilane, bis (2-hydroxyethyl)-3-aminopropyl triethoxysilane, 8-bromooctyl trimethoxysilane, bromophenyl trimethoxysilane, 3-bromopropyl trimethoxysilane, n-butyl trimethoxysilane, 2-chloromethyl triethoxysilane, chloromethyl methyl diethoxysilane, chloromethyl methyl diisopropoxysilane, p-(chloromethyl) phenyl trimethoxysilane, chloromethyl triethoxysilane, chlorophenyl triethoxysilane, 3-chloropropyl methyl dimethoxysilane, 3-chloropropyl triethoxysilane, 3-chloropropyl trimethoxysilane, 2-(4-chlorosulfonyl phenyl) ethyl trimethoxysilane, 2-cyanoethyl triethoxysilane, 2-cyanoethyl trimethoxysilane, cyanomethyl phenethyl triethoxysilane, 3-cyanopropyl triethoxysilane, 2-(3-cyclohexenyl) ethyl trimethoxysilane, 2-(3-cyclohexenyl) ethyl triethoxysilane, 3-cyclohexenyl trichlorosilane, 2-(3-cyclohexenyl) ethyl trichlorosilane, 2-(3-cyclohexenyl) ethyl dimethyl chlorosilane, 2-(3-cyclohexenyl) ethyl methyl dichlorosilane, cyclohexyl dimethylchlorosilane, cyclohexyl ethyl dimethoxysilane, cyclohexyl methyl dichlorosilane, cyclohexyl methyl dimethoxysilane, (cyclohexyl methyl) trichlorosilane, cyclohexyl trichlorosilane, cyclohexyl trimethoxysilane, cyclooctyl trichlorosilane, (4-cyclooctenyl) trichlorosilane, cyclopentyl trichlorosilane, cyclopentyl trimethoxysilane, 1,1-diethoxy-1-Silacyclopenta-3-ene, 3-(2,4-dinitrophenyl amino) propyl triethoxysilane, (dimethyl chlorosilyl) methyl-7,7-dimethyl amino lupinane, (cyclohexyl aminomethyl) methyl diethoxysilane, (3-cyclopenta dienylpropyl) triethoxysilane, N, N-diethyl-3-aminopropyl) trimethoxysilane, 2-(3,4-epoxycyclohexyl) ethyltrimethoxysilane, 2-(3,4-epoxycyclohexyl) ethyl triethoxysilane, (furfuryl oxymethyl) triethoxysilane, 2-hydroxy-4-(3-tri-ethoxy propoxy) diphenyl ketone, 3-(p-methoxyphenyl) propyl methyl dichlorosilane, 3-(p-methoxyphenyl) propyl trichlorosilane, p-(methylphenethyl) methyl dichlorosilane, p-(methylphenethyl) trichlorosilane, p-(methylphenethyl) dimethylchlorosilane, 3-morpholinopropyl trimethoxysilane, (3-glycidoxypropyl) methyldiethoxysilane, 3-glycidoxypropyl trimethoxysilane, 1,2,3,4,7,7-hexachloro-6-methyldiethoxysilyl-2-norbornene, 1,2,3,4,7,7-hexachloro-6-triethoxysilyl-2-norbornene, 3-iodine propyl trimethoxysilane, 3-isocyanate propyl triethoxysilane, (mercaptomethyl) methyldiethoxysilane, 3-mercaptopropyl methyldimethoxysilane, 3-mercaptopropyl dimethoxysilane, 3-mercaptopropyl triethoxysilane, 3-methacryloxypropyl methyldiethoxysilane, 3-methacryloxypropyl trimethoxysilane, methyl {2-(3-trimethoxysilyl propylamino) ethylamino}-3-propionate, 7-octenyl trimethoxysilane, R—N-α-phenethyl-N'-triethoxysilyl propyl urea, S—N-α-phenethyl-N'-triethoxysilyl propyl urea, phenethyl trimethoxysilane, phenethyl methyl dimethoxysilane, phenethyl dimethylsilane, phenethyl dimethoxysilane, phenethyl diethoxysilane, phenethyl methyl diethoxy silane, phenethyl dimethylethoxysilane, phenethyl triethoxysilane, (3-phenylpropyl) dimethylchlorosilane, (3-phenylpropyl) methyldichlorosilane, N-phenyl aminopropyl trimethoxysilane, N-(triethoxysilylpropyl) dansylamide, N-(3-triethoxysilylpropyl)-4,5-dihydroimidazole, 2-(triethoxysilylethyl)-5-(chloroacetoxy) bicycloheptane, (S)—N-triethoxysilylpropyl-O-menthocarbamate, 3-(triethoxysilylpropyl)-p-nitro-benzamide, 3-(triethoxysilyl) propyl succinate anhydride, N-[5-(trimethoxysilyl)-2-aza-1-oxo-pentyl]caprolactam, 2-(trimethoxysilylethyl) pyridine, N-(trimethoxysilylethyl) benzyl-N, N, N-trimethyl ammonium chloride, phenyl vinyl diethoxysilane, 3-thiocyanate propyltriethoxysilane, N-{3 acid (triethoxysilyl) propyl}phthalamic acid, 1-trimethoxysilyl-2-(chloromethyl) phenyl ethane, 2-(trimethoxysilyl) ethyl phenyl sulfonyl azide, β-trimethoxy silylethyl-2-pyridine, trimethoxysilylpropyl diethylene triamine, N-(3-trimethoxysilylpropyl) pyrrole, N-trimethoxysilylpropyl-N, N, N-tri-butyl ammonium bromide, N-trimethoxysilylpropyl-N, N, N-tributyl ammonium chloride, N-trimethoxysilylpropyl-N, N, N-trimethylammonium chloride, vinyl methyl diethoxysilane, vinyl triethoxysilane, vinyl trimethoxysilane, vinyl methyl dimethoxysilane, vinyl dimethyl methoxysilane, vinyl dimethyl ethoxysilane, vinyl methyl dichlorosilane, vinyl phenyl dichlorosilane, vinyl phenyl diethoxysilane, vinyl phenyl dimethylsilane, vinyl phenyl methyl chlorosilane, vinyl tri-phenoxysilane, vinyl tris-t-butoxysilane, adamantyl ethyl trichlorosilane, allyl phenyl trichlorosilane, (aminoethyl aminomethyl) phenethyl trimethoxysilane, 3-aminophenoxy dimethyl vinyl silane, phenyl trichlorosilane, phenyl dimethylchlorosilane, phenyl methyl dichlorosilane, benzyl trichloro silane, benzyl dimethyl chlorosilane, benzyl methyl dichlorosilane, phenethyl diisopropyl chlorosilane, phenethyl trichlorosilane, phenethyl dimethylchlorosilane, phenethyl methyldichlorosilane, 5-(bicyclo heptenyl) trichlorosilane, 5-(bicyclo heptenyl) triethoxy silane, 2-(bicyclo heptyl) dimethylchlorosilane, 2-(bicyclo heptyl) trichlorosilane, 1,4-bis (trimethoxysilylethyl) benzene, bromophenyl trichlorosilane, 3-phenoxypropyl dimethylchlorosilane, 3-phenoxypropyl trichlorosilane, t-butyl phenyl chlorosilane, t-butyl phenyl methoxysilane, t-butyl phenyl dichlorosilane, p-(t-butyl) phenethyl dimethylchlorosilane, p-(t-butyl) phenethyl trichlorosilane, 1,3-(dichloromethyl silylmethyl) heptacosane, ((chloromethyl) phenylethyl) dimethylchlorosilane, ((chloromethyl) phenylethyl) methyl dichlorosilane, ((chloromethyl) phenylethyl) trichlorosilane, ((chloromethyl) phenylethyl) trimethoxysilane, chlorophenyl trichlorosilane, 2-cyanoethyl trichlorosilane, 2-cyanoethyl methyl dichlorosilane, 3-cyanopropyl methyldiethoxysilane, 3-cyanopropyl methyl dichlorosilane, 3-cyanopropyl methyl dichlorosilane, 3-cyanopropyl dimethylethoxysilane, 3-cyanopropyl methyl dichlorosilane, 3-cyanopropyl trichlorosilane, or the like.

It is preferable that the fluorine based silane compound (surface preparation agent) have a perfluoroalkyl structure ($C_nF_{2n+1}$). By doing this, it is possible to have even more excellent storage stability for the second ink 3', and to have even more excellent glossy appearance (sparkly appearance) and abrasion resistance of the printing part of the recording material 10.

As a fluorine based silane compound having a perfluoroalkyl structure ($C_nF_{2n+1}$), an example is shown in formula (24) below.

  (24)

(In formula (24), $X^1$ represents a hydrolysis group, ether group, chloro group or hydroxyl group, $R^2$ represents an alkyl group having a carbon number from 1 to 4, n represents an integer from 1 to 14, m represents an integer from 2 to 6, and a represents an integer from 1 to 3.)

Concrete examples of the compounds having such a structure include $CF_3$—$CH_2CH_2$—$Si(OCH_3)_3$, $CF_3(CF_2)_3$—$CH_2CH_2$—$Si(OCH_3)_3$, $CF_3(CF_2)_5$—$CH_2CH_2$—$Si(OCH_3)_3$, $CF_3(CF_2)_5$—$CH_2CH_2$—$Si(OC_2H_5)_3$, $CF_3(CF_2)_7$—$CH_2CH_2$—$Si(OCH_3)_3$, $CF_3(CF_2)_{11}$—$CH_2CH_2$—$Si(OC_2H_5)_3$, $CF_3(CF_2)_3$—$CH_2CH_2$—$Si(CH_3)(OCH_3)_2$, $CF_3(CF_2)_7$—$CH_2CH_2$—$Si(CH_3)(OCH_3)_2$, $CF_3(CF_2)_8$—$CH_2CH_2$—$Si(CH_3)(OC_2H_5)_2$, $CF_3(CF_2)_8$—$CH_2CH_2$—$Si(C_2H_5)(OC_2H_5)_2$, or the like.

Also, as a fluorine based silane compound, it is also possible to use a perfluoroalkyl ether structure ($C_nF_{2n+1}$) instead of perfluoroalkyl structure ($C_nF_{2n+1}$).

An example of a fluorine based silane compound having a perfluoroalkyl ether structure ($C_nF_{2n+1}O$) is shown in formula (25) below.

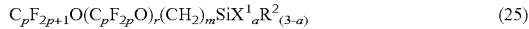  (25)

(In formula (25), $X^1$ represents a hydrolysis group, ether group, chloro group or hydroxyl group, $R^2$ represents an alkyl group having a carbon number from 1 to 4, p represents an integer from 1 to 4, r represents an integer from 1 to 10, m represents an integer from 2 to 6, and a represents an integer from 1 to 3.)

Concrete examples of the compounds having such a structure include $CF_3O(CF_2O)_6$—$CH_2CH_2Si(OC_2H_5)_3$, $CF_3O(C_3F_6O)_4$—$CH_2CH_2$—$Si(OCH_3)_3$, $CF_3O(C_3F_6O)_2(CF_2O)_3$—$CH_2CH_2$—$Si(OCH_3)_3$, $CF_3O(C_3F_6O)_8$—$CH_2CH_2$—$Si(OCH_3)_3$, $CF_3O(C_4F_9O)_5$—$CH_2CH_2$—$Si(OCH_3)_3$, $CF_3O(C_4F_9O)_5$—$CH_2CH_2$—$Si(CH_3)(OC_2H_5)_2$, $CF_3O(C_3F_6O)_4$—$CH_2CH_2$—$Si(C_2H_5)(OCH_3)_2$, or the like.

Next, among the surface preparation agents, we will give a detailed description of the fluorine based phosphate esters.

As the fluorine based phosphate ester, a phosphate ester having at least one fluorine atom within a molecule can be used.

Specifically, it is preferable that the fluorine based phosphate ester have the chemical formula shown in formula (22) below.

  (22)

(In formula (22), R represents $CF_3(CF_2)_m$—, $CF_3(CF_2)_m(CH_2)_l$—, $CF_3(CF_2)_m(CH_2O)_l$—, $CF_3(CF_2)_m(CH_2CH_2O)_l$—, $CF_3(CF_2)_mO$— or $CF_3(CF_2)_m(CH_2)_lO$—, n represents an integer from 1 to 3, m represents an integer from 2 to 18, and l represents an integer from 1 to 18.)

By doing this, it is possible to have particularly excellent storage stability for the second ink 3', and to have particularly excellent glossy appearance (sparkly appearance) and abrasion resistance of the printing part of the recording material 10.

In formula (22), it is preferable that m be an integer between 3 to 14, but an integer between 4 to 12 is more preferable. By doing this, the effects noted above can be exhibited more markedly.

In addition, in formula (22), it is preferable that l be an integer from 1 to 14, but an integer from 1 to 10 is more preferable. By doing this, the effects noted above can be exhibited more markedly.

Also, it is preferable that the fluorine based phosphate ester (surface preparation agent) have the perfluoroalkyl structure ($C_nF_{2n+1}$). By doing this, it is possible to have even more excellent storage stability for the second ink 3', and more excellent glossy appearance (sparkly appearance) and abrasion resistance for the printing part of the recording material 10.

Next, among the surface preparation agents, we will give a detailed description of the fluorine based fatty acids.

As fluorine based fatty acids, it is possible to used fatty acids having at least one fluorine atom within the molecule.

As fluorine based fatty acids, examples include $CF_3$—$CH_2CH_2$—$COOH$, $CF_3(CF_2)_3$—$CH_2CH_2$—$COOH$, $CF_3(CF_2)_5$—$CH_2CH_2$—$COOH$, $CF_3(CF_2)_6$—$CH_2CH_2$—$COOH$, $CF_3(CF_2)_7$—$CH_2CH_2$—$COOH$, $CF_3(CF_2)_9$—$CH_2CH_2$—$COOH$, but among these, $CF_3(CF_2)_5$—$CH_2CH_2$—$COOH$ is preferable. By doing this, a strong bond is formed with the metal atoms constituting the mother particles using a dehydration reaction by heating, and it is possible to form a dense film, so it is possible to effectively lower the particle surface energy.

Next, among the surface preparation agents, we will give a detailed description of isocynate compounds.

As isocyanate compounds, it is possible to use a compound having at least one isocyanate group in the molecule.

As the isocyanate compound, it is possible to use an item having the chemical structure expressed in formula (26) below.

  (26)

(In formula (26), R represents $CH_3(CH_2)_m$—, and m represents an integer from 2 to 18.)

By doing this, it is possible to have particularly excellent dispersion stability of the metal powder 31 in the second ink 3', and storage stability of the second ink 3'. Also, to improve the dispersion stability for various dispersion media, the breadth of selection is broad for dispersion media of the metal powder 31 in the second ink 3' (e.g. second polymerized compound 32'). It is also possible to have particularly excellent discharge stability of the second ink 3' using the inkjet method.

In formula (26), m is preferably an integer from 3 to 14, and more preferably an integer from 4 to 12. By doing this, the kinds of effects described above are exhibited more markedly.

Also, as the isocyanate compound, it is possible to use an item having the chemical structure represented by formula (27) below.

  (27)

(In formula (27), Rf represents $CF_3(CF_2)_m$— or $CF_3(CF_2)_m(CH_2)_l$— where m represents an integer from 2 to 18, and l represents an integer from 1 to 18.)

By doing this, it is possible to have particularly excellent storage stability for the second ink 3'. Also, with the recording material 10 produced using the second ink 3', it is possible to more suitably arrange the metal powder 31 near the outer surface of the second layer 3 (leafing), and to have particularly excellent glossy appearance (sparkly appearance) of the printing part of the produced recording material 10. It is also possible to have particularly excellent abrasion resistance for the printing part of the produced recording material 10.

In formula (27), it is preferable that m be an integer from 3 to 14, but an integer from 4 to 12 is more preferable. By doing this, the kinds of effects described above can be more markedly exhibited.

In addition, in formula (27), it is preferable that l be an integer from 1 to 14, but an integer from 1 to 10 is more preferable. By doing this, the kinds of effects described above can be more markedly exhibited.

Next, among the surface preparation agents, we will give a detailed description of alkyl phosphate esters.

Alkyl phosphate esters are items having a structure for which at least a portion of the OH groups that the phosphate has is esterified by a functional group including an alkyl group ($C_nH_{2n+1}$—(where n is an integer of 1 or greater)).

The alkyl phosphate ester preferably has only C, H, P, and O as constituent elements. By doing this, it is possible to have particularly excellent glossy appearance (sparkly appearance) and abrasion resistance of the finally obtained recording material 10, and possible to produce a recording material 10 that is less expensive than when using fluorine based phosphate esters or the like.

In particular, it is preferable that the alkyl phosphate ester have the chemical structure expressed in formula (23) below.

$$POR_n(OH)_{3-n} \quad (23)$$

(In formula (23), R represents $CH_3(CH_2)_m$—, $CH_3(CH_2)_m(CH_2O)_l$—, $CH_3(CH_2)_m(CH_2CH_2O)_l$—, or $CH_3(CH_2)_mO$—, n represents an integer from 1 to 3, m represents an integer from 2 to 18, and l represents an integer from 1 to 18.)

By doing this, it is possible to have particularly excellent storage stability for the second ink 3', and particularly excellent glossy appearance (sparkly appearance) and abrasion resistance for the printing part of the recording material 10.

In formula (23), m is preferably an integer from 3 to 14, and more preferably an integer from 4 to 12. By doing this, the kinds of effects described above are more markedly exhibited.

Also, in formula (23), l is preferably an integer from 1 to 14, and more preferably an integer from 1 to 10. By doing this, the kinds of effects described above are more markedly exhibited.

Specific examples of preferable alkyl phosphate esters include $((CH_3)_2CHO)_2P(=O)(OH)$, $((CH_3)_2CHO)P(=O)(OH)_2$, $(C_2H_5O)_2P(=O)(OH)$, $(C_2H_5O)P(=O)(OH)_2$, $(CH_3O)_2P(=O)(OH)$, $(C_4H_9O)P(=O)(OH)_2$, $(C_3H_7O)_2P(=O)(OH)$, $(C_3H_7O)P(=O)(OH)_2$ and the like.

The kind of surface preparation agents noted above can have processing done directly on the mother particles, but it is preferable to have processing performed using the surface preparation agent on those mother particles after having acid or base processing done on the mother particles. By doing this, it is possible to more reliably perform modifications using chemical bonding by the surface preparation agent on the surface of the mother particles, and possible to more effectively exhibit the effects due to using the kind of surface preparation agents noted above. Also, even when an oxide film is formed on the particles to become the mother particles before performing the surface processing using the surface preparation agent, it is possible to reliably remove that oxide film, and in a state with the oxide film removed, to perform the surface processing using the surface preparation agent, so it is possible to have particularly excellent glossy appearance of the produced metal powder 31. As an acid, for example, it is possible to use a proton acid of hydrochloric acid, sulfuric acid, phosphoric acid, nitric acid, acetic acid, carbonic acid, formic acid, benzoic acid, chlorous acid, hypochlorous acid, sulfurous acid, hyposulfurous acid, nitrous acid, hyponitrous acid, phosphorous acid, and hypophosphorous acid or the like. Among these, hydrochloric acid, phosphoric acid, and acetic acid are preferable. On the other hand, as a base, for example, sodium hydrate, potassium hydrate, calcium hydrate or the like can be used. Among these, sodium hydrate and potassium hydrate are preferable.

The content rate of metal powder in the second ink 3' is preferably 0.5 mass % or greater and 10.0 mass % or less, and more preferably 1.0 mass % or greater and 5.0 mass % or less.

The second polymerized compound 32' is in liquid form. By doing this, it is not necessary to use the liquid component removed (vaporized) in the production process of the recording material 10, and with the production of the recording material 10, it is not necessary to provide a step of removing this kind of liquid component, so it is possible to have particularly excellent productivity for the recording material 10. Also, since it is not necessary to use an organic solvent, an occurrence of the VOC (volatile organic compound) problem can be prevented.

The second ink 3' preferably includes as the second polymerized compound 32' the same compound as the first polymerized compound 21' constituting the first ink 2'. By doing this, it is possible to have particularly excellent adhesiveness between the first layer 2 and the second layer 3, and possible to have particularly excellent durability and reliability of the recording material 10.

As the second polymerized compound 32', it is acceptable as long as it is a component that can be polymerized by irradiating ultraviolet light, and for example, various types of monomer, various types of oligomer (including dimer, trimer, or the like), or the like can be used, but it is preferable that the second ink 3' use an item that at least includes a monomer component as the second polymerized compound 32'. A monomer is a component that generally has a lower viscosity than an oligomer component or the like, so the second ink 3' has an advantage of having particularly excellent discharge stability.

In particular, the second ink 3' preferably includes a monomer having an alicyclic structure as the second polymerized compound 32'. By doing this, it is possible to have particularly excellent dispersion stability of the metal powder 31 in the second ink 3', and storage stability of the second ink 3', and possible to have particularly excellent glossy appearance (sparkly appearance) and abrasion resistance for the printing part of the recording material 10 produced using the second ink 3'. It is also possible to have particularly excellent adhesiveness of the hardened material 32 (second layer 3) formed with the second curing step on the hardened material 21 (first layer 2) and the like.

Examples of monomers having an alicyclic structure include tris (2-(meth) acryloyloxyethyl) isocyanurate, dicyclopentenyloxyethyl (meth) acrylate, adamantyl (meth) acrylate, γ-butyrolactone (meth) acrylate, N-vinyl caprolactam, N-vinylpyrrolidone, pentamethylpiperidyl (meth) acrylate, tetramethylpiperidyl (meth) acrylate, 2-methyl-2-adamantyl (meth) acrylate, 2-ethyl-2-adamantyl (meth) acrylate, mevalonic acid lactone (meth) acrylate, dimethylol tricyclodecanedi (meth) acrylate, dimethylol dicyclopentane di (meth) acrylate, dicyclopentenyl (meth) acrylate, dicyclopentanyl (meth) acrylate, isobornyl (meth) acrylate, cyclohexyl (meth) acrylate, (meth) acryloyl morpholine, tetrahydrofurfuryl (meth) acrylate, phenyl glycidyl ether (meth) acrylate, EO-modified hydrogenated bisphenol A di (meth)

acrylate, di (meth) acrylated isocyanurate, tri (meth) acrylated isocyanurate and the like, but it is preferable to be an item including one type or two or more types selected from the group consisting of tris (2-acryloyloxyethyl) isocyanurate, dicyclopentenyloxyethyl ethyl acrylate, adamantyl acrylate, γ-butyrolactone acrylate, N-vinylcaprolactam, N-vinylpyrrolidone, pentamethylpiperidyl acrylate, tetramethylpiperidyl acrylate, 2-methyl-2-adamantyl acrylate, 2-ethyl-2-adamantyl acrylate, cyclohexane spiro-2-(1,3-dioxolan-4-yl) methyl acrylate, (2-methyl-2-ethyl-1,3-dioxolan-4-yl) methyl acrylate, mevalonic acid lactone acrylate, dimethylol tricyclodecane diacrylate, dimethylol dicyclopentane diacrylate, dicyclopentenyl acrylate, dicyclopentanyl acrylate, isobornyl acrylate, cyclohexyl acrylate, acryloyl morpholine, and tetrahydrofurfuryl acrylate. By doing this, it is possible to be even more excellent in terms of the glossy appearance (sparkly appearance) and high class appearance of the produced recording material 10. It is also possible to have even more excellent adhesiveness of the hardened material 32 formed with the second curing step on the first layer 2, and possible to more easily form the hardened material 32 controlled to a desired shape. It is also possible to have more excellent storage stability and discharge stability for the second ink 3'.

Among these, when including one type or two or more types selected from the group consisting of acryloylmorpholine, tetrahydrofurfuryl acrylate, γ-butyrolactone acrylate, N-vinyl caprolactam, and N-vinylpyrrolidone, it is possible to have even more excellent dispersion stability of the metal powder 31 in the second ink 3', possible to more suitably arrange the metal powder 31 near the outer surface of the second layer 3 with the recording material 10 produced using the second ink 3', and possible to have more excellent glossy appearance (sparkly appearance) of the obtained recording material 10.

Also, from the perspective of further improving the curing speed of the second ink 3' with the second curing step, and the productivity of the recording material 10, it is preferable to use an item including one type or two or more types selected from the group consisting of tris (2-acryloyloxyethyl) isocyanurate, dicyclopentenyloxyethyl ethyl acrylate, γ-butyrolactone acrylate, N-vinylpyrrolidone, dimethylol tricyclodecane diacrylate, dimethylol dicyclopentane diacrylate, dicyclopentenyl acrylate, dicyclopentanyl acrylate, acryloyl morpholine, and tetrahydrofurfuryl acrylate, more preferable to be an item including acryloylmorpholine and/or γ-butyrolactone acrylate, and even more preferable to be an item including γ-butyrolactone acrylate.

Also, when including one type or two or more types selected from the group consisting of cyclohexyl acrylate, tetrahydrofurfuryl acrylate, and benzyl acrylate, it is possible to have even more excellent flexibility of the hardened material 32 (second layer 3).

Also, from the perspective of further improving the abrasion resistance of the second layer 3 formed by curing the second ink 3', it is preferable to be an item including one type or two or more types selected from the group consisting of tris (2-acryloyloxyethyl) isocyanurate, dicyclopentenyloxyethyl ethyl acrylate, adamantyl acrylate, γ-butyrolactone acrylate, N-vinylcaprolactam, N-vinylpyrrolidone, dimethylol tricyclodecane diacrylate, dimethylol dicyclopentane diacrylate, dicyclopentenyl acrylate, dicyclopentanyl acrylate, isobornyl acrylate, and acryloyl morpholine, and more preferable to be an item including γ-butyrolactone acrylate and/or N-vinylcaprolactam.

Also, in the case of an item including one type or two or more types selected from the group consisting of γ-butyrolactone acrylate, N-vinyl caprolactam, N-vinylpyrrolidone, isobornyl acrylate, and tetrahydrofurfuryl acrylate, the shrinkage ratio during curing of the second ink 3' is smaller, and it is possible to more effectively prevent a decrease in glossy appearance (sparkly appearance) due to the occurrence of unintended creases or the like in the hardened material 32 (second layer 3).

The content rate of the monomer having an alicyclic structure in the second ink 3' is preferably 40 mass % or greater and 90 mass % or less, more preferably 50 mass % or greater and 88 mass % or less, and even more preferably 55 mass % or greater and 85 mass % or less. By doing this, there is particularly excellent dispersion stability of the metal powder 31, and particularly excellent discharge stability is obtained over the long term. In particular, even when the second ink 3' does not include a dispersant, the kinds of excellent effects noted above can be obtained.

In contrast to this, when the content rate of the monomer having an alicyclic structure in the second ink 3' is less than the lower limit noted above, the dispersibility of the metal powder 31 decreases, and it is possible that there will be a decrease in the stability of the droplet discharge using the inkjet method. Also, in this case, it is possible for there to be a decrease in stability over time of the droplet discharge of the second ink 3'. Also, when the content rate of the monomer having an alicyclic structure in the second ink 3' exceeds the upper limit noted above, by there being an excessive increase in the dispersion stability of the metal powder 31, with the second ink 3' applied to the recording medium 1, the internal existence ratio of the metal powder 31 increases, it becomes difficult to suitably arrange the metal powder 31 near the outer surface of the applied second ink 3', and it is possible that there will be a decrease in the glossy appearance (sparkly appearance) and abrasion resistance of the finally obtained recording material 10. The second ink 3' can also be an item including two or more compounds as the monomer having an alicyclic structure. In this case, it is preferable that the sum of the content rates of these be a value within the range noted above.

With the monomer having an alicyclic structure, the number of constituent atoms of the cyclic structure formed by covalent bonds is preferably 5 or more, and more preferably 6 or more. By doing this, it is possible to have particularly excellent storage stability for the second ink 3'.

With the second ink 3', as the monomer having an alicyclic structure, it is preferable to be an item including a monofunctional monomer including a heteroatom in the alicyclic structure (monofunctional monomer having a heterocycle not showing aromaticity). By doing this, there is particularly excellent dispersion stability of the metal powder 31, and particularly excellent discharge stability is obtained over a long time. In particular, even when the second ink 3' does not include a dispersant, the kinds of excellent effects noted above can be obtained. Examples of this kind of monofunctional monomer include tris (2-(meth) acryloyloxyethyl) isocyanurate, γ-butyrolactone (meth) acrylate, N-vinyl caprolactam, N-vinylpyrrolidone, pentamethylpiperidyl (meth) acrylate, tetramethylpiperidyl (meth) acrylate, mevalonic acid lactone (meth) acrylate, (meth) acryloyl morpholine, tetrahydrofurfuryl (meth) acrylate and the like.

The content rate of the monofunctional monomer (monofunctional monomer including a heteroatom in the alicyclic structure) in the second ink 3' is preferably 10 mass % or greater and 80 mass % or less, and more preferably 15 mass % or greater and 75 mass % or less. By doing this, the curing shrinkage is suppressed, there is little scattering, and it is possible to produce the recording material 10 equipped with a printing part with more excellent glossy appearance (sparkly appearance). With the second ink 3', it is possible to include two or more types of compound as the monofunctional monomer including a heteroatom in the alicyclic structure. In this case, the sum of the content rates of these is preferably a value within the range noted above.

The polymerized compound constituting the second ink 3' can also be an item that includes a monomer that does not have an alicyclic structure.

Examples of this kind of monomer (monomer that does not have an alicyclic structure) include phenoxyethyl (meth) acrylate, benzyl (meth) acrylate, (meth) acrylate 2-(2-vinyloxy ethoxy) ethyl, dipropylene glycol di (meth) acrylate, tripropylene glycol di (meth) acrylate, 2-hydroxy-3-phenoxypropyl (meth) acrylate, and 4-hydroxybutyl (meth) acrylate, lauryl (meth) acrylate, 2-methoxyethyl (meth) acrylate, isooctyl (meth) acrylate, stearyl (meth) acrylate, 2-ethoxyethyl (meth) acrylate, benzyl (meth) acrylate, 1H, 1H, 5H-octafluoropentyl (meth) acrylate, 2-hydroxyethyl (meth) acrylate, 2-hydroxypropyl (meth) acrylate, isobutyl (meth) acrylate, t-butyl (meth) acrylate, ethyl carbitol (meth) acrylate, 2,2,2-trifluoroethyl (meth) acrylate, 2,2,3,3-tetrafluoropropyl (meth) acrylate, methoxy triethylene glycol (meth) acrylate, PO-modified nonylphenol (meth) acrylate, EO-modified nonylphenol (meth) acrylate, EO-modified 2 ethylhexyl (meth) acrylate, phenoxy diethylene glycol (meth) acrylate, EO-modified phenol (meth) acrylate, EO-modified cresol (meth) acrylate, methoxy polyethylene glycol (meth) acrylate, dipropylene glycol (meth) acrylate, 2-n-butyl-2-ethyl-1,3-propanediol di (meth) acrylate, tetraethylene glycol di (meth) acrylate, 1,9-nonanediol di (meth) acrylate, 1,4-butanediol di (meth) acrylate, bisphenol A EO-modified di (meth) acrylate, 1,6-hexanediol di (meth) acrylate, polyethylene glycol 200 di (meth) acrylate, polyethylene glycol 300 di (meth) acrylate, neopentyl glycol hydroxypivalate di (meth) acrylate, 2-ethyl-2-butyl-propanediol di (meth) acrylate, polyethylene glycol 400 di (meth) acrylate, polyethylene glycol 600 di (meth) acrylate, polypropylene glycol di (meth) acrylate, bisphenol A EO-modified di (meth) acrylate, PO-modified bisphenol A di (meth) acrylate, trimethylolpropane tri (meth)) acrylate, pentaerythritol tri (meth) acrylate, trimethylolpropane EO-modified tri (meth) acrylate, glycerin PO-added tri (meth) acrylate, tris (meth) acryloyloxyethyl phosphate, pentaerythritol tetra (meth) acrylate, PO modified trimethylolpropane tri (meth) acrylate, 2-(meth) acryloyloxyethyl phthalate, 3-(meth) acryloyloxypropyl acrylate, w-carboxy (meth) acryloyloxyethyl phthalate, di-trimethylolpropane tetra (meth) acrylate, dipentaerythritol penta-/hexa-(meth) acrylate, dipentaerythritol hexa (meth) acrylate and the like, but it is preferable to be an item including one type or two or more types selected from the group consisting of phenoxy ethyl acrylate, benzyl acrylate, acrylic acid 2-(2-vinyloxy-ethoxy) ethyl, dipropylene glycol diacrylate, tripropylene glycol diacrylate, 2-hydroxy 3-phenoxy propyl acrylate, and 4-hydroxy butyl acrylate. In addition to monomers having an alicyclic structure, by including this kind of monomer that does not have an alicyclic structure, while having excellent storage stability and discharge stability for the second ink 3', there is particularly excellent reactivity of the second ink 3' after discharging using the inkjet method, it is possible to have particularly excellent productivity of the recording material 10, and it is possible to have particularly excellent abrasion resistance of the formed pattern and the like.

Among these, in the case of an item including phenoxyethyl acrylate, with the produced recording material 10, it is possible to suitably arrange the metal powder 31 near the outer surface of the second layer 3, and possible to have even more excellent glossy appearance (sparkly appearance) of the recording material 10.

Also, in the case of an item including acrylic acid 2-(2-vinyloxyethoxy) ethyl, it is possible to have even more excellent curing speed of the second ink 3' when irradiating ultraviolet light, and productivity of the recording material 10.

Also, in the case of an item including phenoxy ethyl acrylate and/or 2-hydroxy 3-phenoxypropyl acrylate, it is possible to have even more excellent flexibility of the hardened material 32 (second layer 3).

Also, from the perspective of further improving the abrasion resistance of the printing part, it is preferable to include one type or two or more types selected from the group consisting of 2-(2-vinyloxyethoxy) ethyl acrylate, dipropylene glycol diacrylate, and tripropylene glycol diacrylate, and more preferable to include acrylic acid 2-(2-vinyloxyethoxy) ethyl.

Also, when including phenoxy ethyl acrylate, the shrinkage ratio during curing of the second ink 3' is smaller, and it is possible to more effectively prevent a decrease in the glossy appearance (shiny appearance) or the like due to unintended creases or the like in the hardened material 32 (second layer 3).

The content rate of the monomer other than a monomer having an alicyclic structure in the second ink 3' is preferably 5 mass % or greater and 50 mass % or less, and more preferably 10 mass % or greater and 40 mass % or less. By doing this, it is possible to make adjusting even easier for the curing speed of the second ink 3', the flexibility, the shrinkage ratio and the like. The second ink 3' can also be an item including two or more types of compounds as the monomer that does not have an alicyclic structure. In this case, it is preferable that the sum of the content rates of these be a value within the range noted above.

Other than a monomer, the second ink 3' can also include as the polymerized compound an oligomer (including dimer, trimer or the like), a prepolymer or the like. As the oligomer or prepolymer, for example it is possible to use the kind of monomers described above as constituent components. It is preferable that the second ink 3' include a multifunctional oligomer. By doing this, while having excellent storage stability of the second ink 3', it is possible to have particularly excellent abrasion resistance and the like of the formed printing part. As the oligomer, it is preferable to use a urethane oligomer for which the repeated structure is urethane, and to use an epoxy oligomer for which the repeated structure is epoxy or the like.

The content rate of the polymerized compound in the second ink 3' is preferably 70 mass % or greater and 99 mass % or less, and more preferably 80 mass % or greater and 98 mass % or less. By doing this, it is possible to have the second ink 3' be even more excellent in terms of storage stability, discharge stability, and hardenability. The second ink 3' can also include two types or more of compounds as the polymerized compound. In this case, it is preferable that the sum of the content rates of these compounds be a value within the range noted above.

The second ink 3' can also include a dispersant. By doing this, it is possible to have excellent dispersion stability of the metal powder 31 in the second ink 3', and possible to have even more excellent storage stability of the second ink 3'.

In particular, the second ink 3' can include as a dispersant an item that is basic and has a polymeric structure (hereafter also called a "basic polymeric dispersant"). By doing this, it is possible to have even more excellent storage stability for the second ink 3'.

With the invention, the basic polymeric dispersant can be any item that is basic and has a polymeric structure, and the molecular weight is not specifically limited.

The polymeric structure constituting the basic polymeric dispersant is not limited, and examples include an acrylic polymeric structure (including copolymers), a methacrylic polymeric structure (including copolymers), a polyurethane type polymeric structure, a hydroxyl group-containing carboxylic acid ester structure, a polyether type polymeric structure, a silicone type polymeric structure or the like.

The amine number of the basic polymeric dispersant is not particularly limited, but it is preferably 3 mg KOH/g or greater and 80 mg KOH/g or less, and more preferably 10 mg KOH/g or greater and 70 mg KOH/g or less.

Concrete examples of the basic polymeric dispersants that can be used in the invention include DISPERBYK-116 (made by BYK Chemie Company), DISPERBYK-182 (made by BYK Chemie Company), DISPERBYK-183 (made by BYK Chemie Company), DISPERBYK-184 (made by BYK Chemie Company), DISPERBYK-2155 (made by BYK Chemie Company), DISPERBYK-2164 (made by BYK Chemie Company), DISPERBYK-108 (made by BYK Chemie Company), DISPERBYK-112 (made by BYK Chemie Company), DISPERBYK-198 (made by BYK Chemie Company), DISPERBYK-2150 (made by BYK Chemie Company), PAA-1112 (made by Nittobo Co., Ltd.) and the like.

The content rate of the basic polymeric dispersant in the second ink 3' is preferably 0.01 mass % or greater and 5.0 mass % or less, and more preferably, 0.1 mass % or greater and 2.0 mass % or less. Because of this, the second ink 3' can be provided with even more excellent storage stability, discharge stability, and hardenability, and the recording material 10 can have even more excellent glossy appearance (sparkly appearance), durability and the like. The second ink 3' can include more than 2 types of compositions as a basic polymeric dispersant. In this case, the sum of the content rates of these compounds is preferably a value within the range noted above.

Also, with the second ink 3', it is preferable to include a substance A having the partial structure shown in formula (28) below.

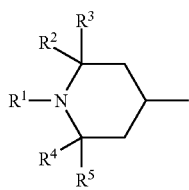

(28)

(In formula (28), $R^1$ represents an oxygen atom, a hydrogen atom, a hydrocarbon group, or an alkoxyl group, and $R^2$, $R^3$, $R^4$, and $R^5$ respectively independently represent a hydrogen atom or a hydrocarbon group.)

By the second ink 3' including a substance A having this kind of chemical structure (in particular, including it together with the metal powder 31 for which the kind of surface processing noted above is implemented), it is possible to have particularly excellent storage stability and hardenability of the second ink 3'. Also, with the recording material 10, the glossy appearance that the metal material constituting the metal powder 31 has naturally and the high class appearance are exhibited more effectively, and it is possible to have particularly excellent glossy appearance (sparkly appearance) and durability of the recording material 10.

In formula (28), $R^1$ is acceptable if it represents a hydrogen atom, a hydrocarbon group, or alkoxyl group (this is a chain or alicyclic hydrocarbon group bonded to an oxygen atom), but it is especially preferable to be a hydrogen atom, methyl group, or octyloxy group. By doing this, the second ink 3' can be provided with excellent storage stability and excellent discharge stability, and the recording material 10 can be provided with excellent glossy appearance (sparkly appearance) and durability.

Also, in formula (28), $R^2$ to $R^5$ are respectively independently acceptable as long as they represent a hydrogen atom or hydrocarbon group, but it is preferable to be an alkyl group of a carbon number 1 to 3, and more preferable to be a methyl group. By doing this, the second ink 3' can be provided with excellent storage stability and excellent discharge stability, and the recording material 10 can be provided with excellent glossy appearance (sparkly appearance) and durability.

The content rate of the substance A in the second ink 3' is preferably 0.1 mass % or greater and 5.0 mass % or less, and more preferably 0.5 mass % or greater and 3.0 mass % or less. By doing this, the second ink 3' can be provided with even more excellent storage stability, discharge stability, and hardenability, and the recording material 10 can be provided with excellent glossy appearance (sparkly appearance) and durability and the like. The second ink 3' can include more than 2 types of compounds as the substance A. In this case, the sum of the content rates of these compounds is preferably a value within the range noted above.

When the content rate of the substance A is $X_A$ [mass %] and the content rate of the metal powder 31 is $X_M$ [mass %], it is preferable to satisfy a relationship of $0.01 \leq X_A/X_M \leq 0.8$, and a relationship of $0.05 \leq X_A/X_M \leq 0.4$ is more preferable. By satisfying these relationships, the second ink 3' can be provided with excellent storage stability and discharge stability, and the recording material 10 can be provided with even more excellent glossy appearance (sparkly appearance) and durability.

The second ink 3' can include components (other components) besides the components discussed above. As these components, examples include coloring agents, photopolymerization initiators, slip agents (leveling agents), polymerization accelerators, polymerization inhibitors, penetration enhancers, wetting agents (humectants), fixing agents, antifungal agents, preservatives, antioxidants, chelating agents, thickeners, sensitizers (sensitizing dyes) and the like.

As the photopolymerization initiator, for example, it is possible to use the same item as explained as the constituent component of the first ink. By doing this, the same effects as noted above can be obtained.

The content rate of the photopolymerization initiator in the second ink 3' is preferably 0.5 mass % or greater and 10 mass % or less. When the content rate of the photopolymerization initiator is in the range noted above, the ultraviolet curing speed is sufficiently high, and in addition, there are almost no remains of melted photopolymerization initiator or coloration caused by the photopolymerization initiator.

When the second ink 3' includes a slip agent, by a leveling action, the surface of the recording material 10 becomes smoother, and the abrasion resistance is improved.

As a slip agent, it is not particularly limited, but for example, it is possible to use silicone surfactants of polyester modified-silicone, polyether modified-silicone, acrylic silicone or the like, and it is preferable to use polyester modified-polydimethylsiloxane or polyether modified-polydimethylsiloxane.

The second ink 3' can include a polymerization inhibitor, but even when the polymerization inhibitor is included, the content rate of the polymerization inhibitor in the second ink 3' is preferably 0.6 mass % or less and more preferably 0.2 mass % or less. By doing of this, since it is possible to have the content of the second polymerized compound 32' in the second ink 3' be relatively high, it is possible for there to be particularly excellent adhesiveness of the second layer 3 formed using the second ink 3' in relation to the first layer 2 or the like.

Also, it is preferable that the second ink 3' does not include an organic solvent that is removed (vaporized) in the production process of the recording material 10. Because of this, an occurrence of the VOC (volatile organic compound) problem can be effectively prevented.

The contact angle of the second ink 3' to the first layer 2 is preferably 10 degrees or greater and 90 degrees or less, and more preferably 30 degrees or greater and 60 degrees or less. Also, the contact angle of the second ink 3' to the base material 1 is preferably 30 degrees or greater and 85 degrees or less, more preferably 35 degrees or greater and 80 degrees or less, and even more preferably 40 degrees or greater and 75 degrees or less. By fulfilling these kinds of conditions, there is excellent affinity of the second ink 3' in relation to the first layer 3, and while having excellent adhesiveness of the second layer 3 formed at a later step to the first layer 2, it is possible to reliably prevent wetting and spreading of the second ink 3' to the surface of the base material 1 (area at which the first layer 2 is not formed), and possible to have the second layer 3 reliably have the desired shape. With the invention, as "the contact angle in relation to the first layer," it is possible to use the contact angle of the ink in relation to the first layer at 25° C. measured in conformance with the θ/2 method.

The viscosity of the second ink 3' at room temperature (25° C.) is preferably 4 mPa·s or greater and 40 mPa·s or less, and more preferably 6 mPa·s or greater and 30 mPa·s or less. By doing this, while having particularly excellent discharge stability for the second ink 3', it is possible to more effectively inhibit unintended bleeding of the droplets of the second ink 3' when landing, and possible to have particularly excellent glossy appearance (sparkly appearance) of the recording material 10.

The absolute value of the difference in the viscosity of the first ink 2' at room temperature (25° C.) and the viscosity of the second ink 3' at room temperature (25° C.) is preferably 1.0 mPa·s or less, more preferably 0.6 mPa·s or less, and even more preferably 0.4 mPa·s or less. By doing this, setting and adjusting the discharge conditions or the like of the ink using the inkjet method (first ink 2' and second ink 3') is easy.

The surface tension of the second ink 3' at 25° C. is preferably 14 mN/m or greater and 50 mN/m or less. By doing this, while have particularly excellent discharge stability for the second ink 3', it is possible to more effectively inhibit unintended bleeding of the second ink 3' droplets when they land, and possible to have particularly excellent glossy appearance (sparkly appearance) of the recording material 10.

This step can be performed using the kind of droplet discharge method (inkjet method) described with the first ink applying step. This step can also be the same method as the first ink applying step, or it can be performed using a different method from the first ink applying step.

Also, this step can be performed using the same device (droplet discharge device) as was used with the first ink applying step, or can also be performed using a different device (droplet discharge device) as that used with the first ink applying step.

Second Curing Step

Figure 2D:
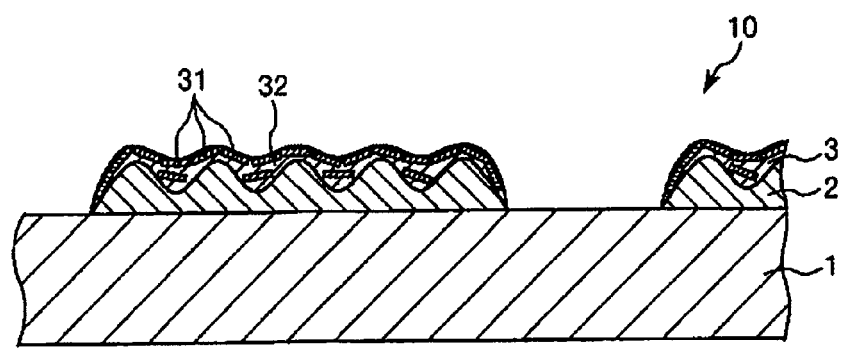

Next, by irradiating ultraviolet light, the second polymerized compound 32' is polymerized and cured (FIG. 2D). By doing this, the second layer 3 for which the metal powder 31 is fixed is formed using the hardened material 32 of the second polymerized compound 32'.

This step is performed so as to satisfy the kinds of conditions noted below. Specifically, the time after droplets of the second ink 3' discharged at the second ink applying step described previously land in the area on which the first layer 2 is formed until irradiation of the ultraviolet light on those droplets with this step (second ink 3' droplets) is performed is 5.0 seconds or greater and 60.0 seconds or less. In this way, by implementing the curing process using ultraviolet light irradiation after a relatively long time has elapsed from landing of the second ink 3' droplets (a longer time than the time after the first ink 2' droplets land on the base material 1 at the first ink applying step until the ultraviolet light is irradiated on those drops with the first curing step), the second polymerized compound 32' is cured after the second ink 3' has sufficiently wet and spread on the surface of the first layer 2, and the metal powder 31 is suitably arranged in the second ink 3' having fluidity, the second layer 3 is formed with a shape reflecting the shape of the surface of the first layer 2, and the metal powder 31 is in a state suitably arranged in the second layer 3. Then, coupled with the fact that the discharged volume of the second ink 3' at the second ink applying step is the necessary and sufficient volume, it is possible to obtain a sparkly glossy appearance (sparkly appearance) for which there is a big difference in the situation of the changes in the reflective state for each site such as with lamé as the observation direction changes.

In contrast to this, when the time from when the droplets of the second ink 3' land in the area noted above with the second ink applying step until irradiation of ultraviolet light on those droplets at this step is less than the lower limit noted above, the curing reaction of the second polymerized compound progresses before the second ink 3' is sufficiently wet and spread on the surface of the first layer 2, and before the metal powder 31 is suitably arranged in the second ink 3', and the second layer 3 with lost fluidity is formed, so the formed second layer 3 does not sufficiently reflect the shape of the surface of the first layer 2, and it is not possible to obtain an excellent glossy appearance (sparkly appearance). Also, when the time from when the droplets of the second ink 3' land in the area noted above with the second ink applying step until irradiation of ultraviolet light on those droplets at this step exceeds the upper limit noted above, the productivity of the recording material 10 decreases. Also, the second ink 3' protrudes to outside the range noted above, so it is not possible to form the printing part with high precision.

As noted above, it is acceptable for the time from when the droplets of the second ink 3' land in the area noted above with the second ink applying step until irradiation of ultraviolet light on those droplets at this step to be 5.0 seconds or greater and 60.0 second or less, but it is preferably 6.0 seconds or greater and 30.0 seconds or less, and more preferably 7.0 seconds or greater and 20.0 seconds or less. By doing this, the effects described above are more markedly exhibited.

Also, with this step, the time from when irradiation of ultraviolet light on the droplets of the second ink 3' until the level of curing of the second polymerized compound 32' included in those droplets reaches 90% is preferably 0.5 seconds or less, more preferably 0.3 seconds or less, and even more preferably 0.2 seconds or less. In this way, by having the curing reaction advance in a sufficiently short time, it is possible to more reliably prevent unintended deformation of the hardened material 32 (second layer 3). It is also advantageous for further improving the productivity of the recording material 10.

With this step, as the ultraviolet light source, it is possible to use an item not described with the first ink applying step. This step can be performed using the same ultraviolet light source as was used with the first ink applying step, or it can also be performed using a different ultraviolet light source from that used with the first ink applying step.

The surface roughness Ra of the second layer 3 formed with this step is preferably 1.0 µm or greater and 10 µm or less, and more preferably 2.0 µm or greater and 9.0 µm or less. By doing this, it is possible to have particularly excellent glossy appearance (sparkly appearance) of the recording material 10.

Recording Material

Next, we will describe the recording material of the invention.

The recording material of the invention is produced using the method of the invention as described above. This kind of recording material has the printing part having a sparkly glossy appearance (sparkly appearance) for which there is a big difference in the situation of the changes in the reflective state for each site such as with lamé as the observation direction changes provided with good precision.

The recording material of the invention can be used for any purpose, and for example, it can be used for a decorative product or other purpose. Specific examples of the invention include interior decorations for vehicles such as a console lid, a switch-base, a center cluster, an interior panel, an emblem, a center console, an indicator panel, or the like, or indicators such as the operating unit (key switches) of various electronic devices, a decorative part exhibiting decorative characteristics, an index, a logo, or the like.

Above, we described the invention based on the preferred embodiments, but the invention is not limited to these.

For example, with the production method of the invention, in addition to the kinds of steps described above, it is also possible to have other steps (pre-processing steps, interim processing steps, post-processing steps).

Also, the ink set of the invention (set of the first ink and the second ink) is acceptable as long as it is equipped with at least one type of the respective first ink and second ink as described above, and for example it can also be equipped with two or more types of the first ink, or can be equipped with two or more types of the second ink. Also, with the invention, it is also possible to use the same ink in common as the first ink and the second ink.

Also, with the modes described previously, the focus of the description was on cases when the first layer was formed as an item of a form as a film for covering the surface of the base material in a designated area (item for which the first ink droplets are bonded to each other), but with the invention, the first layer can be an item provided at a plurality of discrete points rather than the first ink droplets being bonded to each other.

Embodiments

Next, we will describe specific embodiments of the invention.

1 Production of the Recording Material

Embodiment 101

First, the ink (first ink and second ink) was produced as described hereafter.

Production of Ink (First Ink and Second Ink)

First of all, a film made of polyethylene terephthalate, which has a smooth surface, (surface roughness Ra is 0.02 µm or less) was prepared.

Next, silicone oil was applied all over one surface of this film.

Next, using the vapor deposition method, a film constituted by Al was formed on the surface on which the silicone oil was applied.

Next, a film made of polyethylene terephthalate on which an Al film was formed (base material) was placed in a liquid constituted by 99 parts diethylene glycol diethylether and 1 part $CF_3(CF_2)_5(CH_2)_2O(P)(OH)_2$, and ultrasonic vibration of 27 kHz was applied for 3 hours at 55° C. By doing this, a dispersion liquid of metal powder consisting of scale-like shaped particles on which surface processing was implemented using $CF_3(CF_2)_5(CH_2)_2O(P)(OH)_2$ on mother particles made of Al was obtained.

The average particle diameter of the metal powder obtained in this way was 0.9 µm, the maximum particle diameter was 2.0 µm, and the average thickness was 60 nm.

Next, the ink was obtained by mixing the metal powder dispersion liquid with γ-butyrolactone acrylate as the monomer having an alicyclic structure (polymerized compound), phenoxyethyl acrylate as the monomer not having an alicyclic structure (polymerized compound), substance A having the chemical structure represented by formula (29) below, DISPERBYK-182 (made by BYK Chemie Company) as a basic polymeric dispersant, Irgacure 819 (made by Chiba-Japan Company) as a photopolymerization initiator, Speedcure TPO (made by ACETO Company) as a photopolymerization initiator, and Speedcure DETX (made by Lambson Company) as a photopolymerization initiator.

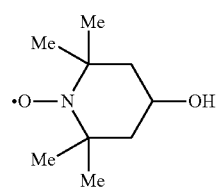

(29)

Producing Recording Material

The ink obtained as described above was used as the first ink and the second ink and the recording material was produced as described below. With the method described hereafter, the first ink applying step and the second ink applying step were performed under the conditions of the base material conveying speed: 350 mm/second, resolution: 720×720 dpi, base material-nozzle surface distance (gap): 1 mm.

First Ink Applying Step

First, a droplet discharge device installed inside a chamber (thermal chamber) was prepared, and the first ink was applied to the surface of the non-porous base material made of non-liquid absorbing polycarbonate in a designated pattern (a pattern for which four square solid patterns of 5.0 cm squared are arranged two each vertically and horizontally so that the corresponding sides are parallel, with a 0.5 mm gap set to exist between these) (see FIG. 2A). The discharged volume ($X_1$) of the first ink in the area to which the first ink was applied was 10.0 g/m².

First Curing Step

Next, by irradiating ultraviolet light, the first polymerized compound was polymerized and cured, and the first layer in film form constituted by a material including the hardened material of the first polymerized compound was formed (see FIG. 2B).

This step is performed so that the time ($T_1$) from when the first ink droplets land on the base material with the first ink applying step until irradiation of the ultraviolet light on those droplets starts is 0.01 seconds.

Also, as the ultraviolet light source (light source), an RX FireFly UV Light System (made by Phoseon) was used.

Second Ink Applying Step

Next, from a different droplet discharge head of the same droplet discharge device used with the first ink applying step, the second ink was selectively applied to the area on which the first layer was formed (surface of the first layer). The discharged volume ($X_2$) of the second ink on the area to which the second ink was applied (area on which the first layer was formed) was 5.0 g/m².

Second Curing Step

Next, by irradiating ultraviolet light, the second polymerized compound was polymerized and cured, and the second layer in film form constituted by a material including the hardened material of the second polymerized compound and a metal powder was formed.

This step is performed so that the time ($T_2$) from when the second ink droplets land on the area on which the first layer was formed (first layer surface) at the second ink applying step until irradiation of the ultraviolet light on those droplets starts is 10.0 seconds.

Also, as the ultraviolet light source, the same item as was used with the first curing step was used (RX FireFly UV Light System (made by Phoseon)).

Embodiments 102 Through 120

The recording material was produced in the same manner as with embodiment 101 except for the ink compositions used for production of the recording material being made to be as shown in table 11, table 12, table 14, and table 15, and for the following items being made to be as shown in table 17: the type of base material (recording medium) used for producing the recording material, the discharged volume $X_1$ of the first ink, the time $T_1$ from when the first ink droplets land on the base material with the first ink applying step until irradiation of ultraviolet light is started on those droplets, the discharged volume $X_2$ of the second ink, and the time $T_2$ from when the second ink droplets land on the area on which the first layer was formed (first layer surface) until irradiation of ultraviolet light is started on those droplets.

Comparative Example 101

Other than omitting the first ink applying step and the first curing step, the recording material was produced in the same manner as with embodiment 101.

Comparative Example 102

Other than having the time $T_1$ from when the second ink droplets land on the surface of the base material until irradiation of ultraviolet light starts on those droplets being 1.0 second, the recording material was produced in the same manner as with comparative example 101.

Comparative Example 103

Other than having the discharged volume of the first ink ($X_1$) in the area of the first ink applying step (area in which the first ink is applied) be 1.9 g/m², the recording material was produced in the same manner as with embodiment 101.

Comparative Example 104

Other than having the discharged volume of the first ink ($X_1$) in the area of the first ink applying step (area in which the first ink is applied) be 21.0 g/m², the recording material was produced in the same manner as with embodiment 101.

Comparative Example 105

Other than the time ($T_1$) from when the first ink droplets land on the base material at the first ink applying step until irradiation of ultraviolet light starts on those droplets being set to 0.0001 seconds, the recording material was produced in the same manner as with embodiment 101.

Comparative Example 106

Other than the time ($T_1$) from when the first ink droplets land on the base material at the first ink applying step until irradiation of ultraviolet light starts on those droplets being set to 1.1 seconds, the recording material was produced in the same manner as with embodiment 101.

Comparative Example 107

Other than having the discharged volume of the second ink ($X_2$) in the area with the second ink applying step (area on which the first layer is formed) being set to 0.9 g/m² (ratio of the second ink discharged volume to the first ink discharged volume in that area is 9 volume %), the recording material was produced in the same manner as with embodiment 101.

Comparative Example 108

Other than having the discharged volume of the second ink ($X_2$) in the area with the second ink applying step (area on which the first layer is formed) being set to 8.1 g/m² (ratio of the second ink discharged volume to the first ink discharged volume in that area is 81 volume %), the recording material was produced in the same manner as with embodiment 101.

Comparative Example 109

Other than the time ($T_2$) from when the second ink droplets land on the area on which the first layer is formed with the second ink applying step (first layer surface) until irradiation of the ultraviolet light is started on those droplets being set to 4.9 seconds, the recording material was produced in the same manner as with embodiment 101.

Comparative Example 110

Other than the time ($T_2$) from when the second ink droplets land on the area on which the first layer is formed with the second ink applying step (first layer surface) until irradiation of the ultraviolet light is started on those droplets being set to 61.0 seconds, the recording material was produced in the same manner as with embodiment 101.

Comparative Example 111

Other than using spherical particles made of Al produced using a gas atomizing method as the mother particles of the constituent particles of the metal powder included in the first ink and the second ink, the recording material was produced in the same manner as with comparative example 110.

For each embodiment and comparative example, the ink compositions are shown collectively in table 11 through table 16, and table 17 collectively shows the conditions of the constitutional materials of the base material used to produce the recording material, the discharged volume $X_1$ [g/m$^2$] of the first ink in the area noted above, the time $T_1$ [seconds] from when the first ink droplets land until irradiation of ultraviolet light on those droplets, the discharged volume $X_2$ [g/m$^2$] of the second ink in the area noted above, the time $T_2$ [seconds] from when the second ink droplets land until irradiation of ultraviolet light on those droplets, and the ratio R [volume %] of the second ink discharged volume to the first ink discharged volume in the area noted above. In the tables, FAP1" represents $CF_3(CF_2)_5(CH_2)_2O(P)(OH)_2$ as fluorine based phosphate ester compound, "FAP2" represents $CF_3(CF_2)_5(CH_2)_2O(P)(OH)(OC_2H_5)$ as fluorine based phosphate ester compound, "FAS1" represents $(CF_3(CF_2)_7CH_2CH_2Si(OC_2H_5)_3)$ as fluorine based silane compound, "FAS2" represents $(CF_3(CF_2)_5CH_2CH_2Si(OC_2H_5)_3)$ as fluorine based silane compound, "FFA1" represents $CF_3(CF_2)_7(CH_2)_2COOH$ as fluorine based fatty acid, "IS1" represents $CF_3(CF_2)_7(CH_2)_2NCO$ as isocyanate compound, "IS2" represents $CF_3(CF_2)_7NCO$ as isocyanate compound, "IS3" represents $CF_3(CF_2)_5(CH_2)_2NCO$ as isocyanate compound, "IS4" represents $CH_3(CH_2)_7NCO$ as isocyanate compound, "IS5" represents $CH_3(CH_2)_{12}NCO$ as isocyanate compound, "IS6" represents $CH_3(CH_2)_{17}NCO$ as isocyanate compound, "S1" represents $CF_3(CF_2)_5(CH_2)_2O(P)(OH)_2$ as isocyanate compound, "S2" represents $CF_3(CF_2)_5(CH_2)_2O(P)(OH)(OC_2H_5)$ as isocyanate compound, "S3" represents $CF_3(CF_2)_5—CH_2CH_2—Si(OC_2H_5)_3$ isocyanate compound, "S4" represents $CF_3—CH_2CH_2—Si(OCH_3)_3$ as isocyanate compound, "S5" represents $CH_3(CH_2)_7O—PO(OH)_2$ as isocyanate compound, "BLA" represents γ-butyrolactone acrylate as a monomer (polymerized compound) containing an alicyclic structure, "THFA" represents tetrahydrofurfuryl acrylate as a monomer (polymerized compound) containing an alicyclic structure, "VC" represents N-vinyl caprolactam as a monomer (polymerized compound) containing an alicyclic structure, "VP" represents N-vinylpyrrolidone as a monomer (polymerized compound) containing an alicyclic structure, "AMO" represents acryloylmorpholine as a monomer (polymerized compound) containing an alicyclic structure, "TAOEI" represents tris (2-acryloyloxyethyl) isocyanurate as a monomer (polymerized compound) containing an alicyclic structure, "DCP-TeOEA" represents dicyclopentenyloxyethyl acrylate as a monomer (polymerized compound) containing an alicyclic structure, "AA" represents adamantyl acrylate as a monomer (polymerized compound) containing an alicyclic structure, "DMTCDDA" represents dimethylol tricyclodecane diacrylate as a monomer (polymerized compound) containing an alicyclic structure, "DMDCPTA" represents dimethylol dicyclopentane diacrylate as a monomer (polymerized compound) containing an alicyclic structure, "DCPTeA" represents dicyclopentenyl acrylate as a monomer (polymerized compound) containing an alicyclic structure, "DCPTaA" represents dicyclopentanyl acrylate as a monomer (polymerized compound) containing an alicyclic structure, "IBA" represents isobornyl acrylate as a monomer (polymerized compound) containing an alicyclic structure, "CHA" represents cyclohexyl acrylate as a monomer (polymerized compound) containing an alicyclic structure, "DAI" represents isocyanurate diacrylate as a monomer (polymerized compound) containing an alicyclic structure, "TAI" represents isocyanurate triacrylate as a monomer (polymerized compound) containing an alicyclic structure, "BLM" represents γ-butyrolactone methacrylate as a monomer (polymerized compound) containing an alicyclic structure, "THFM" represents tetrahydrofurfuryl methacrylate as a monomer (polymerized compound) containing an alicyclic structure, "DCPTeOEM" represents dicyclopentenyloxyethyl methacrylate as a monomer (polymerized compound) containing an alicyclic structure, "AM" represents adamantyl methacrylate as a monomer (polymerized compound) containing an alicyclic structure, "PMPM" represents pentamethyl piperidyl methacrylate as a monomer (polymerized compound) containing an alicyclic structure, "TMPM" represents tetramethylpiperidyl methacrylate as a monomer (polymerized compound) containing an alicyclic structure, "MAM" represents 2-methyl-2-adamantyl methacrylate as a monomer (polymerized compound) containing an alicyclic structure, "EAM" represents 2-ethyl-2-adamantyl methacrylate as a monomer (polymerized compound) containing an alicyclic structure, "MLM" represents mevalonic acid lactone methacrylate as a monomer (polymerized compound) containing an alicyclic structure, "DCPTeM" represents dicyclopentenyl methacrylate as a monomer (polymerized compound) containing an alicyclic structure, "DCPTaM" represents dicyclopentanyl methacrylate as a monomer (polymerized compound) containing an alicyclic structure, "IBM" represents isobornyl methacrylate as a monomer (polymerized compound) containing an alicyclic structure, "CHM" represents cyclohexyl methacrylate as a monomer (polymerized compound) containing an alicyclic structure, "CHDOLA" represents cyclohexane spiro-2-(1,3-dioxolan-4-yl) methyl acrylate as a monomer (polymerized compound) containing an alicyclic structure, "MEDOLA" represents (2-methyl-2-ethyl-1,3-dioxolan-4-yl) methyl acrylate as a monomer (polymerized compound) containing an alicyclic structure, "PEA" represents phenoxyethyl acrylate as a monomer (polymerized compound) not containing an alicyclic structure, "DPGDA" represents dipropylene glycol diacrylate as a monomer (polymerized compound) not containing an alicyclic structure, "TPGDA" represents tripropylene glycol diacrylate as a monomer (polymerized compound) not containing an alicyclic structure, "HPPA" represents 2-hydroxy-3-phenoxypropyl acrylate as a monomer (polymerized compound) not containing an alicyclic structure, "HBA" represents 4-hydroxybutyl acrylate as a monomer (polymerized compound) not containing an alicyclic structure, "ECA" represents ethylcarbitol acrylate as a monomer (polymerized compound) not containing an alicyclic structure, "MTEGA" represents methoxy triethylene glycol acrylate as a monomer (polymerized compound) not containing an alicyclic structure, "TBA" represents t-butyl acrylate as a monomer (polymerized compound) not containing an alicyclic structure, "BA" represents benzyl acrylate as a monomer (polymerized compound) not containing an alicyclic structure, "VEEA" represents 2-(2-hydroxyethoxy) ethyl acrylate as a monomer (polymerized compound) not containing an alicyclic structure, "BM" represents benzyl methacrylate as a monomer (polymerized compound) not containing an alicyclic structure, "UA" represents urethane acrylate as a monomer (polymerized compound) not containing an alicyclic structure, "D2" represents DISPERBYK-182 (made by BKY Chemi Company, amine number: 13 mgKOH/g) as a basic polymeric dispersant, "D5" represents DISPERBYK-2155 (made by BKY Chemi Company, amine number: 48 mgKOH/g) as a basic polymeric dispersant, "A1" represents a compound (substance A) shown in the formula (29) noted above, "A2" represents a compound (substance A) shown in the formula (30) noted above, "A3" represents a compound (substance A) shown in the formula (31) noted below, "A4" represents a compound (substance A) shown in the formula (32) noted below, "ic819" represents Irgacure 819 (made by Chiba Japan Company), "scTPO" represents Speedcure TPO (made by ACETO Company), "scDETX" represents Speedcure DETX (made by Lambson Company), "UV3500" represents UV-3500 (made by BKY Chemi Company), "MEHQ" represents hydroquinone monomethyl ether, "1,2HD" represents 1,2-hexanediol, "TMP" represents trimethylolpropane, "S465" represents Surfynol 465 (made by Nissin Chemical Industry Co., Ltd.), "TEA" represents triethanolamine, "GL" represents glycerin, "LHP" represents LHP-96 (made by Kusumoto Chemicals, Ltd.), "LF" represents LF-1984 (made by Kusumoto Chemicals, Ltd.), "PF401" represents Polyflow 401 (made by Nissin Chemical Industry Co., Ltd.), "PC" represents polycarbonate, and "PET" represents polyethylene terephthalate. Also, in the tables, for embodiment 115, the composition of the constitutional material of the mother particles is shown with the content rate of each element by weight ratio. Also, the viscosity at 25° C. of the inks used with each embodiment noted above measured in compliance with JIS Z8809 using a vibration type viscometer were all values within the range of 6 mPa·s or greater and 30 mPa·s or less. Also, the surface tension at 25° C. of the inks used with the embodiments noted above measured in compliance with JIS K 3362 were all values within the range of 14 mN/m or greater and 50 mN/m or less. Also, for the first ink used with the embodiments noted above, the contact angle in relation to the base material at 25° C. measured in compliance with the θ/2 method were all 40 degrees or greater and 75 degrees or less. Also, for the second ink used with the embodiments noted above, the contact angle in relation to the first layer at 25° C. measured in compliance with the θ/2 method were all 30 degrees or greater and 85 degrees or less. Also, for the second ink used with the embodiments noted above, the contact angle in relation to the base material at 25° C. measured in compliance with the θ/2 method were all 40 degrees or greater and 75 degrees or less. Also, for the metal powder constituting the inks used with the embodiments noted above, observation was performed on any 10 metal particles of each, the ratio ($S_1/S_0$) was obtained for the surface area $S_1$ [μm$^2$] when the projected area is observed from the direction at which it is maximum (when with a planar view) and the surface area $S_0$ [μm$^2$] when the projected area is observed from the direction at which the surface area is a maximum when observing among directions orthogonal to that observed direction, and when the average value of these was obtained, the average value for $S_1/S_0$ was always 19 or greater. Also, D2 and D5 are both items which are basic and have a polymeric structure (basic polymeric dispersant). Also, the base material used with each of the embodiments and comparative examples noted above were all non-porous and non-liquid absorbing. Also, with each of the embodiments and comparative examples noted above, the droplet volume of the first ink with one discharge operation and the droplet volume of the second ink with one discharge operation are both values within the range of 7 ng or greater and 20 ng or less. Also, with each of the embodiments noted above, the time from the start of irradiation of ultraviolet light on the first ink droplets until the level of curing of the first polymerized compound included in those droplets reaches 90%, and the time from the start of irradiation of ultraviolet light on the second ink droplets until the level of curing of the second polymerized compound included in those droplets reaches 90% was always 0.1 second or less. Also, for the recording material of each of the embodiments noted above, the surface roughness Ra of the second layer, when measured in compliance with JIS B 0601, was always 2.0 μm or greater and less 8.0 μm or less. Also, for each of the embodiments noted above, the surface roughness Ra of the first layer, when measured in compliance with JIS B 0601, was always 15 μm or greater and 20 μm or less.

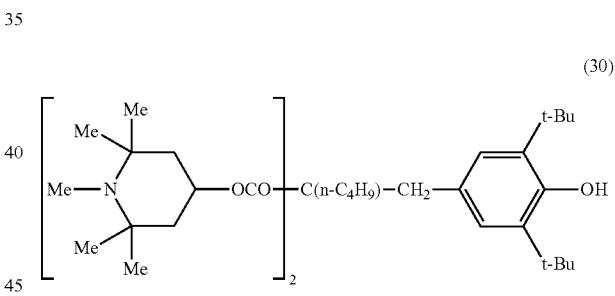

(30)

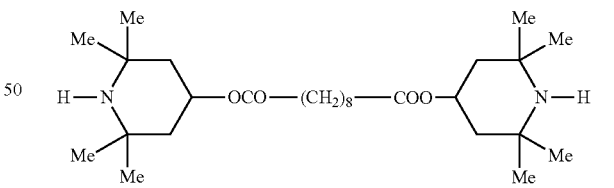

(31)

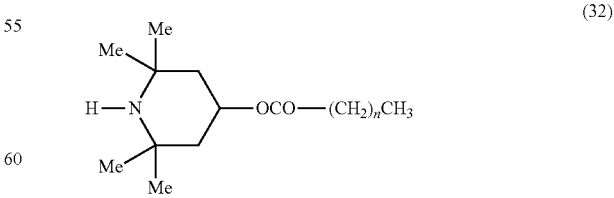

(32)

(The substance A shown in formula (32) is a mixture of a plurality of compounds for which n in the formula is 10 or greater and 19 or less (the main component is a compound for which n in the formula is 15 or greater and 18 or less).)

TABLE 11

| | Metal Powder Constitution | | First Ink Constitution | | | | | |
|---|---|---|---|---|---|---|---|---|
| | Constituent Material of Mother Particles | Materials Used for Surface Preparation | Metal Powder | | | | | Polymerized Compound |
| | | | Shape | Average Particle Diameter (μm) | Maximum Particle Diameter (μm) | Average Thickness (nm) | Content Rate (Mass Part) | |
| Embodiment 101 | A1 | FAP1 | Scale-like | 0.9 | 2.0 | 60 | 2.0 | BLA/PEA |
| Embodiment 102 | A1 | IS1 | Scale-like | 0.9 | 0.9 | 20 | 4.0 | BLA/THFA |
| Embodiment 103 | A1 | FAP2 | Scale-like | 2.0 | 2.0 | 20 | 2.0 | VC/VP/AMO/VEEA |
| Embodiment 104 | A1 | IS2 | Scale-like | 1.0 | 1.0 | 80 | 2.0 | BLM/THFM/TAOEI/DCPTeOEA/AA/PEA DPGDA |
| Embodiment 105 | A1 | IS3 | Scale-like | 0.9 | 0.9 | 80 | 2.0 | AM/PMPM/TMPM/MAM/EAM/DCPTeA/PEA/TPGDA/VEEA |
| Embodiment 106 | A1 | IS4 | Scale-like | 0.8 | 0.8 | 60 | 2.0 | DCPTeOEM/MLM/DMTC DDA/DCPTaA/IBA/CHM/PEA/HPPA |
| Embodiment 107 | A1 | IS5 | Scale-like | 0.8 | 0.8 | 60 | 2.0 | DMDCPTA/DCPTeM/DCPTaM/IBM/CHA/PEA/HBA/VEEA |
| Embodiment 108 | A1 | IS6 | Scale-like | 0.9 | 0.9 | 20 | 4.0 | BLA/THFA/PEA/HBA/AMO |
| Embodiment 109 | A1 | IS1 | Scale-like | 2.0 | 2.0 | 20 | 2.0 | BLA/THFA/VC/PEA |
| Embodiment 110 | A1 | FAS1 | Scale-like | 1.1 | 1.1 | 20 | 20 | BLA/THFA/TBA/VEEA/UA |

| | First Ink Constitution | | | | | |
|---|---|---|---|---|---|---|
| | Polymerized Compound Content Rate (Mass Part) | Dispersant | Dispersant Content Rate (Mass Part) | Substance A | Substance A Content Rate (Mass Part) | Other Components | Other Components Content Rate (Mass Part) |
| Embodiment 101 | 60.0/27.8 | D2 | 1.0 | A1 | 0.2 | ic819/scTPO/scDETX | 4.0/4.0/2.0 |
| Embodiment 102 | 41.5/43.3 | — | — | A2 | 0.8 | ic819/scTPO/scDETX/UV3500/MEHQ | 4.0/4.0/2.0/0.2/0.2 |
| Embodiment 103 | 25.8/32.1/17.5/9.6 | D2 | 1.4 | A1 | 1.4 | ic819/scTPO/scDETX/UV3500 | 4.0/4.0/2.0/0.2 |
| Embodiment 104 | 7.4/5.1/31.0/32.0/5.5/4.0/3.9 | — | — | A3 | 0.7 | ic819/scTPO/UV3500/MEHQ | 4.0/4.0/0.2/0.2 |
| Embodiment 105 | 3.9/7.9/3.0/3.0/3.1/59.1/3.2/1.2/2.0 | — | — | A4 | 1.2 | ic819/scTPO/scDETX/UV3500/MEHQ | 4.0/4.0/2.0/0.2/0.2 |
| Embodiment 106 | 3.8/3.6/19.6/29.1/9.6/9.4/6.5/5.0 | — | — | A1 | 1.0 | ic819/scTPO/scDETX/UV3500/MEHQ | 4.0/4.0/2.0/0.2/0.2 |
| Embodiment 107 | 45.42/5.5/6.6/5.9/17.8/4.1/1.1/1.0 | — | — | A1 | 0.58 | ic819/scTPO/scDETX | 4.0/4.0/2.0 |

TABLE 11-continued

|  | | | | | | | |
|---|---|---|---|---|---|---|---|
| Embodiment 108 | 29.1/34.0/ 9.5/9.0/3.2 | | A2 | 0.8 | ic819/scTPO/ scDETX/UV3500/ MEHQ | 4.0/4.0/ 2.0/0.2/ 0.2 | |
| Embodiment 109 | 25.2/32.7/ 7.2/19.9 | D2 | 1.4 | A1 | 1.4 | ic819/scTPO/ scDETX/LF | 4.0/4.0/ 2.0/0.2 |
| Embodiment 110 | 26.6/23.5/ 15.0/9.5/ 12.6 | — | — | A1 | 0.4 | ic819/scTPO/ scDETX/UV3500/ MEHQ | 4.0/4.0/ 2.0/0.2/ 0.2 |

TABLE 12

| | Metal Powder Constitution | | First Ink Constitution | | | | | |
|---|---|---|---|---|---|---|---|---|
| | Constituent Material of Mother Particles | Materials Used for Surface Preparation | Metal Powder | | | | | |
| | | | Shape | Average Particle Diameter (μm) | Maximum Particle Diameter (μm) | Average Thickness (nm) | Content Rate (Mass Part) | Polymerized Compound |
| Embodiment 111 | A1 | FAS2 | Scale-like | 1.0 | 1.0 | 20 | 2.0 | BLA/THFA/ VP/PEA |
| Embodiment 112 | A1 | IS1 + S1 | Scale-like | 0.7 | 0.7 | 40 | 4.0 | BLA/THFA/ VEEA/BM/ UA |
| Embodiment 113 | A1 | IS1 + IS2 | Scale-like | 0.9 | 1.5 | 20 | 2.0 | BLA/THFA/ PEA |
| Embodiment 114 | A1 | IS2 + IS3 | Scale-like | 1.5 | 1.8 | 15 | 1.0 | DAI/TAI/ECA/ MTEGA/ IBA/BA |
| Embodiment 115 | Ni49.5 Fe50.5 | IS4 + IS5 | Scale-like | 1.8 | 1.5 | 40 | 2.0 | BLA/THFA/ TBA/VEEA/ UA |
| Embodiment 116 | SUS316L | IS1 + IS6 | Scale-like | 1.5 | 0.8 | 40 | 2.0 | BLA/THFA/ VEEA/BM/ MEDOLA |
| Embodiment 117 | A1 | IS1 + S3 | Scale-like | 0.9 | 0.9 | 20 | 1.5 | AMO/THFA |
| Embodiment 118 | A1 | FFA1 + S4 | Scale-like | 0.9 | 0.9 | 20 | 1.2 | AMO/THFA/ BA |
| Embodiment 119 | A1 | IS1 + S5 | Scale-like | 0.9 | 0.8 | 20 | 1.2 | AMO/BA/ DCPTaA/ CHDOLA |
| Embodiment 120 | A1 | IS1 | Scale-like | 0.8 | 0.8 | 20 | 2.0 | VEEA/ PEA |

| | First Ink Constitution | | | | |
|---|---|---|---|---|---|
| | Polymerized Compound | Dispersant | Substance A | | Other Components | |
| | Content Rate (Mass Part) | Content Rate (Mass Part) | | Content Rate (Mass Part) | | Content Rate (Mass Part) |
| Embodiment 111 | 33.5/34.9/ 3.5/16.9 | — | — | A3 | 0.8 | ic819/scTPO/ UV3500/ MEHQ | 4.0/4.0/ 0.2/0.2 |
| Embodiment 112 | 24.9/23.9/ 14.1/16.1/ 10.2 | D5 | 0.2 | A1 | 0.2 | ic819/scTPO/ UV3500/ MEHQ | 4.0/2.0/ 0.2/0.2 |
| Embodiment 113 | 32.0/34.1/ 20.3 | — | — | A4 | 1.2 | ic819/scTPO/ scDETX/UV3500/ MEHQ | 4.0/4.0/ 2.0/0.2/ 0.2 |
| Embodiment 114 | 20.8/20.0/ 18.1/17.2/ 6.0/5.5 | — | — | A1 | 1.0 | ic819/scTPO/ scDETX/UV3500/ MEHQ | 4.0/4.0/ 2.0/0.2/ 0.2 |

TABLE 12-continued

| | | | | | | | |
|---|---|---|---|---|---|---|---|
| Embodiment 115 | 27.0/26.5/ 13.8/15.5/ 4.0 | — | — | A2 | 0.8 | ic819/scTPO/ scDETX/UV3500/ MEHQ | 4.0/4.0/ 2.0/0.2/ 0.2 |
| Embodiment 116 | 26.2/27.6/ 14.1/15.5/ 4.0 | D5 | 0.2 | A1 | 0.2 | ic819/scTPO/ scDETX/LHP | 4.0/4.0/ 2.0/0.2 |
| Embodiment 117 | 52.2/34.8 | — | — | A2 | 0.3 | ic819/scTPO/ scDETX/LHP/LF | 4.0/4.0/ 2.0/0.2/ 0.2 |
| Embodiment 118 | 40.0/40.0/ 7.0 | — | — | A2 | 0.6 | ic819/scTPO/ scDETX/LHP/LF | 4.0/4.0/ 2.0/0.2/ 0.2 |
| Embodiment 119 | 21.8/21.8/ 26.0/17.4 | — | — | A2 | 0.6 | ic819/scTPO/ scDETX/LHP/LF | 4.0/4.0/ 2.0/0.2/ 0.2 |
| Embodiment 120 | 51.5/34.1 | D2 | 1.0 | A1 | 1.0 | ic819/scTPO/ scDETX/UV3500/ MEHQ | 4.0/4.0/ 2.0/0.2/ 0.2 |

TABLE 13

| | Metal Powder Constitution | | First Ink Constitution | | | | | |
|---|---|---|---|---|---|---|---|---|
| | Constituent Material of Mother Particles | Materials Used for Surface Preparation | Metal Powder | | | | | |
| | | | Shape | Average Particle Diameter (μm) | Maximum Particle Diameter (μm) | Average Thickness (nm) | Content Rate (Mass Part) | Polymerized Compound |
| Comparative Example 101 | — | — | — | — | — | — | — | — |
| Comparative Example 102 | — | — | — | — | — | — | — | — |
| Comparative Example 103 | A1 | FAP1 | Scale-like | 0.9 | 2.0 | 60 | 2.0 | BLA/PEA |
| Comparative Example 104 | A1 | FAP1 | Scale-like | 0.9 | 2.0 | 60 | 2.0 | BLA/PEA |
| Comparative Example 105 | A1 | FAP1 | Scale-like | 0.9 | 2.0 | 60 | 2.0 | BLA/PEA |
| Comparative Example 106 | A1 | FAP1 | Scale-like | 0.9 | 2.0 | 60 | 2.0 | BLA/PEA |
| Comparative Example 107 | A1 | FAP1 | Scale-like | 0.9 | 2.0 | 60 | 2.0 | BLA/PEA |
| Comparative Example 108 | A1 | FAP1 | Scale-like | 0.9 | 2.0 | 60 | 2.0 | BLA/PEA |
| Comparative Example 109 | A1 | FAP1 | Scale-like | 0.9 | 2.0 | 60 | 2.0 | BLA/PEA |
| Comparative Example 110 | A1 | FAP1 | Scale-like | 0.9 | 2.0 | 60 | 2.0 | BLA/PEA |
| Comparative Example 111 | A1 | FAP1 | Sphere | 0.8 | 10 | — | 2.0 | BLA/PEA |

| | First Ink Constitution | | | | | | | |
|---|---|---|---|---|---|---|---|---|
| | Polymerized Compound | Dispersant | | Substance A | | Other Components | | |
| | Content Rate (Mass Part) | | Content Rate (Mass Part) | | Content Rate (Mass Part) | | Content Rate (Mass Part) | |
| Comparative Example 101 | — | — | — | — | — | — | — | |
| Comparative Example 102 | — | — | — | — | — | — | — | |
| Comparative Example 103 | 60.0/27.8 | D2 | 1.0 | A1 | 0.2 | ic819/scTPO/ scDETX | 4.0/4.0/ 2.0 | |
| Comparative Example 104 | 60.0/27.8 | D2 | 1.0 | A1 | 0.2 | ic819/scTPO/ scDETX | 4.0/4.0/ 2.0 | |
| Comparative Example 105 | 60.0/27.8 | D2 | 1.0 | A1 | 0.2 | ic819/scTPO/ scDETX | 4.0/4.0/ 2.0 | |
| Comparative Example 106 | 60.0/27.8 | D2 | 1.0 | A1 | 0.2 | ic819/scTPO/ scDETX | 4.0/4.0/ 2.0 | |

TABLE 13-continued

| | | | | | | | |
|---|---|---|---|---|---|---|---|
| Comparative Example 107 | 60.0/27.8 | D2 | 1.0 | A1 | 0.2 | ic819/scTPO/ scDETX | 4.0/4.0/ 2.0 |
| Comparative Example 108 | 60.0/27.8 | D2 | 1.0 | A1 | 0.2 | ic819/scTPO/ scDETX | 4.0/4.0/ 2.0 |
| Comparative Example 109 | 60.0/27.8 | D2 | 1.0 | A1 | 0.2 | ic819/scTPO/ scDETX | 4.0/4.0/ 2.0 |
| Comparative Example 110 | 60.0/27.8 | D2 | 1.0 | A1 | 0.2 | ic819/scTPO/ scDETX | 4.0/4.0/ 2.0 |
| Comparative Example 111 | 60.0/27.8 | D2 | 1.0 | A1 | 0.2 | ic819/scTPO/ scDETX | 4.0/4.0/ 2.0 |

TABLE 14

| | Metal Powder Constitution | | Second Ink Constitution | | | | | |
|---|---|---|---|---|---|---|---|---|
| | Constituent Material of Mother Particles | Materials Used for Surface Preparation | Metal Powder | | | | | |
| | | | Shape | Average Particle Diameter (μm) | Maximum Particle Diameter (μm) | Average Thickness (nm) | Content Rate (Mass Part) | Polymerized Compound |
| Embodiment 101 | A1 | FAP1 | Scale-like | 0.9 | 2.0 | 60 | 2.0 | BLA/ PEA |
| Embodiment 102 | A1 | IS1 | Scale-like | 0.9 | 0.9 | 20 | 4.0 | BLA/ THFA |
| Embodiment 103 | A1 | FAP2 | Scale-like | 2.0 | 2.0 | 20 | 2.0 | VC/VP/ AMO/ VEEA |
| Embodiment 104 | A1 | IS2 | Scale-like | 1.0 | 1.0 | 80 | 2.0 | BLM/THFM/ TAOEI/DCPTe OEA/AA/PEA DPGDA |
| Embodiment 105 | A1 | IS3 | Scale-like | 0.9 | 0.9 | 80 | 2.0 | AM/PMPM/ TMPM/MAM/ EAM/DCPTeA/ PEA/TPGDA/ VEEA |
| Embodiment 106 | A1 | IS4 | Scale-like | 0.8 | 0.8 | 60 | 2.0 | DCPTeOEM/ MLM/DMTC DDA/DCPTaA/ IBA/CHM/PEA/ HPPA |
| Embodiment 107 | A1 | IS5 | Scale-like | 0.8 | 0.8 | 60 | 2.0 | DMDCPTA/DCPTeM/ DCPTaM/IBM/CHA/ PEA/HBA/VEEA |
| Embodiment 108 | A1 | IS6 | Scale-like | 0.9 | 0.9 | 20 | 4.0 | BLA/THFA/PEA/ HBA/AMO |
| Embodiment 109 | A1 | IS1 | Scale-like | 2.0 | 2.0 | 20 | 2.0 | BLA/THFA/VC/ PEA |
| Embodiment 110 | A1 | FAS1 | Scale-like | 1.1 | 1.1 | 20 | 20 | BLA/THFA/TBA/ VEEA/UA |

| | Second Ink Constitution | | | | |
|---|---|---|---|---|---|
| | Polymerized Compound | Dispersant | Substance A | Other Components | |
| | Content Rate (Mass Part) | Content Rate (Mass Part) | Content Rate (Mass Part) | | Content Rate (Mass Part) |
| Embodiment 101 | 60.0/ 27.8 | D2 1.0 | A1 0.2 | ic819/scTPO/ scDETX | 4.0/4.0/ 2.0 |
| Embodiment 102 | 41.5/ 43.3 | — — | A2 0.8 | ic819/scTPO/ scDETX/UV3500/ MEHQ | 4.0/4.0/ 2.0/0.2/ 0.2 |

TABLE 14-continued

| | | | | | | | |
|---|---|---|---|---|---|---|---|
| Embodiment 103 | 25.8/32.1/ 17.5/9.6 | D2 | 1.4 | A1 | 1.4 | ic819/scTPO/ scDETX/UV3500 | 4.0/4.0/ 2.0/0.2 |
| Embodiment 104 | 7.4/5.1/ 31.0/32.0/ 5.5/4.0/ 3.9 | — | — | A3 | 0.7 | ic819/scTPO/ UV3500/MEHQ | 4.0/4.0/ 2.0/0.2 |
| Embodiment 105 | 3.9/7.9/3.0/ 3.0/3.1/59.1/ 3.2/1.2/2.0 | — | — | A4 | 1.2 | ic819/scTPO/ scDETX/ UV3500/ MEHQ | 4.0/4.0/ 2.0/0.2/ 0.2 |
| Embodiment 106 | 3.8/3.6/ 19.6/29.1/ 9.6/9.4/6.5/ 5.0 | — | — | A1 | 1.0 | ic819/scTPO/ scDETX/ UV3500/ MEHQ | 4.0/4.0/ 2.0/0.2/ 0.2 |
| Embodiment 107 | 45.42/5.5/ 6.6/5.9/17.8/ 4.1/1.1/1.0 | — | — | A1 | 0.58 | ic819/scTPO/ scDETX | 4.0/4.0/ 2.0 |
| Embodiment 108 | 29.1/34.0/ 9.5/9.0/3.2 | — | — | A2 | 0.8 | ic819/scTPO/ scDETX/UV3500/ MEHQ | 4.0/4.0/ 2.0/0.2 0.2 |
| Embodiment 109 | 25.2/32.7/ 7.2/19.9 | D2 | 1.4 | A1 | 1.4 | ic819/scTPO/ scDETX/LF | 4.0/4.0/ 2.0/0.2 |
| Embodiment 110 | 26.6/23.5/ 15.0/9.5/ 12.6 | — | — | A1 | 0.4 | ic819/scTPO/ scDETX/UV3500/ MEHQ | 4.0/4.0/ 2.0/0.2/ 0.2 |

TABLE 15

| | Metal Powder Constitution | | Second Ink Constitution | | | | | |
|---|---|---|---|---|---|---|---|---|
| | Constituent Material of Mother Particles | Materials Used for Surface Preparation | Metal Powder | | | | | |
| | | | Shape | Average Particle Diameter (µm) | Maximum Particle Diameter (µm) | Average Thickness (nm) | Content Rate (Mass Part) | Polymerized Compound |
| Embodiment 111 | A1 | FAS2 | Scale-like | 1.0 | 1.0 | 20 | 2.0 | BLA/THFA/ VP/PEA |
| Embodiment 112 | A1 | IS1 + S1 | Scale-like | 0.7 | 0.7 | 40 | 4.0 | BLA/THFA/ VEEA/BM/ UA |
| Embodiment 113 | A1 | IS1 + IS2 | Scale-like | 0.9 | 1.5 | 20 | 2.0 | BLA/THFA/ PEA |
| Embodiment 114 | A1 | IS2 + IS3 | Scale-like | 1.5 | 1.8 | 15 | 1.0 | DAI/TAI/ECA/ MTEGA/ IBA/BA |
| Embodiment 115 | Ni49.5 Fe50.5 | IS4 + IS5 | Scale-like | 1.8 | 1.5 | 40 | 2.0 | BLA/THFA/ TBA/VEEA/ UA |
| Embodiment 116 | SUS316L | IS1 + IS6 | Scale-like | 1.5 | 0.8 | 40 | 2.0 | BLA/THFA/ VEEA/BM/ MEDOLA |
| Embodiment 117 | A1 | IS1 + S3 | Scale-like | 0.9 | 0.9 | 20 | 1.5 | AMO/THFA |
| Embodiment 118 | A1 | FFA1 + S4 | Scale-like | 0.9 | 0.9 | 20 | 1.2 | AMO/THFA/ BA |
| Embodiment 119 | A1 | IS1 + S5 | Scale-like | 0.9 | 0.8 | 20 | 1.2 | AMO/BA/ DCPTaA/ CHDOLA |
| Embodiment 120 | A1 | IS1 | Scale-like | 0.8 | 0.8 | 20 | 2.0 | VEEA/ PEA |

TABLE 15-continued

| | Second Ink Constitution | | | | | | | |
|---|---|---|---|---|---|---|---|---|
| | Polymerized Compound | | Dispersant | | Substance A | | Other Components | |
| | | Content Rate (Mass Part) | | Content Rate (Mass Part) | | Content Rate (Mass Part) | | Content Rate (Mass Part) |
| Embodiment 111 | | 33.5/34.9/ 3.5/16.9 | — | — | A3 | 0.8 | ic819/scTPO/ UV3500/ MEHQ | 4.0/4.0/ 0.2/0.2 |
| Embodiment 112 | | 24.9/23.9/ 14.1/16.1/ 10.2 | D5 | 0.2 | A1 | 0.2 | ic819/scTPO/ UV3500/ MEHQ | 4.0/2.0/ 0.2/0.2 |
| Embodiment 113 | | 32.0/34.1/ 20.3 | — | — | A4 | 1.2 | ic819/scTPO/ scDETX/UV3500/ MEHQ | 4.0/4.0/ 2.0/0.2 0.2 |
| Embodiment 114 | | 20.8/20.0/ 18.1/17.2/ 6.0/5.5 | — | — | A1 | 1.0 | ic819/scTPO/ scDETX/UV3500/ MEHQ | 4.0/4.0/ 2.0/0.2 0.2 |
| Embodiment 115 | | 27.0/26.5/ 13.8/15.5/ 4.0 | — | — | A2 | 0.8 | ic819/scTPO/ scDETX/UV3500/ MEHQ | 4.0/4.0/ 2.0/0.2 0.2 |
| Embodiment 116 | | 26.2/27.6/ 14.1/15.5/ 4.0 | D5 | 0.2 | A1 | 0.2 | ic819/scTPO/ scDETX/LHP | 4.0/4.0/ 2.0/0.2 |
| Embodiment 117 | | 52.2/34.8 | — | — | A2 | 0.3 | ic819/scTPO/ scDETX/LHP/LF | 4.0/4.0/ 2.0/0.2/ 0.2 |
| Embodiment 118 | | 40.0/40.0/ 7.0 | — | — | A2 | 0.6 | ic819/scTPO/ scDETX/LHP/LF | 4.0/4.0/ 2.0/0.2/ 0.2 |
| Embodiment 119 | | 21.8/21.8/ 26.0/17.4 | — | — | A2 | 0.6 | ic819/scTPO/ scDETX/LHP/LF | 4.0/4.0/ 2.0/0.2/ 0.2 |
| Embodiment 120 | | 51.5/34.1 | D2 | 1.0 | A1 | 1.0 | ic819/scTPO/ scDETX/UV3500/ MEHQ | 4.0/4.0/ 2.0/0.2/ 0.2 |

TABLE 16

| | Metal Powder Constitution | | Second Ink Constitution | | | | | |
|---|---|---|---|---|---|---|---|---|
| | Constituent Material of Mother Particles | Materials Used for Surface Preparation | Metal Powder | | | | | |
| | | | Shape | Average Particle Diameter (μm) | Maximum Particle Diameter (μm) | Average Thickness (nm) | Content Rate (Mass Part) | Polymerized Compound |
| Comparative Example 101 | A1 | FAP1 | Scale-like | 0.9 | 2.0 | 60 | 2.0 | BLA/PEA |
| Comparative Example 102 | A1 | FAP1 | Scale-like | 0.9 | 2.0 | 60 | 2.0 | BLA/PEA |
| Comparative Example 103 | A1 | FAP1 | Scale-like | 0.9 | 2.0 | 60 | 2.0 | BLA/PEA |
| Comparative Example 104 | A1 | FAP1 | Scale-like | 0.9 | 2.0 | 60 | 2.0 | BLA/PEA |
| Comparative Example 105 | A1 | FAP1 | Scale-like | 0.9 | 2.0 | 60 | 2.0 | BLA/PEA |
| Comparative Example 106 | A1 | FAP1 | Scale-like | 0.9 | 2.0 | 60 | 2.0 | BLA/PEA |
| Comparative Example 107 | A1 | FAP1 | Scale-like | 0.9 | 2.0 | 60 | 2.0 | BLA/PEA |
| Comparative Example 108 | A1 | FAP1 | Scale-like | 0.9 | 2.0 | 60 | 2.0 | BLA/PEA |
| Comparative Example 109 | A1 | FAP1 | Scale-like | 0.9 | 2.0 | 60 | 2.0 | BLA/PEA |
| Comparative Example 110 | A1 | FAP1 | Scale-like | 0.9 | 2.0 | 60 | 2.0 | BLA/PEA |
| Comparative Example 111 | A1 | FAP1 | Sphere | 0.8 | 10 | — | 2.0 | BLA/PEA |

TABLE 16-continued

|  | Second Ink Constitution | | | | | | | |
|---|---|---|---|---|---|---|---|---|
|  | Polymerized Compound | | Dispersant | | Substance A | | Other Components | |
|  | Content Rate (Mass Part) | | | Content Rate (Mass Part) | | Content Rate (Mass Part) | | Content Rate (Mass Part) |
| Comparative Example 101 | 60.0/27.8 | D2 | 1.0 | A1 | 0.2 | ic819/scTPO/scDETX | 4.0/4.0/2.0 |
| Comparative Example 102 | 60.0/27.8 | D2 | 1.0 | A1 | 0.2 | ic819/scTPO/scDETX | 4.0/4.0/2.0 |
| Comparative Example 103 | 60.0/27.8 | D2 | 1.0 | A1 | 0.2 | ic819/scTPO/scDETX | 4.0/4.0/2.0 |
| Comparative Example 104 | 60.0/27.8 | D2 | 1.0 | A1 | 0.2 | ic819/scTPO/scDETX | 4.0/4.0/2.0 |
| Comparative Example 105 | 60.0/27.8 | D2 | 1.0 | A1 | 0.2 | ic819/scTPO/scDETX | 4.0/4.0/2.0 |
| Comparative Example 106 | 60.0/27.8 | D2 | 1.0 | A1 | 0.2 | ic819/scTPO/scDETX | 4.0/4.0/2.0 |
| Comparative Example 107 | 60.0/27.8 | D2 | 1.0 | A1 | 0.2 | ic819/scTPO/scDETX | 4.0/4.0/2.0 |
| Comparative Example 108 | 60.0/27.8 | D2 | 1.0 | A1 | 0.2 | ic819/scTPO/scDETX | 4.0/4.0/2.0 |
| Comparative Example 109 | 60.0/27.8 | D2 | 1.0 | A1 | 0.2 | ic819/scTPO/scDETX | 4.0/4.0/2.0 |
| Comparative Example 110 | 60.0/27.8 | D2 | 1.0 | A1 | 0.2 | ic819/scTPO/scDETX | 4.0/4.0/2.0 |
| Comparative Example 111 | 60.0/27.8 | D2 | 1.0 | A1 | 0.2 | ic819/scTPO/scDETX | 4.0/4.0/2.0 |

TABLE 17

|  | Base Material Constituent Material | $X_1$ (g/m$^2$) | $T_1$ (seconds) | $X_2$ (g/m$^2$) | $T_2$ (seconds) | R (Volume %) |
|---|---|---|---|---|---|---|
| Embodiment 101 | PC | 10.0 | 0.010 | 5.0 | 10.0 | 50 |
| Embodiment 102 | PET | 5.0 | 0.50 | 1.9 | 20.0 | 38 |
| Embodiment 103 | Glass | 16.0 | 0.008 | 3.8 | 7.0 | 24 |
| Embodiment 104 | PC | 7.0 | 0.030 | 1.9 | 15.0 | 27 |
| Embodiment 105 | PET | 12.0 | 0.15 | 5.9 | 9.0 | 49 |
| Embodiment 106 | Glass | 3.2 | 0.75 | 1.7 | 7.5 | 53 |
| Embodiment 107 | PC | 17.8 | 0.006 | 7.8 | 12.0 | 44 |
| Embodiment 108 | PET | 11.0 | 0.20 | 3.1 | 6.5 | 28 |
| Embodiment 109 | Glass | 8.0 | 0.015 | 1.8 | 28.0 | 23 |
| Embodiment 110 | PC | 14.0 | 0.20 | 4.6 | 11.0 | 33 |
| Embodiment 111 | PET | 11.0 | 0.30 | 4.8 | 13.0 | 44 |
| Embodiment 112 | Glass | 12.0 | 0.40 | 6.6 | 16.0 | 55 |
| Embodiment 113 | PC | 13.0 | 0.050 | 7.5 | 18.0 | 58 |
| Embodiment 114 | PET | 9.0 | 0.080 | 4.2 | 9.5 | 47 |
| Embodiment 115 | Glass | 2.5 | 0.0010 | 1.9 | 60.0 | 76 |
| Embodiment 116 | PC | 10.0 | 0.25 | 1.4 | 15.0 | 14 |
| Embodiment 117 | PET | 12.0 | 0.015 | 2.0 | 12.0 | 17 |
| Embodiment 118 | PC | 11.0 | 0.080 | 1.9 | 11.0 | 17 |
| Embodiment 119 | Glass | 20.0 | 1.0 | 2.0 | 5.0 | 10 |
| Embodiment 120 | PC | 10.0 | 0.035 | 6.3 | 14.0 | 63 |
| Comparative Example 101 | PC | — | — | 5.0 | 10.0 | — |
| Comparative Example 102 | PC | — | — | 5.0 | 1.0 | — |
| Comparative Example 103 | PC | 1.9 | 0.010 | 5.0 | 10.0 | 263 |
| Comparative Example 104 | PC | 21.0 | 0.010 | 5.0 | 10.0 | 24 |
| Comparative Example 105 | PC | 10.0 | 0.0001 | 5.0 | 10.0 | 50 |
| Comparative Example 106 | PC | 10.0 | 1.1 | 5.0 | 10.0 | 50 |
| Comparative Example 107 | PC | 10.0 | 0.010 | 0.9 | 10.0 | 9 |
| Comparative Example 108 | PC | 10.0 | 0.010 | 8.1 | 10.0 | 81 |
| Comparative Example 109 | PC | 10.0 | 0.010 | 5.0 | 4.9 | 50 |
| Comparative Example 110 | PC | 10.0 | 0.010 | 5.0 | 61.0 | 50 |
| Comparative Example 111 | PC | 10.0 | 0.010 | 5.0 | 61.0 | 50 |

2 Recording Material Evaluation

The following types of evaluations were done for each recording material obtained as noted above.

2.1 Printing Part Shape (Printing Part Precision)

Each recording material produced with each of the embodiments and comparative examples noted above was observed from the side of the surface on which the base material printing part (first layer, second layer) was provided, and the printing part shape was evaluated in accordance with the four levels of standards hereafter.

A: The average gap in the solid pattern of adjacent squares is 0.3 mm or greater and less than 0.7 mm.

B: The average gap in the solid pattern of adjacent squares is 0.2 mm or greater and less than 0.3 mm, or 0.7 mm or greater and less than 0.8 mm.

C: The average gap in the solid pattern of adjacent squares is 0.1 mm or greater and less than 0.2 mm, or 0.8 mm or greater and less than 0.9 mm.

D: The average gap in the solid pattern of adjacent squares is 0 mm (in contact) or greater and less than 0.1 mm, or 0.9 mm or greater.

2.2 Recording Material External Appearance Evaluation (Sparkly Appearance)

The recording material produced with each of the embodiments and comparative examples noted above was observed by visual inspection from the side on which the printing part (first layer, second layer) was provided, and the aesthetic external appearance (esthetics) was evaluated in accordance with the standard of the seven levels hereafter.

A: Has a sparkly appearance (sparkly appearance) overflowing with a high class appearance for which there is a big difference in the situation of the changes in the reflective state for each site such as with lamé as the observation direction changes, has an extremely excellent external appearance.

B: Has a sparkly appearance (sparkly appearance) overflowing with a high class appearance for which there is a big difference in the situation of the changes in the reflective state for each site such as with lamé as the observation direction changes, has a very excellent external appearance.

C: Has a sparkly appearance (sparkly appearance) overflowing with a high class appearance for which there is a big difference in the situation of the changes in the reflective state for each site such as with lamé as the observation direction changes, has an excellent external appearance.

D: Has a sparkly appearance (sparkly appearance) overflowing with a high class appearance for which there is a big difference in the situation of the changes in the reflective state for each site such as with lamé as the observation direction changes, has a good external appearance.

E: Has an inferior sparkly appearance, external appearance is somewhat poor.

F: Has an inferior sparkly appearance, external appearance is poor.

G: Has an inferior sparkly appearance, external appearance is very poor.

2.3 Abrasion Resistance

Regarding the recording materials produced with each of the embodiments and comparative examples noted above, at the point when 48 hours elapsed from the production of the recording material, the degree of glossiness of the pattern formed part was measured with the condition of a flap angle of 60° using a gloss meter (MULTI GLOSS 268 made by Konica Minolta). After that, an abrasion resistance test was performed using polyethylene terephthalate film as photo paper (Mitsubishi Plastic, Inc., DIAFOIL 0440E) was performed by using a Sutherland rub tester in accordance with JIS K5701, and with the same conditions as noted above, the degree of glossiness (flap angle 60°) was measured for the recording materials after the abrasion resistance test, the decrease rate of the degree of glossiness after the abrasion resistance test was obtained, and the evaluation was performed according to the standards below.

A: Glossiness decrease rate is less than 10%.

B: Glossiness decrease rate is 10% or greater and less than 17%.

C: Glossiness decrease rate is 17% or greater and less than 27%.

D: Glossiness decrease rate is 27% or greater and less than 30%.

E: Glossiness decrease rate is 30% or greater, or the metal particles are omitted and the surface of the base material is exposed.

3 Evaluation of Ink Used in Production of Recording Material

The recording materials obtained as noted above were evaluated as noted hereafter.

3.1 Droplet Discharge Stability Evaluation (Discharge Stability Evaluation)

The inks used for each of the embodiments noted above were evaluated using the kind of test shown hereafter.

First, a droplet discharge device equipped in a chamber (thermal chamber) and the inks used with each of the embodiments noted above were prepared, and in a state with the drive waveform of the piezo-element optimized, in an environment of 25° C., 50% RH, for each ink, the droplets were continuously discharged 2,000,000 times (2,000,000 drops) from each nozzle of the droplet discharge head. After that, operation of the droplet discharge device was stopped, and in a state with each ink filled in the flow path of the droplet discharge device, this was left for 360 hours in an environment of 25° C., 50% RH.

After that, continuous discharge of the droplets was performed 4,000,000 times (4,000,000 drops) from each nozzle of the droplet discharge head in an environment of 25° C., 50% RH. After being left for 360 hours, in regards to the droplets discharged 4,000,000 times from the nozzles specified near the center of the droplet discharge head, the average value of the skew amount d from the center target position that the respective droplets were mainly targeted to land at was obtained, and an evaluation was performed in accordance with the five level standards below. We can say that the smaller that this value became, the more effective the prevention of a flying curve.

A: The average value of the skew volume d is less than 0.07 μm.

B: The average value of the skew volume d is 0.07 μm or greater and less than 0.14 μm.

C: The average value of the skew volume d is 0.14 μm or greater and less than 0.17 μm.

D: The average value of the skew volume d is 0.17 μm or greater and less than 0.21 μm.

E: The average value of the skew volume d is 0.21 μm or greater.

3.2 Ink Frequency Characteristics

A droplet discharge device equipped in a chamber (thermal chamber) and the inks used with each of the embodiments noted above were prepared, and in a state with the drive waveform of the piezo-element optimized, in an environment of 25° C., 50% RH, for each ink, droplet discharge was performed while changing the piezo-element vibration count (frequency) from all the nozzles of the droplet discharge head. The droplet discharge time for each frequency was 20 minutes. Up to the frequency for which the undischarged nozzle count is less than 1% of the total nozzle count at the point when 20 minutes of discharge ends is used as the maximum frequency that can be actually used, and evaluation of the actually usable frequency range was done according to the four level standards hereafter. The larger this value, the more excellent the frequency characteristics.

A: 15 kHz or greater.

B: 11 kHz or greater and less than 15 kHz.

C: 5 kHz or greater and less than 11 kHz.

D: Less than 5 kHz.

3.3 Evaluation of Ink Storage Stability (Long Term Stability Evaluation)

3.3.1 Settleability

The inks used with the embodiments noted above were respectively placed in a micro tube of height 3 cm, left to stand in an environment of 40° C., and the time was measured until the thickness of the clear layer of supernatant (layer not including metal powder) reached 2 mm, and evaluation was done according to the standards noted hereafter.

A: Time until the clear layer of the supernatant reached 2 mm was two weeks or greater.

B: Time until the clear layer of the supernatant reached 2 mm was one week or greater and less than two weeks.

C: Time until the clear layer of the supernatant reached 2 mm was three days or greater and less than one week.

D: Time until the clear layer of the supernatant reached 2 mm was less than three days.

3.3.2 Occurrence of Foreign Objects (Aggregates) on Filter

After leaving for 60 days in an environment of 40° C., the inks used with the embodiments noted above were filtered in 10 mL under reduced pressure using a membrane filter with filtration accuracy 10 μm. After that, the number of ink derived foreign objects (aggregates) existing in the filter were counted, and these were evaluated according to the standards hereafter.

A: Foreign matter (aggregates) in the filter are not found.

B: Foreign matter (aggregates) existing in the filter are 1 or more and 4 or less.

C: Foreign matter (aggregates) existing in the filter are 5 or more and 29 or less.

D: Foreign matter (aggregates) existing in the filter are 30 or more.

3.4 Rise of Viscosity

After the inks used with the embodiments noted above were left for 30 days in an environment of 60° C., the viscosity of the inks used with each of the embodiments noted above were measured at 25° C. using a vibration type viscometer in compliance with JIS Z8809, rise of viscosity immediately after production was found, and an evaluation was done according to the standards below.

A: The rise of viscosity is less than 10%.

B: The rise of viscosity is 10% or greater and less than 15%.

C: The rise of viscosity is 15% or greater and less than 20%.

D: The rise of viscosity is 20% or greater and less than 25%.

E: The rise of viscosity is 25% or greater, or the occurrence of foreign matter was found.

3.5 Hardenability

For the inks used with each of the embodiments noted above, an Epson inkjet printer PM800C was introduced, and solid printing was performed using DIAFOIL G440E made by Mitsubishi Plastic Corp. as the recording medium (thickness 38 μm) with an ink volume wet at 9 g/m$^2$, and after printing, irradiation of ultraviolet light was done after printing using the RX Firefly LED-UV lamp made by Phoseon Inc. (gap 6 mm, peak wavelength 395 nm, 1000 mW/cm$^2$), confirmation was done of whether the ink was hardened, and evaluation was done according to the five levels of standards below. To determine whether the ink was hardened, the surface was rubbed using a cotton swab, and a determination was made of whether or not unhardened ink was adhered. It is possible to calculate whether or not the irradiation volumes A to E below are applicable depending on how many seconds the lamp was irradiated.

A: Hardened using an ultraviolet light irradiation volume of less than 100 mJ/cm$^2$.

B: Hardened using an ultraviolet light irradiation volume of 100 mJ/cm$^2$ or more and less than 200 mJ/cm$^2$.

C: Hardened using an ultraviolet light irradiation volume of 200 mJ/cm$^2$ or more and less than 500 mJ/cm$^2$.

D: Hardened using an ultraviolet light irradiation volume of 500 mJ/cm$^2$ or more and less than 1000 mJ/cm$^2$.

E: Hardened using an ultraviolet light irradiation volume of 1000 mJ/cm$^2$ or more, or did not harden at all.

These results are shown in table 18 and table 19.

TABLE 18

| | Printing Part Precision | External Appearance Evaluation | Abrasion Resistance |
|---|---|---|---|
| Embodiment 101 | A | A | A |
| Embodiment 102 | A | A | A |
| Embodiment 103 | A | A | A |
| Embodiment 104 | A | A | A |
| Embodiment 105 | A | A | A |
| Embodiment 106 | B | A | B |
| Embodiment 107 | B | A | B |
| Embodiment 108 | A | B | A |
| Embodiment 109 | B | A | A |
| Embodiment 110 | A | A | A |
| Embodiment 111 | A | A | A |
| Embodiment 112 | A | A | A |
| Embodiment 113 | A | A | A |
| Embodiment 114 | A | A | A |
| Embodiment 115 | C | B | A |
| Embodiment 116 | A | B | A |
| Embodiment 117 | A | A | A |
| Embodiment 118 | A | A | A |
| Embodiment 119 | C | C | B |
| Embodiment 120 | B | B | A |
| Comparative Example 101 | D | F | A |
| Comparative Example 102 | A | G | A |
| Comparative Example 103 | D | F | A |
| Comparative Example 104 | D | G | B |
| Comparative Example 105 | D | F | A |
| Comparative Example 106 | D | C | A |
| Comparative Example 107 | A | G | B |
| Comparative Example 108 | D | D | A |
| Comparative Example 109 | A | G | E |
| Comparative Example 110 | D | D | A |
| Comparative Example 111 | D | G | A |

TABLE 19

| | Discharge Stability | Frequency Characteristics | Long-Term Stability | | | |
|---|---|---|---|---|---|---|
| | | | Settleability | Occurrence of Foreign Matter | Rise of Viscosity | Hardenability |
| Embodiment 101 | A | A | A | A | A | A |
| Embodiment 102 | A | A | A | A | A | A |
| Embodiment 103 | A | A | A | A | A | A |
| Embodiment 104 | A | A | A | A | A | A |

TABLE 19-continued

|  | | Long-Term Stability | | | | |
| --- | --- | --- | --- | --- | --- | --- |
|  | Discharge Stability | Frequency Characteristics | Settleability | Occurrence of Foreign Matter | Rise of Viscosity | Hardenability |
| Embodiment 105 | A | A | A | A | A | A |
| Embodiment 106 | A | A | A | A | A | A |
| Embodiment 107 | A | A | A | B | B | A |
| Embodiment 108 | A | A | A | B | B | A |
| Embodiment 109 | A | A | B | A | A | A |
| Embodiment 110 | A | A | A | A | A | A |
| Embodiment 111 | A | A | A | A | A | A |
| Embodiment 112 | B | A | B | A | A | A |
| Embodiment 113 | A | A | A | A | A | A |
| Embodiment 114 | B | A | B | A | A | A |
| Embodiment 115 | A | A | A | A | A | A |
| Embodiment 116 | A | A | A | A | A | B |
| Embodiment 117 | A | B | A | B | B | A |
| Embodiment 118 | A | B | A | B | A | A |
| Embodiment 119 | B | B | B | B | B | B |
| Embodiment 120 | A | A | A | A | A | A |

As is clear from table 18, the recording material of the invention has the printed part of the desired shape provided with good precision, has excellent glossy appearance (sparkly glossy appearance (sparkly appearance) for which there is a big difference in the situation of the changes in the reflective state for each site such as with lamé as the observation direction changes) and external appearance, and is also excellent in terms of the abrasion resistance of the printing part. Also, with the invention, the kinds of excellent effects noted above can be obtained regardless of the type of base material. Also, as is clear from table 19, the ink used with the invention has excellent droplet discharge stability, storage stability, and hardenability. In contrast to this, with the comparative examples, satisfactory results could not be obtained.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A production method of a recording material comprising:
    applying to a base material using an inkjet method a first ink including a first polymerized compound polymerized by irradiation of ultraviolet light;
    forming a first layer by polymerizing and curing the first polymerized compound by a first irradiation of ultraviolet light to the first polymerized compound, the first irradiation including commencing the first irradiation within 0.0010 second or greater and 1.0 second or less from a timing of landing of droplets of the first ink on the base material;
    applying to an area on which the first layer is formed using the inkjet method a second ink containing a second polymerized compound polymerized by irradiation of ultraviolet light and a metal powder; and
    forming a second layer by polymerizing and curing the second polymerized compound by a second irradiation of the ultraviolet light to the second polymerized compound, the second irradiation including commencing the second irradiation within 5.0 seconds or greater and 60.0 seconds or less from a timing of landing of droplets of the second ink on the first layer,
    a discharged volume of the first ink per unit area in the area being 2.0 g/m$^2$ or greater and 20.0 g/m$^2$ or less,
    a discharged volume of the second ink per unit area of the area being 80 volume % or greater and 200 volume % or less than the discharged volume of the first ink.

2. The production method of the recording material according to claim 1, wherein
    the metal powder includes items that are surface-processed by a surface preparation agent as constituent particles.

3. The production method of the recording material according to claim 2, wherein
    the surface preparation agent is one type or two or more types selected from a group consisting of fluorine based silane compounds, fluorine based phosphate esters, fluorine based fatty acids, and isocyanate compounds.

4. The production method of the recording material according to claim 2, wherein
    the metal powder includes as the constituent particles mother particles in which at least a surface is mainly constituted by Al and which have been surface-processed using the surface preparation agent.

5. The production method of the recording material according to claim 1, wherein
constituent particles of the metal powder have a scale-like shape.

6. The production method of the recording material according to claim 5, wherein
an average thickness of the constituent particles of the metal powder is 10 nm or greater and 100 nm or less.

7. The production method of the recording material according to claim 1, wherein
an average particle diameter of the metal powder is 500 nm or greater and 3.0 μm or less, and the maximum particle diameter is 5 μm or less.

8. The production method of the recording material according to claim 1, wherein
the first ink and the second ink both include a monomer having an alicyclic structure as the first and second polymerized compounds.

9. The production method of the recording material according to claim 8, wherein
the monomer having the alicyclic structure includes one type or two or more types selected from a group consisting of tris (2-acryloxyethyl) isocyanurate, dicyclopentenyloxyethyl acrylate, adamantyl acrylate, γ-butyrolactone acrylate, N-vinyl caprolactam, N-vinylpyrrolidone, pentamethyl piperidyl acrylate, tetramethyl piperidyl acrylate, 2-methyl-2-adamantyl acrylate, 2-ethyl-2-adamantyl acrylate, mevalonic acid lactone acrylate, dimethylol tricyclodecane diacrylate, dimethylol dicyclopentane diacrylate, dicyclopentenyl acrylate, dicyclopentanyl acrylate, isobornyl acrylate, cyclohexyl acrylate, acryloyl morpholine, tetrahydrofurfuryl acrylate, cyclohexane spiro-2-(1,3-dioxolan-4-yl) methyl acrylate, and (2-methyl-2-ethyl-1,3-dioxolan-4-yl) methyl acrylate.

10. The production method of the recording material according to claim 8, wherein
the first ink and the second ink both include as the first and second polymerized compounds other than the monomer having the alicyclic structure one type or two or more types selected from a group consisting of phenoxyethyl acrylate, benzyl acrylate, acrylic acid 2-(2-vinyloxyethoxy) ethyl, dipropylene glycol diacrylate, tripropylene glycol diacrylate, 2-hydroxy 3-phenoxypropyl acrylate, and 4-hydroxybutyl acrylate.

11. The production method of the recording material according to claim 1, wherein
a contact angle of the first ink to the base material is 30 degrees or greater and 85 degrees or less.

* * * * *